United States Patent
Takayama et al.

(10) Patent No.: US 9,179,106 B2
(45) Date of Patent: Nov. 3, 2015

(54) MEASUREMENT SYSTEM, IMAGE CORRECTION METHOD, AND COMPUTER PROGRAM

(75) Inventors: Tomohiko Takayama, Kawasaki (JP); Takuya Tsujimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 432 days.

(21) Appl. No.: 12/975,287

(22) Filed: Dec. 21, 2010

(65) Prior Publication Data

US 2011/0157353 A1   Jun. 30, 2011

(30) Foreign Application Priority Data

Dec. 28, 2009 (JP) ................................. 2009-297294
Dec. 28, 2009 (JP) ................................. 2009-298746

(51) Int. Cl.
| | |
|---|---|
| *H04N 7/18* | (2006.01) |
| *G01C 11/26* | (2006.01) |
| *G01B 11/25* | (2006.01) |
| *G01B 21/30* | (2006.01) |
| *G06T 5/00* | (2006.01) |
| *G01B 11/24* | (2006.01) |
| *H04N 13/02* | (2006.01) |
| *H04N 5/235* | (2006.01) |

(52) U.S. Cl.
CPC ............ *H04N 7/183* (2013.01); *G01B 11/2504* (2013.01); *G01B 21/30* (2013.01); *G01C 11/26* (2013.01); *G06T 5/007* (2013.01); *G01B 11/24* (2013.01); *H04N 5/235* (2013.01); *H04N 13/0253* (2013.01)

(58) Field of Classification Search
USPC .......................................................... 348/135
See application file for complete search history.

(56) References Cited

U.S. PATENT DOCUMENTS

| | | | | |
|---|---|---|---|---|
| 5,861,944 A | * | 1/1999 | Nishi ............................... | 355/68 |
| 6,399,942 B1 | * | 6/2002 | Ishihara ........................ | 250/234 |
| 7,200,260 B1 | * | 4/2007 | Watanabe et al. ............. | 382/153 |
| 7,239,312 B2 | * | 7/2007 | Urisaka et al. ................ | 345/419 |
| 7,245,387 B2 | * | 7/2007 | Mamiya et al. ................ | 356/604 |
| 7,355,648 B1 | * | 4/2008 | Braun et al. ................... | 348/370 |
| 7,626,569 B2 | * | 12/2009 | Lanier ........................... | 345/156 |

(Continued)

FOREIGN PATENT DOCUMENTS

| | | |
|---|---|---|
| JP | 62-161004 A | 7/1987 |
| JP | 6-242020 A | 9/1994 |

(Continued)

*Primary Examiner* — Chikaodili E Anyikire
*Assistant Examiner* — Tyler W Sullivan
(74) *Attorney, Agent, or Firm* — Canon U.S.A., Inc. IP Division

(57) ABSTRACT

A measurement system includes an illumination unit, imaging unit, acquisition unit and correction unit. A measurement target is irradiated with illumination light. The imaging unit captures an image of light reflected by or transmitted through the measurement target. The acquisition unit acquires positional relationship information representing a positional relationship between the illumination unit and the measurement target and between the imaging unit and the measurement target. The correction unit corrects a luminance of at least one of the illumination light emitted by the illumination unit and the captured image based on the positional relationship information in such a way as to correct a luminance change of the measurement target image, wherein at least two of the measurement target, the illumination unit, and the imaging unit are variable in spatial position.

11 Claims, 31 Drawing Sheets

(56) References Cited

U.S. PATENT DOCUMENTS

| | | | |
|---|---|---|---|
| 2002/0196415 A1* | 12/2002 | Shiratani | 353/31 |
| 2004/0114921 A1* | 6/2004 | Braun et al. | 396/661 |
| 2005/0184947 A1* | 8/2005 | Maeyama et al. | 345/94 |
| 2007/0041004 A1* | 2/2007 | Suzuki | 355/67 |
| 2007/0190438 A1* | 8/2007 | Kim et al. | 430/30 |
| 2007/0228262 A1* | 10/2007 | Cantin et al. | 250/221 |
| 2008/0240511 A1* | 10/2008 | Ban et al. | 382/108 |
| 2010/0091301 A1* | 4/2010 | Masuda | 356/601 |
| 2010/0161125 A1* | 6/2010 | Aoba et al. | 700/254 |
| 2011/0157373 A1* | 6/2011 | Ye et al. | 348/187 |

FOREIGN PATENT DOCUMENTS

| | | |
|---|---|---|
| JP | 2000-292133 A | 10/2000 |
| JP | 2000-292133 A | 10/2000 |
| JP | 2004-191200 A | 7/2004 |
| JP | 2008-216039 A | 9/2008 |

* cited by examiner

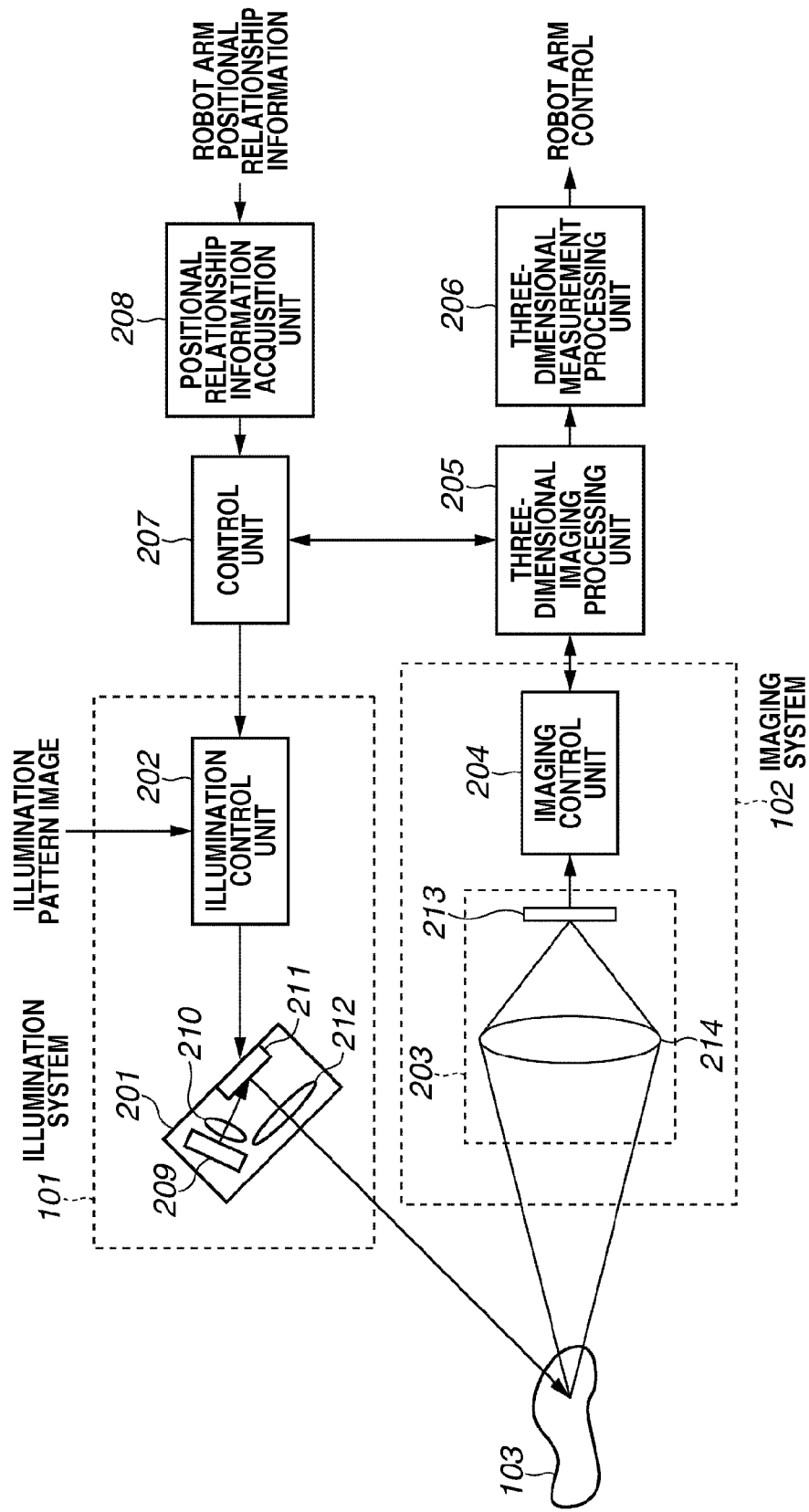

301

302

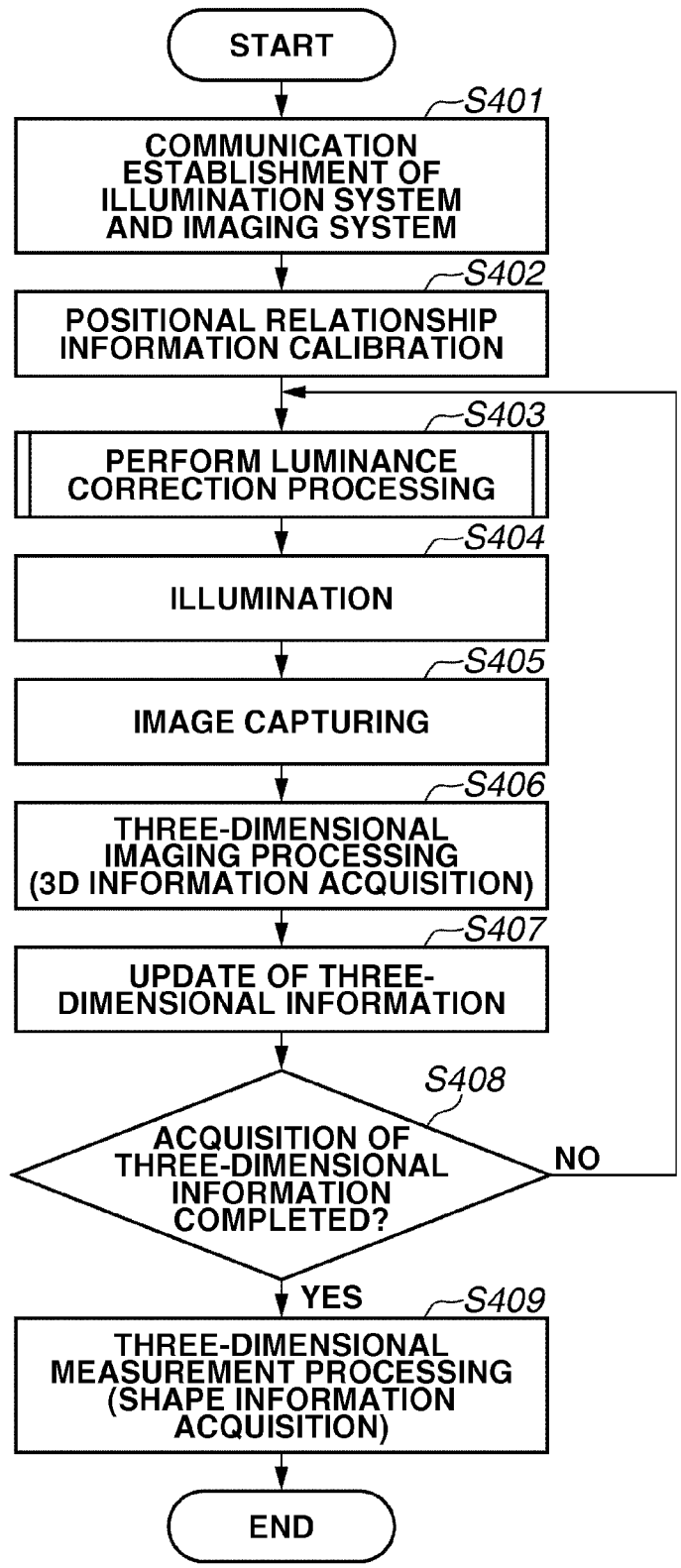

ARBITRARY LINE

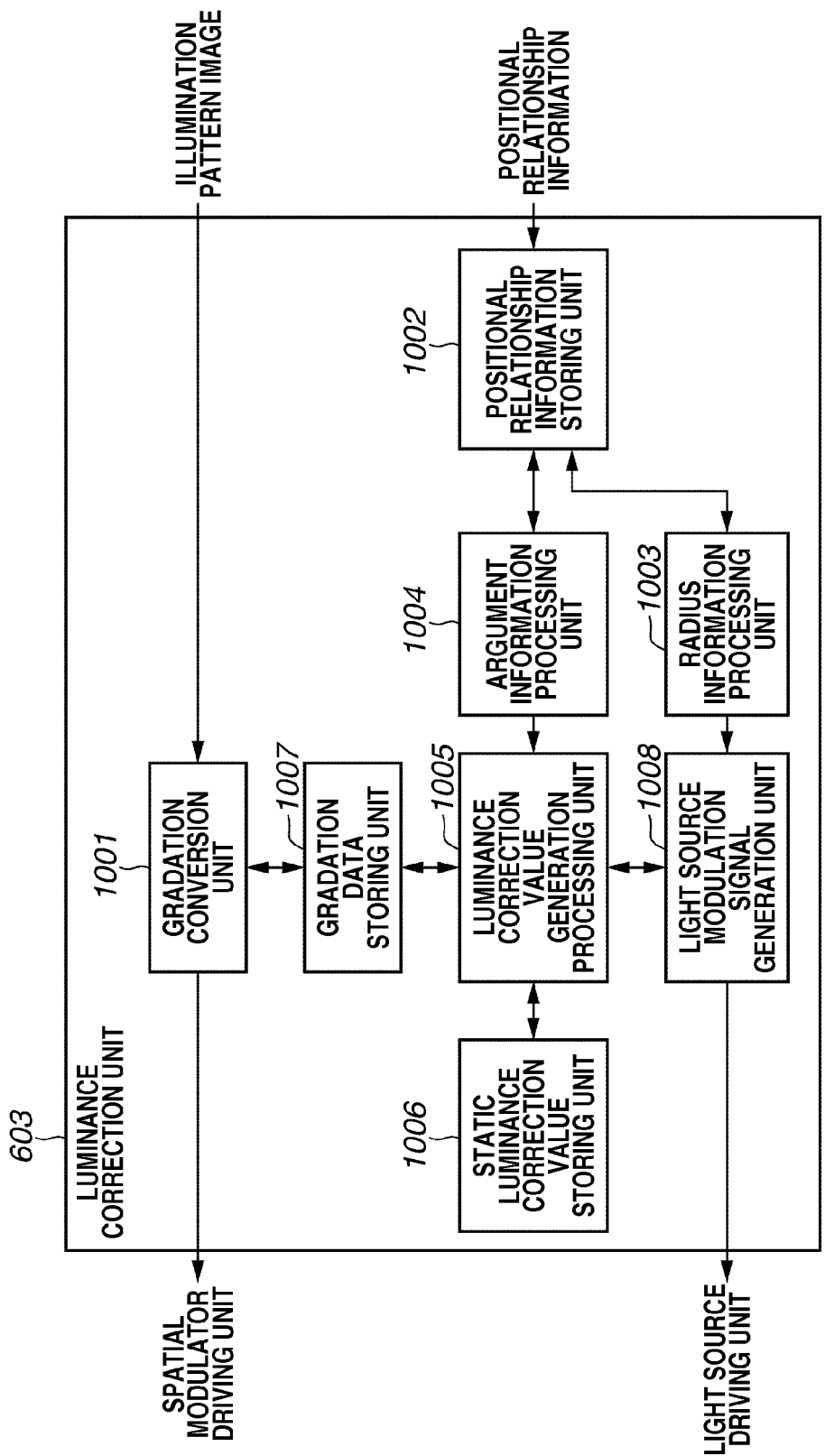

| DATA INPUT | GRADATION COMPRESSION BASED ON ILLUMINATION CORRECTION | GRADATION DISPLAY PROCESSING BY SPATIAL MODULATOR | AD CONVERSION ON CAPTURED IMAGE | FORMAT CONVERSION |
|---|---|---|---|---|
| 120 | 96 | 96 | 481.4117647 | 120 |
| 121 | 96.8 | 97 | 486.4264706 | 121 |
| 122 | 97.6 | 98 | 491.4411765 | 123 |
| 123 | 98.4 | 98 | 491.4411765 | 123 |
| 124 | 99.2 | 99 | 496.4558824 | 124 |
| 125 | 100 | 100 | 501.4705882 | 125 |
| 126 | 100.8 | 101 | 506.4852941 | 126 |
| 127 | 101.6 | 102 | 511.5 | 128 |
| 128 | 102.4 | 102 | 511.5 | 128 |
| 129 | 103.2 | 103 | 516.5147059 | 129 |
| 130 | 104 | 104 | 521.5294118 | 130 |
| 131 | 104.8 | 105 | 526.5441176 | 131 |
| 132 | 105.6 | 106 | 531.5588235 | 133 |
| 133 | 106.4 | 106 | 531.5588235 | 133 |
| 134 | 107.2 | 107 | 536.5735294 | 134 |

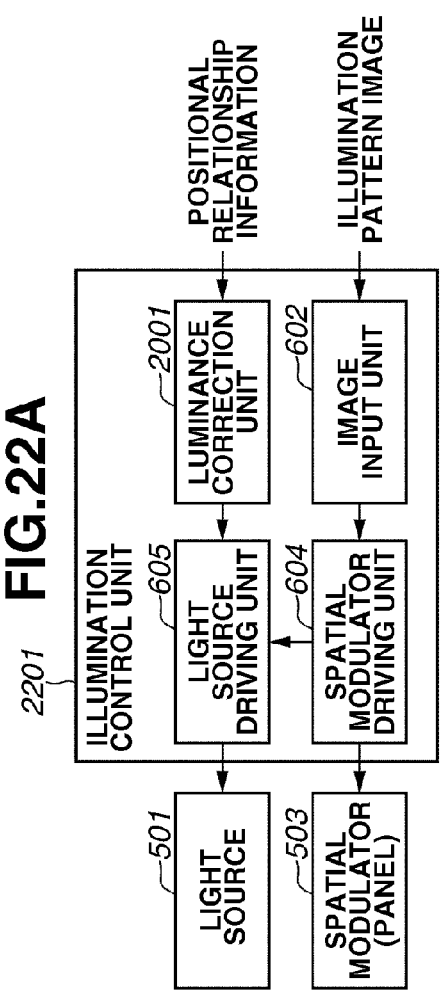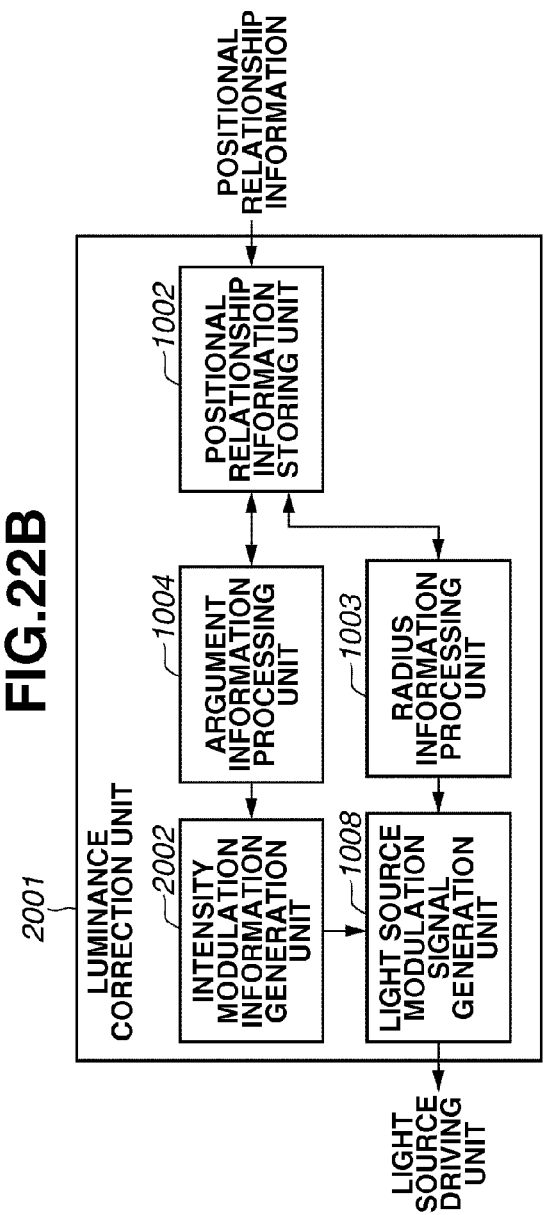

| ADDRESS (PRE-CONVERSION COORDINATES) | | CONVERTED COORDINATES | | | | | |
|---|---|---|---|---|---|---|---|
| X COORDINATE | Y COORDINATE | R | | G | | B | |
| | | X COORDINATE | Y COORDINATE | X COORDINATE | Y COORDINATE | X COORDINATE | Y COORDINATE |
| xn | yn | Rxn | Ryn | Gxn | Gyn | Bxn | Byn |
| | | Gxn-Rxn (TABLE VALUE) | Gyn-Ryn (TABLE VALUE) | | | Bxn-Gxn (TABLE VALUE) | Byn-Gyn (TABLE VALUE) |

MEASUREMENT SYSTEM, IMAGE CORRECTION METHOD, AND COMPUTER PROGRAM

CROSS REFERENCE TO RELATED APPLICATIONS

This application claims priority from Japanese Patent Applications No. 2009-298746 filed Dec. 28, 2009 and No. 2009-297294 filed Dec. 28, 2009, which are hereby incorporated by reference herein in their entirety.

BACKGROUND OF THE INVENTION

1. Field of the Invention

The present invention relates to a measurement system, an image correction method, and a computer program. More specifically, the present invention is applicable to a system performing three-dimensional measurement based on captured images.

2. Description of the Related Art

The three-dimensional measurement is a technique playing an important role in the machine vision field. A conventional three-dimensional measurement method includes capturing an image of a pattern projection image with a camera, for example, by irradiating a measurement target with two-dimensional pattern light. The conventional three-dimensional measurement method further includes obtaining measurement target distance information by performing a computer-based analysis on a captured two-dimensional image based on the periodicity of the two-dimensional pattern.

The distance information represents the distance of the measurement target in the depth direction, such as the distance between the measurement target and the camera, or surface undulation. Information relating to the measurement target in the width direction or the height direction can be obtained based on the captured two-dimensional image. Therefore, at this moment, it is feasible to obtain three-dimensional space information.

The conventional three-dimensional measurement method further includes performing three-dimensional model fitting based on the captured two-dimensional image, the distance information, and preliminarily stored model information of the measurement target, to acquire measurement information (e.g., position, orientation, and three-dimensional shape) relating to the measurement target.

A method using two-dimensional pattern light to obtain the distance information relating to the measurement target in the depth direction is generally referred to as a pattern projection method. In general, the pattern projection method includes irradiating a measurement target with edge pattern or sine wave pattern light.

The edge pattern is a discrete pattern including binary (e.g., monochrome) gradational stripes that are regularly and continuously arranged. The sine wave pattern is a continuous pattern that expresses gradational sine waves that continuously vary in gradation.

If a measurement target is irradiated with two-dimensional pattern light, the discontinuity or distortion of the pattern depending on the surface undulation or the shape of the measurement target can be observed. In the case of using the edge pattern light, the discontinuity corresponds to an edge positional deviation. In the case of using the sine wave pattern light, the distortion corresponds to a phase deviation.

In the case of using the edge pattern light, the principle of triangulation is usable to estimate the distance of a measurement target in the depth direction based on an edge positional deviation. Therefore, the accuracy of edge recognition for accurately recognizing an edge position has influence on the accuracy of the distance of the measurement target in the depth direction.

Similarly, in the case of using the sine wave pattern light, the principle of triangulation is usable to estimate the distance of a measurement target in the depth direction based on a phase deviation. Therefore, the accuracy of gradation recognition for accurately recognizing a phase (i.e., gradation) has influence on the accuracy of the distance of the measurement target in the depth direction.

In the edge recognition, an edge position can be recognized based on a luminance difference in the binary gradation or a luminance change process. It can be regarded that the luminance continuously varies in a transitional area where the gradation of an edge portion reverses. An unintended luminance change of two-dimensional pattern light randomly changes the route of the above-described transitional luminance change or the position where the gradation saturates.

Therefore, an unintended luminance change (luminance unevenness) of two-dimensional pattern light may occur and the generated luminance change may decrease the accuracy of the edge recognition. Similarly, the luminance change (luminance unevenness) of two-dimensional pattern light may decrease the accuracy of the gradation recognition.

As discussed in Japanese Patent Application Laid-Open No. 06-242020, there is a conventional technique capable of suppressing the above-described luminance change (luminance unevenness) of a two-dimensional pattern. When an illumination device is placed obliquely on one side of a surface to be inspected, the intensity of reflection light and a charge-coupled device (CCD) output do not become uniform even if the surface to be inspected is a uniform surface.

To solve this problem, the technique discussed in Japanese Patent Application Laid-Open No. 06-242020 changes an emission intensity ratio of illumination light based on a distance ratio of both ends of the surface to be inspected relative to a light emission face of the illumination device.

However, according to the technique discussed in Japanese Patent Application Laid-Open No. 06-242020, the setup position of the illumination device is variable relative to the surface to be inspected, while the position of a CCD camera is fixed in position relative to the surface to be inspected.

As described above, according to the technique discussed in Japanese Patent Application Laid-Open No. 06-242020, the CCD camera is fixed in position and, therefore, that technique is not robust against the lack in light quantity or deterioration of image, which may derive from occlusion or the spatial position of the illumination device.

Similarly, due to its inherent configuration, the technique discussed in Japanese Patent Application Laid-Open No. 06-242020 cannot correct a luminance change derived from the positional relationship in an imaging system, although it is effective to correct a luminance change derived from the positional relationship in an illumination system.

SUMMARY OF THE INVENTION

Exemplary embodiments of the present invention are directed to a technique capable of accurately performing three-dimensional measurement based on captured images in a case where a positional relationship between an illumination system and a measurement target and a positional relationship between an imaging system and the measurement target are both variable.

According to an aspect of the present invention, a measurement system includes an illumination unit configured to irradiate a measurement target with illumination light, an illumination control unit configured to control an operation of the illumination unit, an imaging unit configured to capture an image of light reflected by or transmitted through the measurement target, an imaging control unit configured to control an operation of the imaging unit, an acquisition unit configured to acquire positional relationship information representing a positional relationship between the illumination unit and the measurement target and a positional relationship between the imaging unit and the measurement target, and a correction unit configured to correct a luminance of at least one of the illumination light emitted by the illumination unit and the image captured by the imaging unit based on the positional relationship information in such a way as to correct a luminance change of the measurement target image captured by the imaging unit, wherein at least two of the measurement target, the illumination unit, and the imaging unit are variable in spatial position.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a functional block diagram illustrating an example configuration of the three-dimensional measurement system according to the first exemplary embodiment of the present invention.

FIG. 4 is a flowchart illustrating example processing that can be performed by the three-dimensional measurement system according to the first exemplary embodiment of the present invention.

FIG. 11 is a functional block diagram illustrating an example configuration of a luminance correction unit according to the first exemplary embodiment of the present invention.

FIGS. 22A and 22B are functional block diagrams illustrating an example configuration of the illumination control unit according to the third exemplary embodiment of the present invention.

DESCRIPTION OF THE EMBODIMENTS

Various exemplary embodiments, features, and aspects of the invention will be described in detail below with reference to the drawings.

Figure 1:
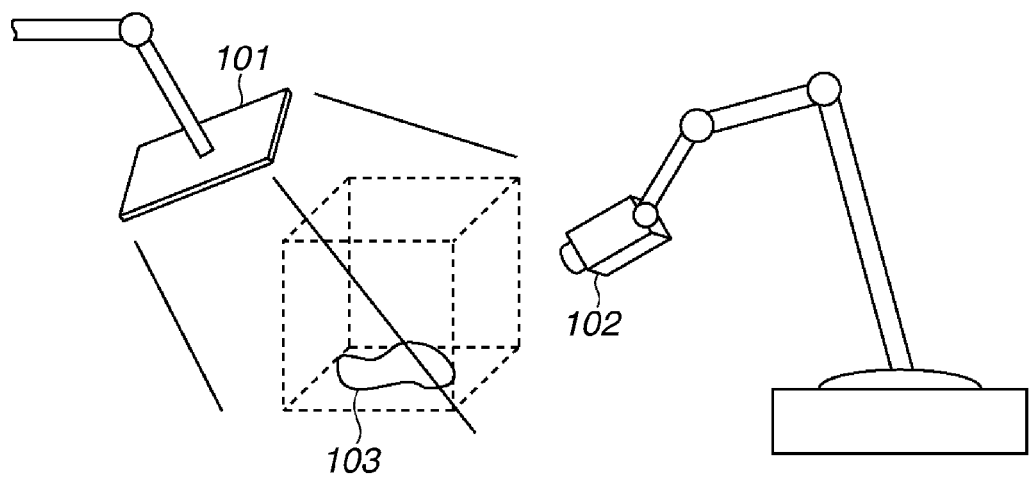
FIG. 1 illustrates a schematic configuration of a three-dimensional measurement system according to a first exemplary embodiment of the present invention.

FIG. 1 illustrates an example of a schematic configuration of a three-dimensional measurement system according to a first exemplary embodiment of the present invention. The three-dimensional measurement system is a measurement system that performs a three-dimensional measurement operation for each target component or part, for example, to be picked up or assembled by a robot hand that is located in the vicinity of a manufacturing line conveying components or parts in a factory. The three-dimensional measurement system includes an illumination system 101 and an imaging system 102.

The illumination system 101 is functionally operable to irradiate a measurement target 103 with two-dimensional pattern light. The illumination system 101 is, for example, a compact projector. The imaging system 102 is functionally operable to capture an image of the two-dimensional pattern light projected on the measurement target 103. The imaging system 102 is, for example, a charge coupled device (CCD) camera or a complementary metal oxide semiconductor (CMOS) camera.

It is desired that the illumination system 101 and the imaging system 102 are sufficiently compact and lightweight so that each system can be mounted on a robot arm. The measurement target 103 is a target to be measured in the three-dimensional measurement operation. In the present exemplary embodiment, the measurement target 103 is a target component or part to be picked up or assembled. In the present exemplary embodiment, at least two of the illumination system 101, the imaging system 102, and the measurement target 103 are mutually variable in spatial position.

In FIG. 1, it is presumed that the measurement target 103 is a diffuse reflective object or a specular object. However, the measurement target 103 can be a transparent object that transmits two-dimensional pattern light. In the present exemplary embodiment, the imaging system 102 is located at a position where transmitted light can be captured. Although a working robot hand is not illustrated in FIG. 1, if an available working space is limited, it is desired that the working robot hand is integrally formed with the robot arm with the illumination system 101 or the imaging system 102 mounted thereon.

Further, in FIG. 1, the illumination system 101 and the imaging system 102 are mounted on different robot arms. However, the illumination system 101 and the imaging system 102 can be mounted on the same robot arm.

FIG. 2 is a functional block diagram illustrating an example configuration of the three-dimensional measurement system according to the present exemplary embodiment. The three-dimensional measurement system includes an illuminator unit 201, an illumination control unit 202, an image capturing unit 203, an imaging control unit 204, a three-dimensional imaging processing unit 205, a three-dimensional measurement processing unit 206, a control unit 207, and a positional relationship information acquisition unit 208.

The illuminator unit 201 can emit two-dimensional pattern light toward the measurement target 103. More specifically, the illuminator unit 201 projects, on the measurement target 103, an edge pattern usable in a spatial coding method or a sine wave pattern usable in a phase shifting method, according to the pattern projection method. The pattern projection method is described below in more detail with reference to FIGS. 3A and 3B.

The illuminator unit 201 includes a light source 209, an illumination optical system 210, a spatial modulator 211, and a projection optical system 212. The light source 209 is, for example, a light-emitting diode (LED) or a laser diode (LD). The spatial modulator 211 is, for example, a thin film transistor (TFT) liquid crystal panel, a liquid crystal on silicon (LCOS) panel, or a scanning microelectromechanical system (MEMS) device.

The illumination control unit 202 can control an illumination pattern image (i.e., a two-dimensional pattern image that can be used in illumination) and can control the illuminator unit 201. More specifically, the illumination control unit 202 performs a luminance correction (i.e., an image correction) for an illumination pattern image having been input from an external device and also performs a drive control for the light source 209 or the spatial modulator 211 (i.e., the panel) according to the illumination pattern image.

The illumination pattern image is not limited to externally input data and can be any other data that can be, for example, generated according to an internal logic or can be read from an internal memory.

The image capturing unit 203 can capture an image of two-dimensional pattern light reflected by the measurement target 103. The actually captured two-dimensional pattern light may include an edge deviation or a phase deviation of the pattern, which is dependent on the shape or the surface undulation of the measurement target 103.

The image capturing unit 203 includes an imaging device 213 and an imaging optical system 214. The imaging device 213 is, for example, an image sensor such as a CCD sensor or a CMOS sensor. In the present exemplary embodiment, the measurement target 103 is a diffuse reflective object or a specular object. However, the measurement target 103 may be a transparent object that transmits two-dimensional pattern light.

The imaging control unit 204 can control the image capturing unit 203. More specifically, the imaging control unit 204 performs operational control for the imaging device 213 and operation timing control, such as shutter speed, frame rate, and region of interest (ROI).

The three-dimensional imaging processing unit 205 can acquire distance information relating to the measurement target 103 based on captured two-dimensional pattern light. More specifically, the three-dimensional imaging processing unit 205 can measure the distance of the measurement target 103 in the depth direction according to the pattern projection method.

Three-dimensional information relating to the measurement target 103 is obtainable based on distance information relating to the captured two-dimensional pattern light in the width direction and the height direction in addition to the "distance information relating to the measurement target 103 in the depth direction."

The three-dimensional measurement processing unit 206 can obtain measurement information (e.g., position, orientation, and three-dimensional shape) relating to the measurement target 103. The three-dimensional measurement processing unit 206 performs model fitting processing based on the "distance of the measurement target 103 in the depth direction" measured by the three-dimensional imaging processing unit 205 and the "image based on two-dimensional pattern light", to acquire measurement information (e.g., position, orientation, and three-dimensional shape) relating to the measurement target 103.

The acquired measurement information (e.g., three-dimensional shape, position, and orientation) relating to the measurement target 103 is usable in the control of a robot hand that performs a work for picking up or assembling parts.

The control unit 207 can perform integrated control for the illumination control unit 202 and the imaging control unit 204. More specifically, the control unit 207 is functionally operable to synchronously control illumination and imaging operations and is further functionally operable to transmit positional relationship information relating to the illumination system 101 and the imaging system 102 as information usable for the luminance correction.

In the present exemplary embodiment, the illumination system 101 is configured to perform the luminance correction. Therefore, the positional relationship information relating to the illumination system 101 and the imaging system 102 is transmitted from the positional relationship information acquisition unit 208 to the illumination control unit 202.

The positional relationship information acquisition unit 208 can acquire positional relationship information relating to the measurement target 103 and positional relationship information relating to the illumination system 101 and the imaging system 102 based on positional relationship information held by the robot arm.

Acquisition of the position and orientation information relating to a robot arm in the absolute coordinate system is feasible by performing calibration of the robot arm. A reference position can be arbitrarily set in the absolute coordinate system. It is desired that each coordinate position in a work area of the three-dimensional measurement system can be identified in the absolute coordinate system.

The illuminator unit 201 and the image capturing unit 203 are fixed to the robot arm. Therefore, acquisition of the calculating position and orientation information relating to the illuminator unit 201 and the image capturing unit 203 is feasible by acquiring the position and orientation information relating to the robot arm.

Further, acquisition of the positional information relating to the measurement target 103 in the absolute coordinate system is feasible by performing calibration of the three-dimensional measurement system. The positional relationship information relating to the illumination system 101 and the imaging system 102 represents position and orientation information defined in the absolute coordinate system being arbitrarily set. The positional relationship information relating to the measurement target 103 represents positional information defined in the above-described absolute coordinate system.

Further, as another expression representing the positional relationship information, the measurement target 103 can be designated as a reference position. More specifically, the positional relationship information relating to the illumination system 101 and the imaging system 102 can be expressed using radius information and argument (azimuth/polar angle) information defined in a spherical coordinate system having an origin positioned on the measurement target 103.

In the present exemplary embodiment, the above-described expression of the positional relationship information is employed (as described below in more detail with reference to FIG. 7). The positional relationship information relating to the illumination system 101 and the imaging system 102 can be sent via the control unit 207 to the illumination control unit 202 that performs luminance correction. The above-described functional units can realize three-dimensional measurement for the measurement target 103.

Figure 3A:
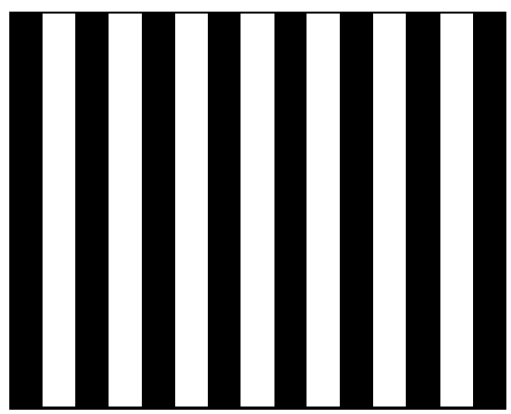
FIGS. 3A and 3B schematically illustrate examples of two-dimensional pattern light.
Figure 3B:
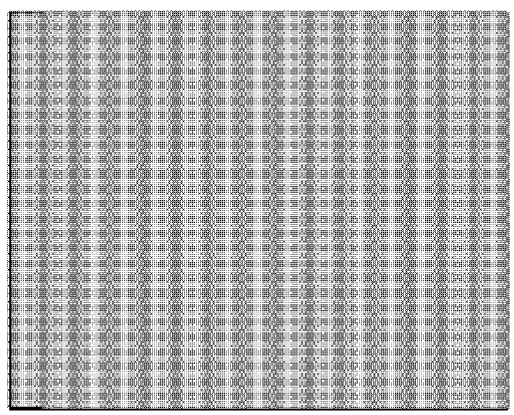

FIGS. 3A and 3B schematically illustrate examples of the two-dimensional pattern light that are usable in the three-dimensional measurement system. The method using two-dimensional pattern light to obtain the distance information relating to the measurement target 103 in the depth direction is referred to as the pattern projection method.

In general, the pattern projection method is characterized by projecting a plurality of edge patterns or same phase sine wave patterns. FIG. 3A illustrates an example of the edge pattern, which can be expressed using a binary gradation. FIG. 3B illustrates an example of the sine wave pattern.

If the measurement target 103 is irradiated with two-dimensional pattern light, the discontinuity or distortion of the pattern depending on the surface undulation or the shape of the measurement target 103 can be observed.

According to an edge pattern 301 illustrated in FIG. 3A, the discontinuity corresponds to an edge deviation. According to a sine wave pattern 302 illustrated in FIG. 3B, the distortion corresponds to a phase deviation.

In the case of using the edge pattern 301, the principle of triangulation is usable to estimate the distance of the measurement target 103 in the depth direction based on the edge deviation. The spatial coding method is usable in this estimation.

The spatial coding method for the estimation includes coding a monochrome pattern as binary information. The spatial coding method includes capturing a plurality of projection images that differ in coding method (i.e., differ in arrangement of monochrome pattern) and estimating the distance of the measurement target 103 in the depth direction based on edge information obtained from respective captured images.

Similarly, in the case of using the sine wave pattern 302, the principle of triangulation is usable to estimate the distance of the measurement target 103 in the depth direction based on the phase deviation. The phase shifting method is useable in this estimation.

The phase shifting method in this case includes capturing a plurality of projection images that differ in phase shifting of the sine wave pattern 302 and estimating the distance of the measurement target 103 in the depth direction based on the phase information obtained from respective captured images.

In calculating the distance of the measurement target 103 in the depth direction, the edge information is used in the case of employing the spatial coding method and the phase information is used in the case of employing the phase shifting method. Therefore, the accuracy of distance information relating to the measurement target 103 in the depth direction has great influence on the accuracy of the edge information or the phase information.

In the edge recognition to be performed by the three-dimensional imaging processing unit 205, an edge position can be recognized based on a luminance difference in the binary gradation or a luminance change process between binary gradations.

In the phase recognition to be performed by the three-dimensional imaging processing unit 205, a continuous phase change can be recognized.

The continuous phase change is a continuous luminance change, i.e., a gradation change. The edge accuracy of the edge pattern 301 and the gradation accuracy of the sine wave pattern 302 are sensitive against a luminance change and, therefore, are important parameters that have influence on the accuracy of distance information relating to the measurement target 103 in the depth direction.

FIG. 4 is a flowchart illustrating an example of the processing that can be performed by the three-dimensional measurement system according to the present exemplary embodiment.

In step S401, the control unit 207 establishes a communication path to communicate with the illumination control unit 202, which controls the illumination system 101, as well as a communication path to communicate with the imaging control unit 204, which controls the imaging system 102.

Next, in step S402, the three-dimensional measurement system performs calibration of the positional relationship information relating to the illumination system 101 and the imaging system 102. More specifically, the positional relationship information acquisition unit 208 transmits the positional relationship information relating to the illumination system 101 and the imaging system 102 to the illumination control unit 202 via the control unit 207.

The positional relationship information transmitted in this case is usable in luminance correction processing to be performed in step S403. The accuracy of the positional relationship information has influence on the accuracy of the luminance correction to be performed by the illumination control unit 202. Therefore, it is desired that the positional relationship information used in the calibration is identical to the positional relationship information used in the three-dimensional measurement processing.

However, if the positional relationship information relating to the illumination system 101 and the imaging system 102 used in the calibration is different from the positional relationship information used in the three-dimensional measurement, for example, when the system performs the three-dimensional measurement processing while operating a robot arm, it is desired to use positional relationship information reflecting a predicted movement.

Next, in step S403, the illumination control unit 202 performs luminance correction processing on an illumination pattern image based on the positional relationship information relating to the illumination system 101 and the imaging system 102. Example luminance correction processing is described below in more detail with reference to FIG. 7 through FIGS. 13A and 13B.

Next, in step S404, the illuminator unit 201 irradiates the measurement target 103 with two-dimensional pattern light. According to the spatial coding method, the illuminator unit 201 emits two-dimensional pattern light of a plurality of edge patterns 301. According to the phase shifting method, the illuminator unit 201 emits two-dimensional pattern light of the same phase sine wave patterns 302 (see FIGS. 3A and 3B).

Next, in step S405, the image capturing unit 203 captures an image of the two-dimensional pattern light diffused and reflected by the measurement target 103. The actually captured two-dimensional pattern light may include an edge deviation or a phase deviation of the pattern, which is dependent on the shape or the surface undulation of the measurement target 103.

Next, in step S406, the three-dimensional imaging processing unit 205 performs three-dimensional imaging processing. More specifically, the three-dimensional imaging processing unit 205 acquires distance information relating to the measurement target 103 in the depth direction, based on the captured two-dimensional pattern light, according to the pattern projection method.

Further, the three-dimensional imaging processing unit 205 acquires three-dimensional information relating to the measurement target 103 based on the acquired distance information in addition to two-dimensional pattern light image information in the width direction and the height direction.

In step S407, the three-dimensional imaging processing unit 205 updates the three-dimensional information. The spatial coding method and the phase shifting method are not different in capturing a plurality of two-dimensional pattern light images to acquire three-dimensional information. The update processing in step S407 is repetitively performed every time each two-dimensional pattern light image is obtained.

In the case of employing the spatial coding method, the three-dimensional measurement system repetitively performs the loop processing of steps S403 to S407 using a plurality of images that are different in code pattern. The result of three-dimensional imaging processing performed for each code pattern is usable in the update of the three-dimensional information performed in step S407.

The accuracy of the three-dimensional measurement can be improved by repeating the above-described loop processing (by increasing the number of times of the loop processing); namely, by using the result of the three-dimensional imaging processing performed for each of the plurality of images that are different in code pattern.

Next, in step S408, the three-dimensional imaging processing unit 205 determines whether the acquisition of the three-dimensional information has been completed. In fact, the spatial coding method and the phase shifting method are not different in that the number of images to be captured is determined beforehand.

Therefore, the three-dimensional measurement system repeats the processing loop of steps S403 to S407 by the number of times corresponding to the number of images to be captured. If it is determined that the acquisition of the three-dimensional information has been completed (YES in step S408), the processing proceeds to step S409. If it is determined that the acquisition of the three-dimensional information has not been completed (NO in step S408), the processing returns to step S403.

In step S5409, the three-dimensional measurement processing unit 206 performs three-dimensional measurement processing. More specifically, the three-dimensional measurement processing unit 206 performs model fitting processing based on distance information relating to the measurement target 103 in the depth direction, which can be measured by the three-dimensional imaging processing unit 205, and the two-dimensional pattern light image, to acquire measurement information (e.g., position, orientation, and three-dimensional shape) relating to the measurement target 103.

The measurement information (e.g., three-dimensional shape, position, and orientation) relating to the measurement target 103, i.e., the information acquired through the above-described processing illustrated in FIG. 4, is usable in the control of a robot hand that performs a work for picking up or assembling parts.

Figure 5:
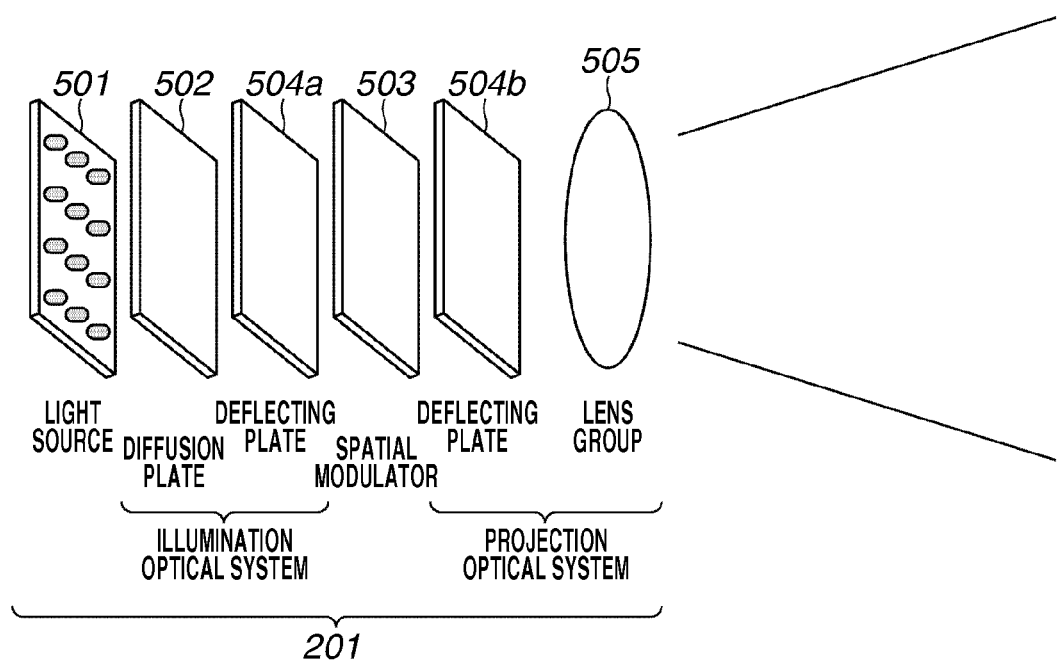
FIG. 5 illustrates an example configuration of an illuminator unit according to the first exemplary embodiment of the present invention.

FIG. 5 illustrates another example configuration of the illuminator unit 201 included in the three-dimensional measurement system. Compared to the illuminator unit 201 illustrated in FIG. 2, which includes a reflection-type panel, the illuminator unit 201 illustrated in FIG. 5 is different in that a transmission-type panel is included. FIG. 5 simply illustrates a physical configuration relating to the propagation path of light.

The illuminator unit 201 includes a light source 501, a diffusion plate 502, a spatial modulator 503, two deflecting plates 504a and 504b, and a lens group 505. The light source 501 is composed of a plurality of LEDs or LDs. The diffusion plate 502 plays a role of uniformly maintaining in-plane luminance by eliminating unevenness of a light emitting surface of the light source 501. The spatial modulator 503 is, for example, constructed by a transmission-type TFT (thin-film transistor) liquid crystal panel.

The spatial modulator 503 expresses the illumination pattern image of the two-dimensional pattern light. Therefore, the features (e.g., resolution, pixel size, and pixel pitch) of the TFT liquid crystal panel have influence on the accuracy of the two-dimensional pattern light.

The deflecting plates 504a and 504b are positioned in front of and behind the spatial modulator 503 (i.e., the transmission-type TFT liquid crystal panel) to control a polarization state. The lens group 505 has influence on parameters (e.g., modulation transfer function (MTF), depth of field characteristics, and distortion) of the two-dimensional pattern light.

Figure 6:
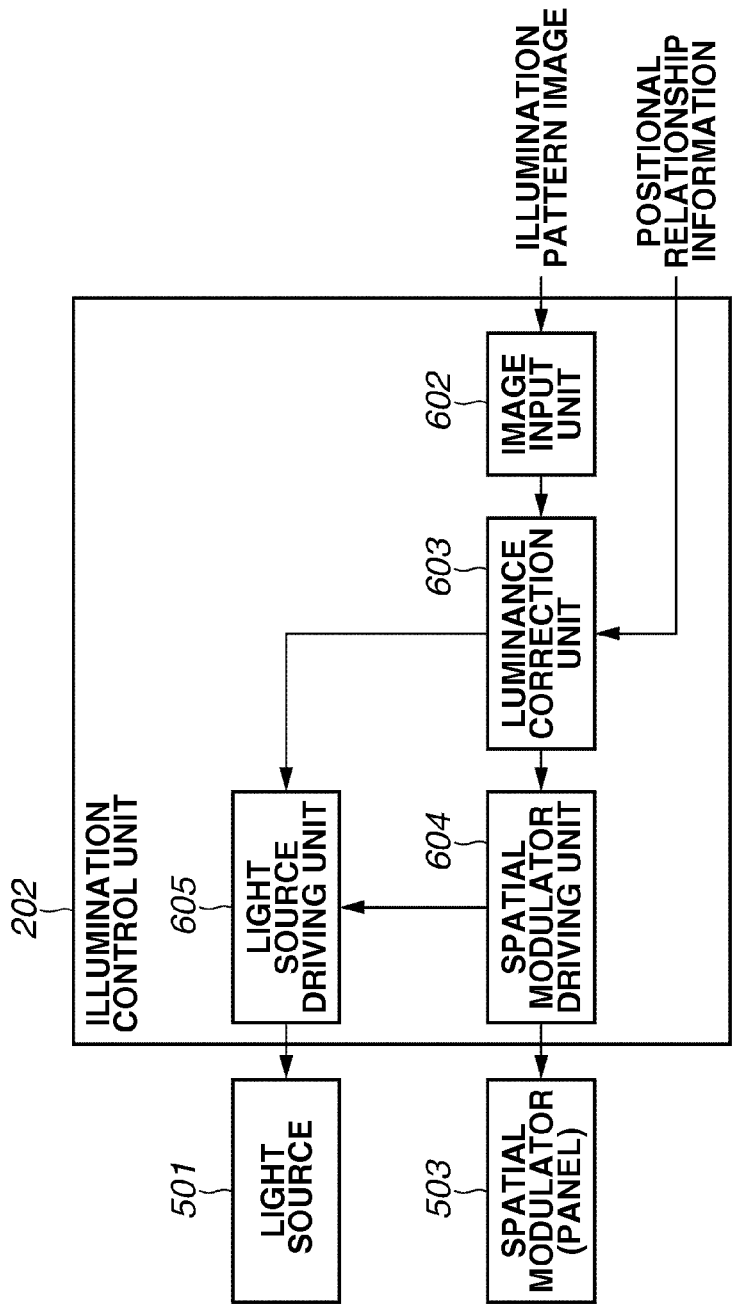
FIG. 6 is a functional block diagram illustrating an example configuration of an illumination control unit according to the first exemplary embodiment of the present invention.

FIG. 6 is a functional block diagram illustrating an example configuration of the illumination control unit 202 provided in the illumination system 101 of the three-dimensional measurement system. The illumination control unit 202 includes an image input unit 602, a luminance correction unit 603, a spatial modulator driving unit 604, and a light source driving unit 605.

The image input unit 602 can change the format of an illumination pattern image input in the illumination control unit 202 according to each interface. When the improvement in measurement accuracy and measurement speed is taken into consideration, the image input unit 602 is required to have higher resolution and higher frame rate. Therefore, it is desired that the image input unit 602 is an interface having large-capacity transmission capability. A desired interface is, for example, a metal cable (e.g., USB or IEEE1394) or an optical fiber.

The luminance correction unit 603 can correct a luminance change of the illumination pattern image. The luminance correction unit 603 receives the positional relationship information relating to the illumination system 101 and the imaging system 102 (i.e., radius information and argument information described below in more detail) from the control unit 207.

The luminance correction unit 603 performs luminance correction processing on the illumination pattern image based on the above-described information. The luminance correction schematically includes gradation conversion of an illumination pattern (i.e., luminance distribution correction) and intensity conversion for the light source 501 (i.e., luminance intensity correction).

The luminance correction unit 603 outputs a luminance corrected illumination pattern image to the spatial modulator driving unit 604. Further, the luminance correction unit 603 outputs a light source modulation signal usable to modulate the intensity of the light source 501 to the light source driving unit 605.

The luminance correction is described below in more detail with reference to FIG. 7 to FIGS. 13A and 13B.

The spatial modulator driving unit 604 can control a driving operation of the spatial modulator 503. The spatial modulator driving unit 604 generates a drive signal to be supplied to the spatial modulator 503 based on an "image signal representing an illumination pattern image" received from the luminance correction unit 603. Further, when the illumination control unit 202 performs time control for driving the light source 501, the spatial modulator driving unit 604 generates a trigger signal, such as a pulse width modulation (PWM) signal to be used for the time control, and outputs the generated trigger signal to the light source driving unit 605.

The light source driving unit 605 can control a driving operation of the light source 501. More specifically, the light source driving unit 605 generates a drive signal whose intensity is modulated based on the light source modulation signal received from the luminance correction unit 603. Further, when the illumination control unit 202 performs time control for driving the light source, the light source driving unit 605 generates a drive signal based on the PWM signal. The light source 501 includes LDs or LEDs. Using the constant current to drive the light source 501 is useful because light output control can be stabilized and the device can be prevented from being damaged.

Figure 7:
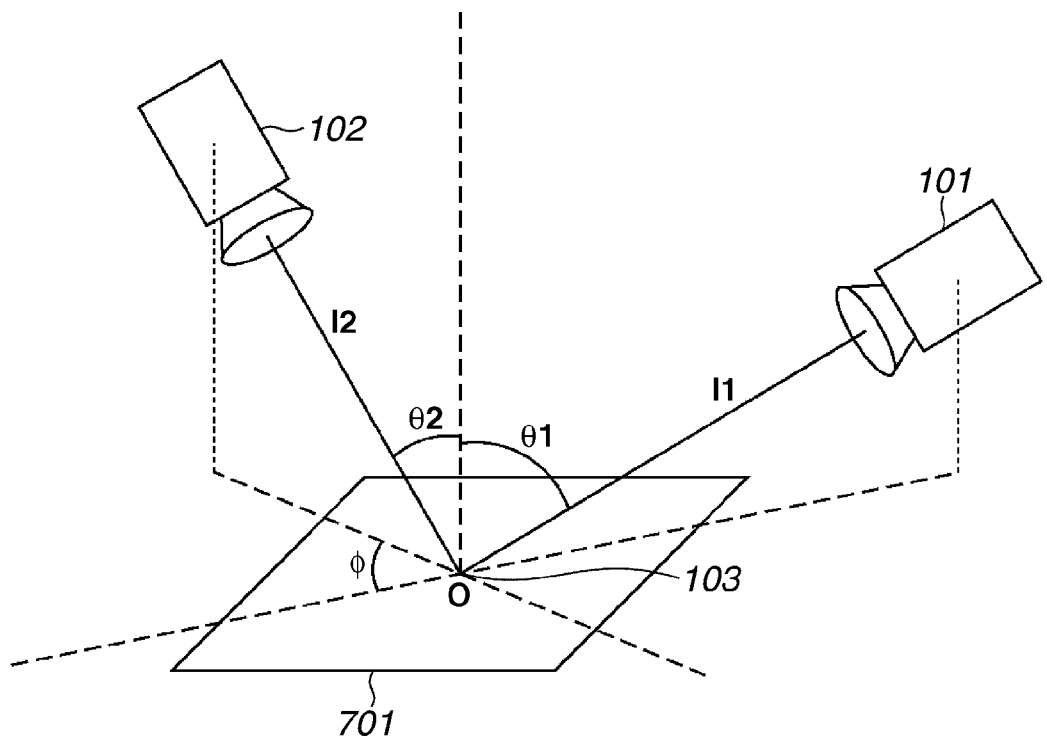
FIG. 7 illustrates positional relationship information that can be used in luminance correction.

FIG. 7 illustrates example positional relationship information that can be used in the luminance correction. In FIG. 7, it is presumed that the measurement target 103 is a diffuse reflective object or a specular object. However, the measurement target 103 can be a transparent object that transmits two-dimensional pattern light. In the following description, if the measurement target 103 is a transparent object transmitting two-dimensional pattern light, the terminology "reflectance" should be replaced with "transmissivity."

In the present exemplary embodiment, the positional relationship information relating to the illumination system 101 and the imaging system 102 is expressed as relative positional relationship information defined with respect to a measurement surface 701 (i.e., the reference position) on which the measurement target 103 is disposed.

When the employed coordinate system is a spherical coordinate system having the origin positioned on a point where the optical axis of the illumination system 101 intersects with the measurement surface 701, the position and the orientation of the illumination system 101 can be defined using a radius vector (radius) l1, an azimuth angle (argument) φ, and a polar angle (argument) θ1.

Similarly, when the employed coordinate system is a spherical coordinate system having the origin positioned on a point where the optical axis of the imaging system 102 intersects with the measurement surface 701, the position and the orientation of the imaging system 102 can be defined using a radius vector l2, the azimuth angle φ, and a polar angle θ2.

The measurement target 103 is a common object irradiated by the illumination system 101 and imaged by the imaging system 102. Therefore, the point where the optical axis of the illumination system 101 intersects with the measurement surface 701 substantially coincides with the point where the optical axis of the imaging system 102 intersects with the measurement surface 701.

The positional relationship information relating to the illumination system 101 used in the luminance correction includes radius vector l1, azimuth angle φ, and polar angle θ1. Similarly, the positional relationship information relating to the imaging system 102 includes radius vector l2, azimuth angle φ, and the polar angle θ2.

Further, radius vectors l1 and l2 are parameters usable to correct the luminance intensity, and azimuth/polar angles φ, θ1, and θ2 are parameters usable in correction of the luminance distribution.

In the present exemplary embodiment, the positional relationship information including the above-described parameters (i.e., radius vectors l1 and l2 and azimuth/polar angles φ, θ1, and θ2) is employable to implement the luminance correction in the three-dimensional measurement system.

FIGS. 8A to 8C and FIGS. 9A and 9B illustrate examples of the luminance distribution correction. In the present exemplary embodiment, for the purpose of mainly describing the luminance distribution correction, it is presumed that the reflectance of the measurement surface 701 is 100% and the influence of the luminance intensity is eliminable.

The parameters to be used in the luminance distribution correction are azimuth/polar angles φ, θ1, and θ2. Therefore, the luminance distribution correction can be considered as being independent of the luminance intensity correction.

Figure 8A:
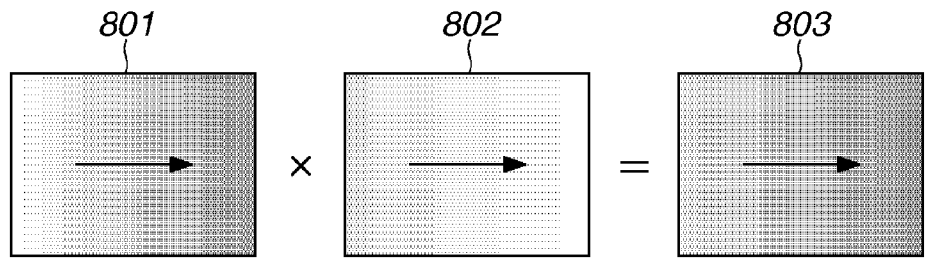
FIGS. 8A to 8C illustrate an example luminance distribution correction in a case where the optical axis of an illumination system coincides with the optical axis of an imaging system when they are projected on a surface to be inspected.
Figure 8B:
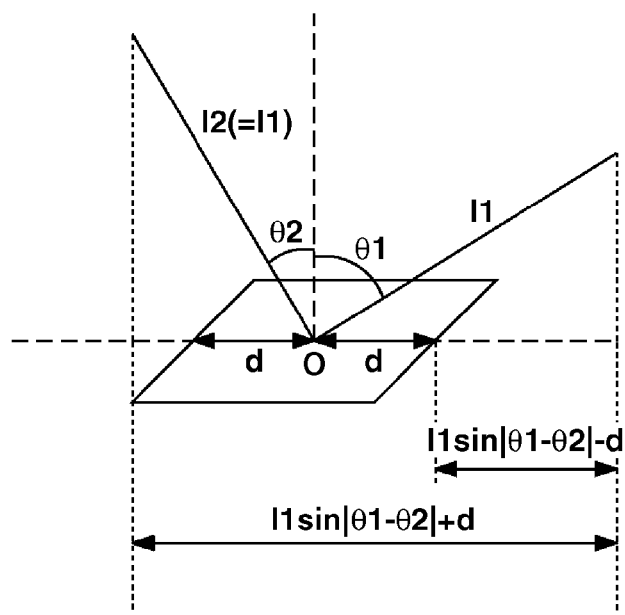
Figure 8C:
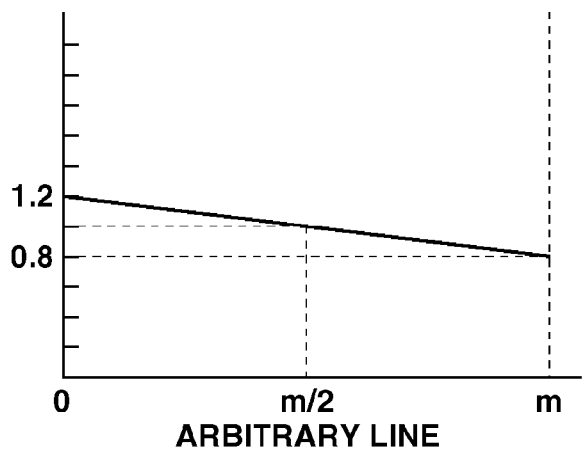

FIGS. 8A to 8C illustrate an example of the luminance distribution correction in a case where the optical axis of the illumination system 101 coincides with the optical axis of the imaging system 102 when they are projected on the measurement surface 701.

More specifically, FIG. 8A illustrates an example correction of the luminance distribution. FIG. 8B illustrates a positional relationship between the illumination system 101 in FIG. 2, the imaging system 102 in FIG. 2, and the measurement surface 701 in FIG. 7. FIG. 8C illustrates an example distribution (inclination) of luminance along an arbitrary line of a luminance corrected illumination pattern image.

In this case, the positional relationship information is presumed to satisfy the conditions $\phi=0°$ and $l1=l2$. A luminance distribution 801 can be obtained on the spatial modulator 503 in a case where only the polar angle $\theta1$ of the illumination system 101 is taken into consideration to perform the correction on the assumption that $\theta2=0°$.

An arrow illustrated in FIG. 8A indicates an altitudinal gradient of the luminance. The magnitude of the luminance decreases along the direction indicated by the arrow.

In this case, the luminance at one edge of the measurement surface 701 positioned adjacent to the illumination system 101 is set to be lower. The luminance at the other edge of the measurement surface 701 positioned far from the illumination system 101 is set to be higher. Thus, the imaging system 102 can capture an illumination pattern image that is uniform in luminance.

Similarly, a luminance distribution 802 can be obtained on the spatial modulator 503 in a case where only the polar angle $\theta2$ of the imaging system 102 is taken into consideration to perform the correction on the assumption that $\theta1=0°$.

In this case, the luminance at one edge of the spatial modulator 503 positioned adjacent to the spatial modulator 503 of the imaging system 102 is set to be lower. The luminance at the other edge of the spatial modulator 503 positioned far from the spatial modulator 503 of the imaging system 102 is set to be higher.

A luminance distribution 803 can be obtained on the spatial modulator 503 in a case where both the polar angle $\theta1$ of the illumination system 101 and the polar angle $\theta2$ of the imaging system 102 are taken into consideration to perform the luminance correction. The luminance distribution 803 is obtainable by multiplying the luminance distribution 801 with the luminance distribution 802.

The luminance inclination along each line of an illumination pattern image is changeable according to angular characteristics of the illumination system 101 and the imaging system 102. When angular characteristics with respect to the intensity of light emitted by the illumination system 101 linearly changes according to a change of the polar angle $\theta1$, linear interpolation is available to obtain the luminance inclination along each line of an illumination pattern image.

Further, when angular characteristics with respect to the intensity of light received by the imaging system 102 linearly changes according to a change of the polar angle $\theta2$, linear interpolation is available to obtain the luminance inclination along each line of an illumination pattern image.

In FIGS. 8A to 8C, the intensity of light emitted by the illumination system 101 and the intensity of light received by the imaging system 102 are similar to each other in that the angular characteristics linearly change at the same change rate. The luminance in this case inclines in proportion to $(l1 \times \sin|\theta1-\theta2|-d)/(l1 \times \sin|\theta1-\theta2|+d)$, in which $l1=l2$.

Figure 9A:
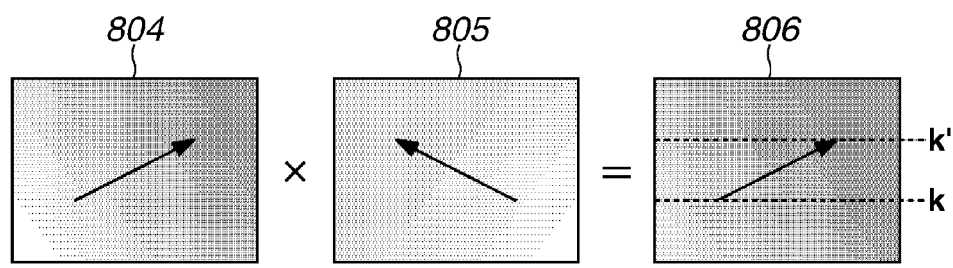
FIGS. 9A and 9B illustrate an example luminance distribution correction in a case where the optical axis of the illumination system does not coincide with the optical axis of the imaging system when they are projected on the surface to be inspected.
Figure 9B:
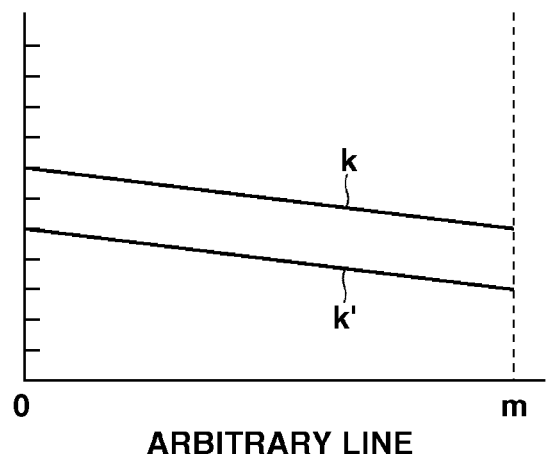

FIGS. 9A and 9B illustrate an example of the luminance distribution correction in a case where the optical axis of the illumination system 101 does not coincide with the optical axis of the imaging system 102 when they are projected on the measurement surface 701. More specifically, FIG. 9A illustrates an example correction of the luminance distribution. FIG. 9B illustrates an example distribution (i.e., inclination) of luminance along an arbitrary line k and k' of a luminance corrected illumination pattern image.

In this case, the positional relationship information is presumed to satisfy the conditions $\phi \neq 0°$ and $l1=l2$.

According to the example illustrated in FIGS. 8A to 8C, the luminance distribution gradually changes along a direction perpendicular to or a direction parallel to one side of the surface. On the other hand, the example illustrated in FIGS. 9A and 9B is characteristic in that the luminance distribution gradually changes along a direction inclined relative to one side of the surface.

Luminance distributions 804, 805, and 806 correspond to the luminance distributions 801, 802, and 803, respectively. As $\phi \neq 0$, the luminance distributions 804 to 806 respectively change along an oblique line.

Figure 10A:
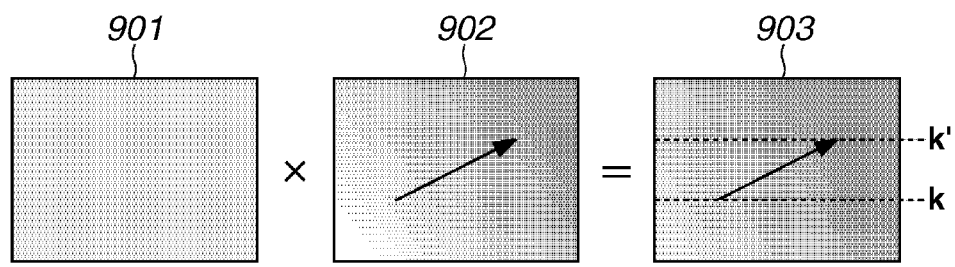
FIGS. 10A and 10B illustrate an example luminance correction of an illumination pattern image, in which both the luminance distribution and the luminance intensity are taken into consideration.
Figure 10B:
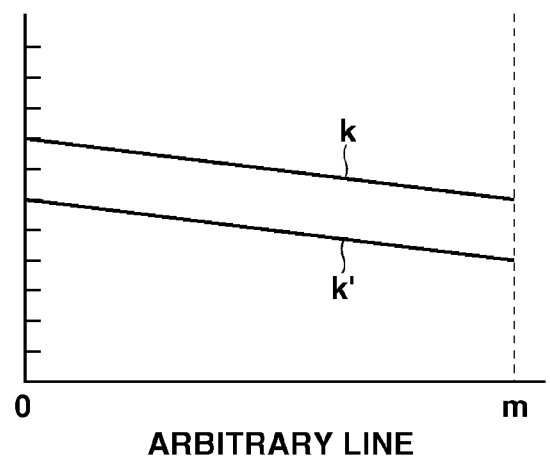

FIGS. 10A and 10B illustrate an example of the luminance correction performed on an illumination pattern image, in which both the luminance distribution and the luminance intensity are taken into consideration. More specifically, FIG. 10A illustrates an example correction of the luminance distribution. FIG. 10B illustrates an example distribution (i.e., inclination) of luminance along an arbitrary line k and k' of a luminance-corrected illumination pattern image.

According to the example illustrated in FIGS. 10A and 10B, an influence of luminance intensity correction is added to the luminance distribution correction described above with reference to FIGS. 8A to 8C and FIGS. 9A and 9B. The parameters to be used in the luminance intensity correction are radius vectors $l1$ and $l2$. Therefore, the luminance distribution correction can be considered as being independent of the luminance intensity correction.

A luminance distribution 901 can be obtained on the spatial modulator 503 in a case where not only radius information but also the reflectance of the measurement target 103 is taken into consideration to perform the correction on the assumption that $\phi=0°$ and $\theta1=\theta2=0°$. The luminance distribution 901 is uniform.

In this case, it is presumed that the illumination system 101 and the imaging system 102 do not physically interfere with each other. Further, an arrow illustrated in FIG. 10A indicates an altitudinal gradient of the luminance. The magnitude of the luminance decreases along the direction indicated by the arrow.

A value used in the luminance intensity correction can be, for example, obtained by multiplying a light quantity attenuation rate per unit area inversely proportional to the square of the radius vector $l1$ of the illumination system 101, the reflectance of the measurement target 103, and a light quantity attenuation rate per unit area inversely proportional to the square of the radius vector $l2$ of the imaging system 102.

The above-described value (i.e., the light quantity attenuation rate of the system) is then compared with a reference light quantity attenuation rate. A ratio obtained by the comparison is used to control the luminance intensity.

A luminance distribution 902, which is a luminance distribution corrected based on argument information, corresponds to the luminance distribution 803 illustrated in FIG. 8A and the luminance distribution 806 illustrated in FIG. 9A.

A luminance distribution 903 can be obtained on the spatial modulator 503 in a case where not only the positional relationship information relating to the illumination system 101 and the imaging system 102 but also the reflectance of the measurement target 103 is taken into consideration to perform the correction. The luminance distribution 903 is obtainable by multiplying the luminance distribution 901 by the luminance distribution 902.

The luminance intensity correction is made to change according to distance characteristics of the illumination system 101 and the imaging system 102. In a case where distance characteristics with respect of the intensity of light emitted by the illumination system 101 is inversely proportional to the square of the radius vector l1 and angular characteristics with respect to the intensity of light received by the imaging system 102 is inversely proportional to the square of a change of the radius vector l2, the luminance intensity correction is made to change in proportion to (l1/L1)×(l2/L2).

In the above-described formula, L1 and L2 represent reference lengths of the radius vectors l1 and l2, which are usable when the reference light quantity attenuation rate is obtained.

FIG. 11 is a functional block diagram illustrating an example configuration of the luminance correction unit 603. The luminance correction unit 603 includes a gradation conversion unit 1001, a positional relationship information storing unit 1002, a radius information processing unit 1003, an argument information processing unit 1004, a luminance correction value generation processing unit 1005, a static luminance correction value storing unit 1006, a gradation data storing unit 1007, and a light source modulation signal generation unit 1008.

The gradation conversion unit 1001 can perform gradation conversion processing by converting the gradation of an illumination pattern image input in the luminance correction unit 603. The gradation data storing unit 1007 stores a gradation table of registered correction values corresponding to all pixels.

The gradation conversion unit 1001 performs the gradation conversion processing referring to the gradation table stored in the gradation data storing unit 1007. Alternatively, the gradation conversion unit 1001 can perform the gradation conversion processing referring to the gradation table stored in the gradation data storing unit 1007 and an algorithm, such as nearest neighbor approximation, linear interpolation, cubic interpolation, or higher-order curve interpolation.

To reduce a memory capacity required for the table in the above-described conversion, it is desired that the gradation table stores a reduced number of gradation data in increments of several pixels and the gradation conversion unit 1001 uses an appropriate algorithm to calculate numerical values representing the gradation of all pixels.

It is desired to determine the gradation table and the algorithm to be employed considering a combination of gradation conversion accuracy, memory amount, and calculation amount.

In this case, the gradation table stores the gradation data representing a gradation change replaced from the luminance change state schematically illustrated by the luminance distribution 903 in FIG. 10A. The luminance correction unit 603 outputs a gradation-converted illumination pattern image to the spatial modulator driving unit 604.

The positional relationship information storing unit 1002 can store positional relationship information having been input to the luminance correction unit 603. More specifically, the positional relationship information storing unit 1002 stores coordinate information (e.g., radius vectors l1 and l2 and azimuth/polar angles $\phi$, $\theta 1$, and $\theta 2$) relating to the illumination system 101 and the imaging system 102.

The radius information processing unit 1003 can process radius information (i.e., radius vectors l1 and l2) read from the positional relationship information storing unit 1002. The argument information processing unit 1004 can process azimuth/polar information (i.e., azimuth/polar angles $\phi$, $\theta 1$, and $\theta 2$) read from the positional relationship information storing unit 1002.

The radius information processing unit 1003 can calculate a luminance intensity correction value based on the radius information (i.e., radius vectors l1 and l2) and the reflectance of the measurement target 103. For example, the radius information processing unit 1003 can read and use a reflectance value stored beforehand considering the material of the measurement target 103.

First, the radius information processing unit 1003 calculates a light quantity attenuation rate of the system, which is a value obtainable by multiplying the light quantity attenuation rate per unit area inversely proportional to the square of the radius vector l1, the reflectance of the measurement target 103, and the light quantity attenuation rate per unit area inversely proportional to the square of the radius vector l2.

Then, the radius information processing unit 1003 calculates the luminance intensity correction value based on a comparison between the light quantity attenuation rate of the three-dimensional system and the reference light quantity attenuation rate.

The radius information processing unit 1003 performs control for increasing the luminance intensity in such a way as to increase the brightness if it is determined that the former is greater than the latter as a result of the above-described comparison.

On the other hand, the radius information processing unit 1003 performs control for decreasing the luminance intensity in such a way as to decrease the brightness if it is determined that the latter is greater than the former. The luminance intensity correction value is a constant value common to all pixels.

The argument information processing unit 1004 can calculate luminance distribution correction values based on argument information (e.g., azimuth/polar angles $\phi$, $\theta 1$, and $\theta 2$). The argument information processing unit 1004 calculates a luminance distribution change amount based on the polar angles $\theta 1$ and $\theta 2$ (see FIGS. 8A to 8C) and also calculates a luminance distribution in-plane inclination amount based on the azimuth angle $\phi$ (see FIGS. 9A and 9B).

If the polar angles $\theta 1$ and $\theta 2$ are adjacent to 90°, the luminance distribution change amount becomes smaller. If the polar angles $\theta 1$ and $\theta 2$ are adjacent to 0°, the luminance distribution change amount becomes larger. The argument information processing unit 1004 calculates the luminance distribution correction values based on the above-described data. The calculated luminance distribution correction values are storable as a table of correction values corresponding to all pixels.

To reduce a memory capacity required for the table of luminance distribution correction values, it is useful to obtain a simplified table storing a reduced number of correction values in increments of several pixels. In this case, the argument information processing unit 1004 can use an appropriate algorithm to calculate numerical values representing the correction values for all pixels.

The luminance correction value generation processing unit 1005 can generate a gradation table that can be stored in the gradation data storing unit 1007. First, the luminance correction value generation processing unit 1005 generates luminance distribution correction values by multiplying the luminance distribution correction values calculated by the argument information processing unit 1004 by static luminance correction values stored in the static luminance correction value storing unit 1006.

Then, the luminance correction value generation processing unit 1005 converts the luminance correction values obtained based on the luminance into a gradation table of gradation-based correction values reflecting the gradation of a pattern image.

For example, if the gradation of a pattern image is an 8-bit image, the luminance correction value generation processing unit 1005 generates an 8-bit gradation table. The gradation table generated in this case is a table of registered correction values corresponding to all pixels.

As described above, to reduce a memory capacity required for the gradation table, it is useful to obtain a simplified table storing a reduced number of correction values in increments of several pixels. In this case, the luminance correction value generation processing unit 1005 can use an appropriate algorithm to calculate numerical values representing correction values for the rest of the pixels.

The static luminance correction value storing unit 1006 can store a table usable to correct a static luminance change that does not derive from the positional relationship information. The static luminance change that does not derive from the positional relationship information is a luminance change that does not vary temporally.

The luminance change is derived from the luminance uniformity of a light-emitting device of the light source 501, the luminance unevenness of the diffusion plate 502 and the deflecting plate 504a provided in the illumination optical system, the spatial uniformity with respect to transmissivity of the spatial modulator 503, or the luminance unevenness of the deflecting plate 504b and the lens group 505 provided in the projection optical system.

The light source modulation signal generation unit 1008 can generate a light source modulation signal usable to modulate the intensity of the light source 501 based on the luminance intensity correction value received from the radius information processing unit 1003. The light source modulation signal generation unit 1008 outputs the generated light source modulation signal to the light source driving unit 605.

Further, the light source modulation signal generation unit 1008 can perform processing for compensating the dynamic range that may decrease in the gradation conversion processing in response to a control signal received from the luminance correction value generation processing unit 1005. An example of the above-described compensation processing is described below in more detail with reference to FIGS. 14A and 14B.

If the argument information processing unit 1004 and the luminance correction value generation processing unit 1005 have preliminarily stored look up tables, these look up tables are available for the above-described tables.

Whether to calculate correction values for all pixels, whether to store a reduced number of correction values in increments of several pixels and calculate numerical values representing correction values for the rest of the pixels, or whether to use look up tables can be appropriately selected considering the capacity of a usable memory or the obtainable correction accuracy.

Figure 12:
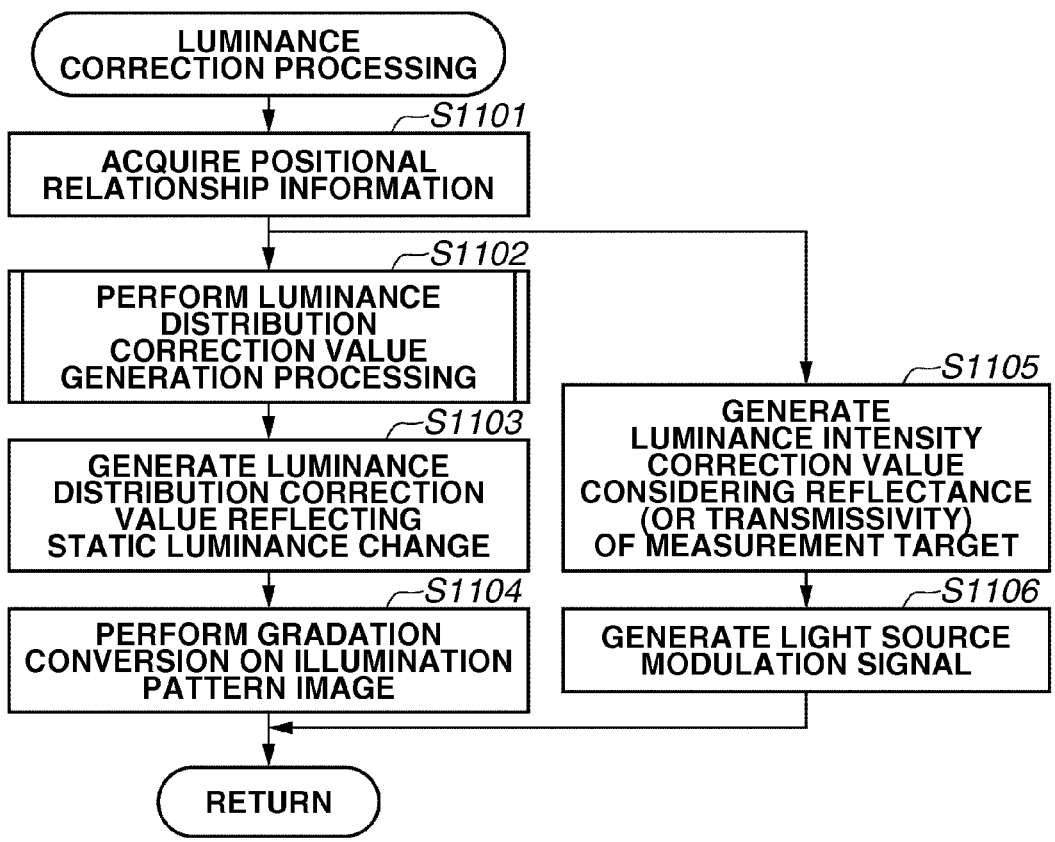
FIG. 12 is a flowchart illustrating details of luminance correction processing illustrated in FIG. 4.

FIG. 12 is a flowchart illustrating an example of the luminance correction processing to be performed in step S403 of FIG. 4.

In step S1101, the positional relationship information storing unit 1002 acquires positional relationship information.

When the positional relationship information acquisition unit 208 illustrated in FIG. 2 acquires and processes the positional relationship information relating to the measurement target 103 and the positional relationship information relating to the illumination system 101 and the imaging system 102, the acquired positional relationship information is stored in the positional relationship information storing unit 1002.

More specifically, the positional relationship information includes coordinate information (e.g., radius vectors l1 and l2, azimuth angle φ, and polar angles θ1 and θ2) relating to the illumination system 101 and the imaging system 102.

In step S1102, the argument information processing unit 1004 generates luminance distribution correction values (table). The argument information processing unit 1004 generates luminance distribution correction values derived from the positional relationship information using the coordinate information (e.g., radius vectors l1 and l2, azimuth angle φ, and polar angles θ1 and θ2) relating to the illumination system 101 and the imaging system 102 acquired in step S1101. The luminance distribution correction value table stores correction values corresponding to all pixels, which are dynamically variable depending on the azimuth/polar angles φ, θ1, and θ2.

In step S1103, the luminance correction value generation processing unit 1005 adds the influence of a static luminance change that does not derive from the positional relationship information to the luminance distribution correction values calculated in step S1102.

More specifically, the luminance correction value generation processing unit 1005 multiplies the luminance distribution correction values (table) by the table of registered static luminance correction values stored in the static luminance correction value storing unit 1006. The processing performed in step S1103 is for generating luminance distribution correction values in the three-dimensional measurement system.

In step S1104, the luminance correction value generation processing unit 1005 and the gradation conversion unit 1001 perform gradation conversion processing on an illumination pattern image.

More specifically, the luminance correction value generation processing unit 1005 generates a gradation table usable to perform the gradation conversion processing based on the luminance distribution correction values (table) generated in step S1102 and stores the generated gradation table in the gradation data storing unit 1007.

A simple method for generating the gradation table includes defining the luminance value of a pixel where the luminance becomes darkest due to the luminance change as a maximum luminance value and then converting the gradation of other pixels with reference to the maximum luminance value.

In this case, the dynamic range of the luminance decreases. Therefore, the method further includes performing the processing for securing the dynamic range as described below with reference to FIGS. 14A and 14B.

Then, the gradation conversion unit 1001 reads the gradation table from the gradation data storing unit 1007 and performs gradation conversion processing referring to the read gradation table. The processing result in step S1104 can be attained as a gradation conversion of an actual illumination pattern image performed by the spatial modulator 503.

In step S1105, the radius information processing unit 1003 generates a luminance intensity correction value considering the reflectance of the measurement target 103. More specifically, the radius information processing unit 1003 generates a luminance intensity correction value that is derived from the reflectance of the measurement target 103 and the positional relationship information, using the radius information (i.e., radius vectors l1 and l2) relating to the illumination system 101 and the imaging system 102 acquired in step S1101.

The luminance intensity correction value is a constant value common to all pixels, which is dynamically variable depending on the radius vectors l1 and l2. The processing performed in step S1105 is for generating a luminance intensity correction value in the three-dimensional measurement system.

In step S1106, the light source modulation signal generation unit 1008 generates a light source modulation signal. More specifically, the light source modulation signal generation unit 1008 generates a light source modulation signal usable when the light source modulation signal generation unit 1008 can modulate the light source intensity based on the luminance intensity correction value generated by the radius information processing unit 1003.

When the imaging system 102 captures an image of reflection light reflected by the measurement surface 701, the light source modulation signal generation unit 1008 modulates the intensity of the light source 501 so that the intensity of the light source 501 becomes constant. Further, as described below in more detail with reference to FIGS. 14A and 14B, the light source modulation signal generation unit 1008 performs processing for compensating the dynamic range that may decrease when the luminance distribution correction is performed.

The processing result in step S1106 can be attained as an intensity modulation of actual two-dimensional pattern light performed in the light source 501.

Through the above-described processing, the illumination system 101 can realize luminance correction for the two-dimensional pattern light.

Figure 13A:
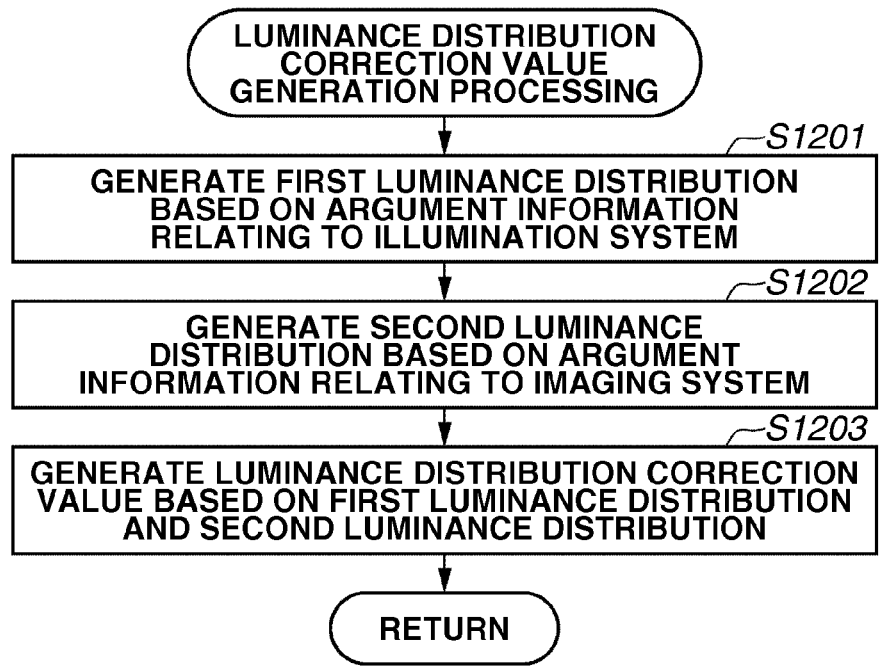
FIGS. 13A and 13B are flowcharts illustrating details of luminance distribution correction value generation processing illustrated in FIG. 12.
Figure 13B:
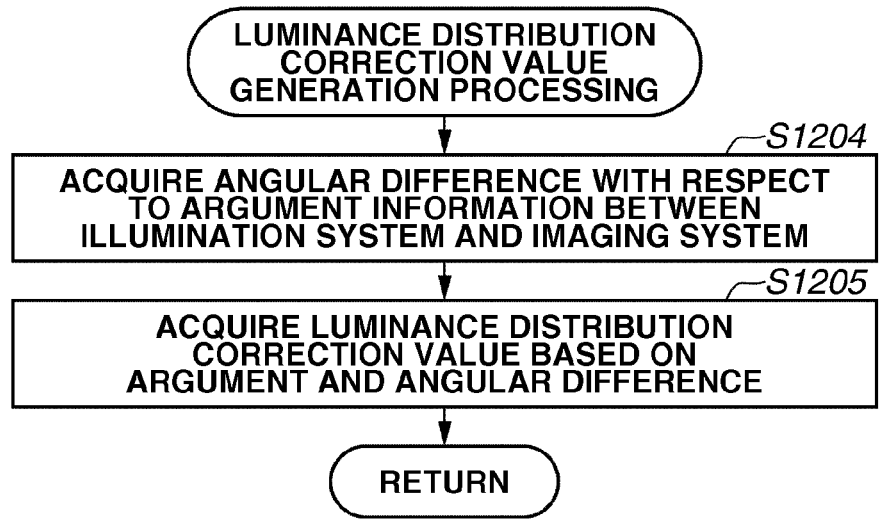

FIGS. 13A and 13B are flowcharts illustrating examples of the luminance distribution correction value generation processing to be performed in step S1102 illustrated in FIG. 12. More specifically, FIG. 13A is a flowchart illustrating example processing for generating luminance distribution correction values independently using the argument information (i.e., azimuth/polar angles $\phi$, $\theta_1$, and $\theta_2$). The processing illustrated in FIG. 13A is performed according to the procedure described with reference to FIGS. 8A to 8C and FIGS. 9A and 9B.

In step S1201, the argument information processing unit 1004 generates a first luminance distribution based on the argument information relating to the illumination system 101. More specifically, the first luminance distribution to be generated by the argument information processing unit 1004 is a table of correction values corresponding to all pixels, which can be generated based on the azimuth angle $\phi$ and the polar angle $\theta_1$. The first luminance distribution conceptually corresponds to the luminance distribution 801 illustrated in FIG. 8A and the luminance distribution 804 illustrated in FIG. 9A.

Next, in step S1202, the argument information processing unit 1004 generates a second luminance distribution based on the argument information relating to the imaging system 102. More specifically, the second luminance distribution to be generated by the argument information processing unit 1004 is a table of correction values corresponding to all pixels, which can be generated based on the azimuth angle $\phi$ and the polar angle $\theta_2$. The second luminance distribution conceptually corresponds to the luminance distribution 802 illustrated in FIG. 8A and the luminance distribution 805 illustrated in FIG. 9A.

Next, in step S1203, the argument information processing unit 1004 generates luminance distribution correction values based on the first luminance distribution and the second luminance distribution. The generated luminance distribution correction values (table) conceptually correspond to the luminance distribution 803 illustrated in FIG. 8A and the luminance distribution 806 illustrated in FIG. 9A.

Through the above-described processing, the argument information processing unit 1004 can generate the luminance distribution correction values (table) based on the argument information.

FIG. 13B is a flowchart illustrating example processing for generating luminance distribution correction values using two parameters (difference information), i.e., the azimuth angle $\phi$ and a polar angle difference $\theta_1 - \theta_2$.

The flowchart illustrated in FIG. 13B is employable when the illumination system 101 and the imaging system 102 are mutually similar in angular characteristics relative to the luminance distribution. For example, the flowchart illustrated in FIG. 13B is applicable when the angular characteristics of the emission light intensity of the illumination system 101 is similar to the angular characteristics of the reception light intensity of the imaging system 102 in linearly changing at the same change rate, as illustrated in FIGS. 8A to 8C.

In step S1204, the positional relationship information acquisition unit 208 acquires an angular difference $\theta_1\theta_2$ between the polar angle $\theta_1$ of the illumination system 101 and the polar angle $\theta_2$ of the imaging system 102. The angular difference $\theta_1 - \theta_2$ includes not only magnitude information but also directional information. The directional information included in the angular difference $\theta_1 - \theta_2$ can define the direction of a luminance change amount. Performing the processing of step S1204 can reduce the number of required argument information to only two parameters.

Next, in step S1205, the argument information processing unit 1004 acquires luminance distribution correction values based on the azimuth angle $\phi$ and the angular difference $\theta_1 - \theta_2$. The magnitude of the angular difference $\theta_1 - \theta_2$ is usable to define a change amount of the luminance, and the direction of the angular difference $\theta_1 - \theta_2$ can define the direction of the luminance change. Therefore, the argument information processing unit 1004 uses the angular difference $\theta_1 - \theta_2$ and the azimuth angle $\phi$ to generate the luminance distribution correction values.

Through the above-described processing (steps S1204 and step S1205), it is feasible to generate the luminance distribution correction values based on only two parameters of the argument information. The above-described processing is advantageous in processing speed and memory capacity because the number of the parameters to be used in the positional relationship information acquisition unit 208 can be reduced.

Figure 14A:
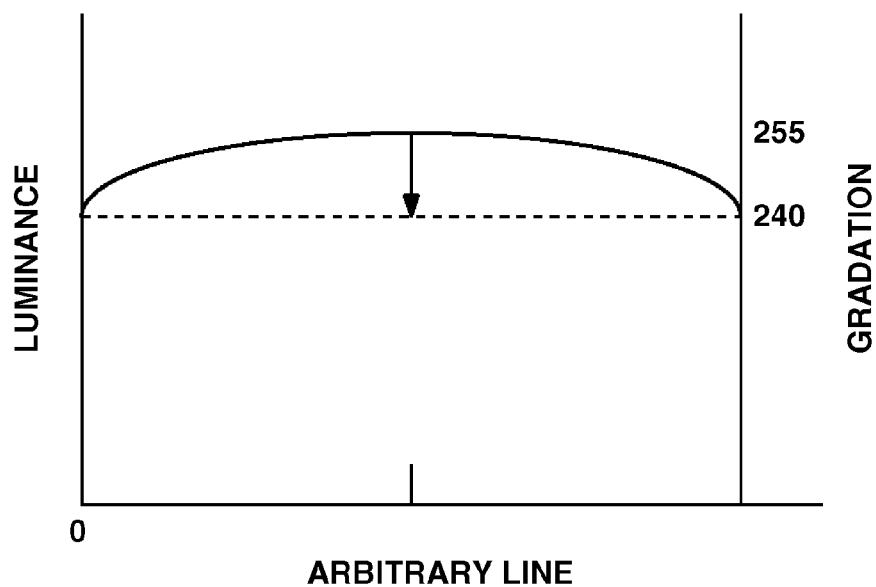
FIGS. 14A and 14B illustrate example processing for compensating a dynamic range that may decrease in gradation conversion.
Figure 14B:
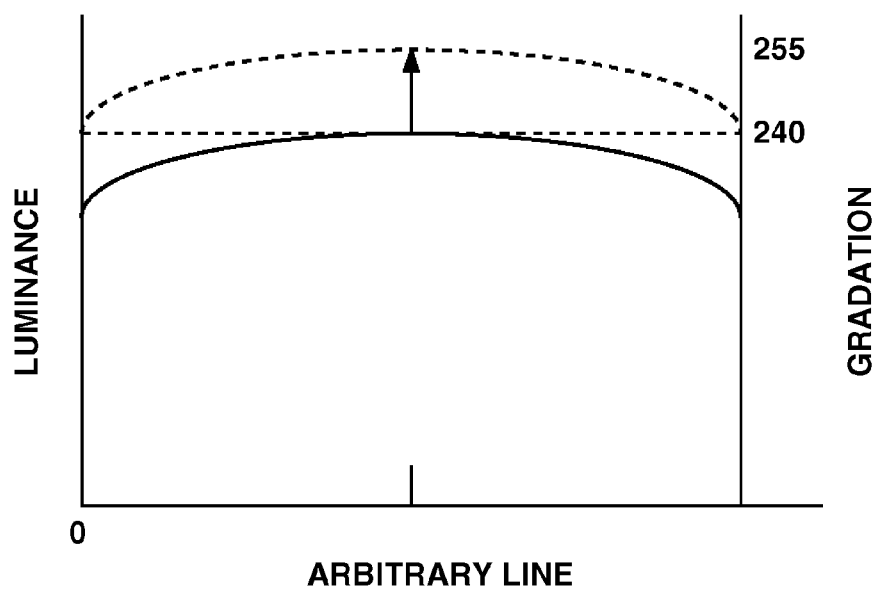

FIGS. 14A and 14B illustrate example processing for compensating the dynamic range that may decrease in the gradation conversion processing. More specifically, FIG. 14A illustrates an example case where only the spatial modulator 503 is controlled to perform the luminance distribution correction. FIG. 14B illustrates an example case where the spatial modulator 503 and the light source 501 are controlled to perform the luminance distribution correction.

In FIG. 14A, the abscissa axis represents an arbitrary line and the ordinate axis represents the magnitude of luminance or gradation at the measurement surface 701 corresponding to each pixel on the abscissa axis. A simple method for correcting the luminance distribution includes defining the luminance value of a pixel where the luminance becomes darkest due to the luminance change as a maximum luminance value and then converting the gradation of other pixel with reference to the maximum luminance value.

In FIG. 14A, pixels positioned at both ends of an arbitrary line are pixels where the luminance becomes darkest due to the luminance change. The maximum luminance value attainable by the pixels positioned at both ends, i.e., the luminance value when the gradation becomes "240", is defined as the maximum luminance value of the concerned line.

The gradation conversion processing for each pixel other than the pixels positioned at both ends is performed in such a way as to prevent the gradation from exceeding "240."

In this case, as the maximum luminance value is the luminance value at the gradation "240", the dynamic range decreases. Although the line taken into consideration in FIG. 14A is an arbitrary line to simplify the description of the present exemplary embodiment, it is desired to perform the above-described processing on all pixels that actually constitute an illumination pattern image.

Similarly, in FIG. 14B, the abscissa axis represents an arbitrary line and the ordinate axis represents the magnitude of luminance or gradation at the measurement surface 701 corresponding to each pixel on the abscissa axis. The luminance scale in FIG. 14B coincides with the luminance scale in FIG. 14A.

According to the example illustrated in FIG. 14B, the luminance of the light source 501 is increased in such a way as to compensate a decreased dynamic range. Compared to the example illustrated in FIG. 14A, the dynamic range can be secured because the level of the maximum luminance value does not change.

The magnitude of the luminance of the light source 501 capable of compensating the reduction of the dynamic range can be generated by the luminance correction value generation processing unit 1005. The luminance correction value generation processing unit 1005 can obtain a luminance-based luminance correction value. Therefore, the magnitude of the luminance compensated by the light source 501 is equal to the difference between a maximum luminance correction value and a minimum luminance correction value.

The method described in FIG. 14B is characterized by increasing the luminance of the light source 501 so as not to reduce the dynamic range with reference to the difference between the maximum luminance correction value and the minimum luminance correction value.

However, from the viewpoint of accurately performing the luminance intensity correction based on radius information, it is desired to use the light source 501 that can compensate the difference between a reference luminance value and a maximum correction luminance value in the luminance distribution correction.

The luminance correction value generation processing unit 1005 can confirm an increased amount (from 0.8 to 1.2) in the luminance distribution illustrated in FIG. 8C, which is the graph illustrating an example inclination of the luminance along an arbitrary line. The difference between the reference luminance value, which does not change the luminance, and the maximum luminance correction value is equal to the magnitude of luminance to be compensated by the light source 501.

According to the example illustrated in FIG. 8C, the reference luminance value is a luminance value at a central portion of the graph where the luminance correction change amount is equal to "1.0." The maximum luminance correction value is a luminance value at a leftmost portion of the graph where the luminance correction change amount is equal to "1.2."

As described above, when the illumination system 101 performs the luminance correction, the control of the spatial modulator 503 and the control of the light source 501 are combinable. Thus, pattern illumination securing the dynamic range can be realized.

In particular, in the spatial coding method, an edge position can be recognized based on a luminance difference in the binary gradation or a luminance change process between binary gradations. Therefore, the recognition accuracy in the edge position can be improved by widening the dynamic range so as to secure a greater luminance difference in the binary gradation. As described above, performing the luminance correction in the illumination system 101 is advantageous in that the dynamic range can be secured sufficiently and, in particular, the accuracy of the edge recognition according to the spatial coding method can be improved.

As described above, the three-dimensional measurement system according to the present exemplary embodiment generates the luminance distribution (i.e., luminance distribution correction values that reflect both the illumination system 101 and the imaging system 102) on the spatial modulator 503, which can be estimated when the luminance correction is performed considering the azimuth angle $\phi$ and polar angle $\theta 1$ of the illumination system 101 and the azimuth angle $\phi$ and the polar angle $\theta 2$ of the imaging system 102.

The three-dimensional measurement system generates the luminance distribution correction values based on the generated luminance distribution correction values and static luminance distribution correction values that are not dependent on the positional relationship. The three-dimensional measurement system performs gradation conversion processing on an illumination pattern image based on the luminance distribution correction values. The three-dimensional measurement system performs illumination processing according to a gradation-converted illumination pattern image.

Further, the three-dimensional measurement system according to the above-described exemplary embodiment obtains the light quantity attenuation rate of the three-dimensional system based on the radius information (i.e., vectors l1 and l2) and the reflectance of the measurement target 103. Then, the three-dimensional measurement system adjusts the intensity of the light source 501 based on a result of the comparison between the light quantity attenuation rate of the three-dimensional system and the reference light quantity attenuation rate.

Accordingly, even in a case where the illumination system 101 and the imaging system 102 are variable relative to the measurement target 103, the three-dimensional measurement system according to the above-described exemplary embodiment can suppress luminance change of image (i.e., luminance unevenness) that derives from the positional relationship between the illumination system 101 and the measurement target 103 or from the positional relationship between the imaging system 102 and the measurement target 103.

Further, the three-dimensional measurement system according to the above-described exemplary embodiment can combine the control of the spatial modulator 503 and the control of the light source 501. The three-dimensional measurement system can use the light source 501 to compensate the reduction of the dynamic range caused by the gradation conversion. Accordingly, in the spatial coding method, the illumination capable of securing the dynamic range is feasible and the edge recognition can be realized accurately.

The present exemplary embodiment is applicable to any other pattern illumination measurement when a positional relationship between the illumination system 101, the imaging system 102, and the measurement target 103 is usable to correct a luminance change in a system including the illumination system 101 and the imaging system 102 that are freely movable.

For example, the present exemplary embodiment can be effectively applied to an image acquisition system that uses uniform illumination for appearance inspection or defect inspection in which an illumination system and an imaging system are movable.

Next, a second exemplary embodiment of the present invention is described. Compared to the above-described first exemplary embodiment in which the illumination system 101 performs luminance correction, the second exemplary embodiment is different in that the imaging system 102 performs the luminance correction. Further, the second exemplary embodiment is different from the first exemplary embodiment in a part of luminance correction processing.

Accordingly, constituent components and portions similar to those described in the first exemplary embodiment are denoted by the same reference numerals and their descriptions are not repeated. For example, in the second exemplary embodiment, a basic configuration of the three-dimensional measurement system is similar to that illustrated in FIG. 1. Two-dimensional pattern light used in the second exemplary embodiment is similar to that illustrated in FIG. 3A or FIG. 3B.

The functional components constituting the three-dimensional measurement system illustrated in FIG. 2, except for the illumination control unit 202, the imaging control unit 204, and the control unit 207, are employable in the second exemplary embodiment.

Hereinafter, an illumination control unit, an imaging control unit, and a control unit according to the second exemplary embodiment are described below in detail.

The illumination control unit according to the second exemplary embodiment performs various control operations on the illuminator unit 201. Compared to the illumination control unit 202 described in the first exemplary embodiment, which performs luminance correction (i.e., gradation conversion) processing on an illumination pattern image, the illumination control unit according to the present exemplary embodiment does not perform the luminance correction (i.e., gradation conversion) processing on an illumination pattern image.

More specifically, the illumination control unit performs drive control for the light source 209 and the spatial modulator 211 (panel) in such a way as to deal with an illumination pattern image generated internally or externally.

The imaging control unit performs processing on a captured image in addition to control for the image capturing unit 203.

More specifically, the imaging control unit performs luminance correction (i.e., image correction) processing on a captured two-dimensional pattern light image in addition to operational control for the imaging device 213 and the operation timing control, such as shutter speed, frame rate, and ROI.

The control unit performs integrated control for the illumination control unit and the imaging control unit. More specifically, the control unit is functionally operable to synchronously control illumination and imaging operations and is further functionally operable to transmit the positional relationship information relating to the illumination system 101 and the imaging system 102 as information usable for the luminance correction.

In the present exemplary embodiment, the imaging system 102 performs luminance correction processing. To this end, the positional relationship information acquisition unit 208 transmits the positional relationship information relating to the illumination system 101 and the imaging system 102 to the imaging control unit, not to the illumination control unit.

The above-described functional units can realize three-dimensional measurement for the measurement target 103.

Figure 15:
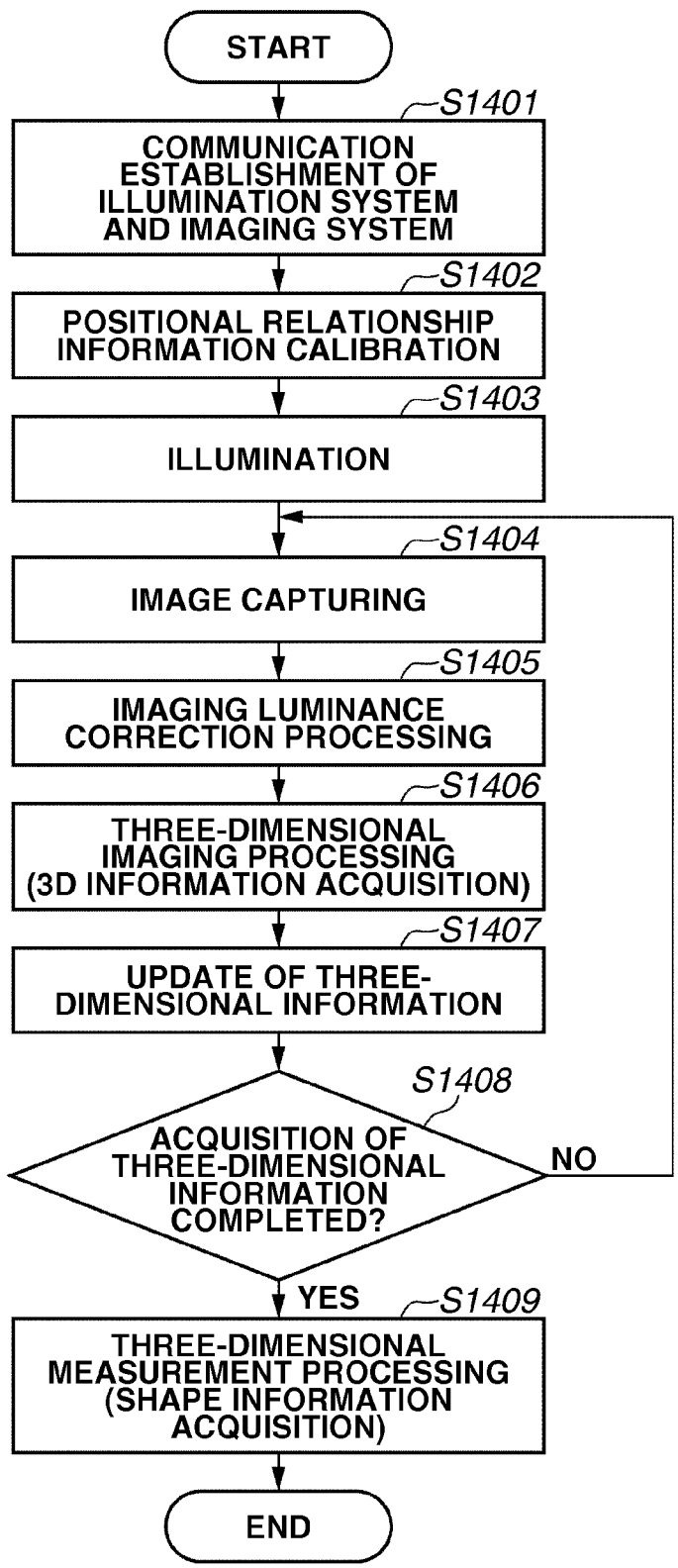
FIG. 15 is a flowchart illustrating example processing that can be performed by the three-dimensional measurement system according to a second exemplary embodiment of the present invention.

FIG. 15 is a flowchart illustrating an example of the processing that can be performed by the three-dimensional measurement system according to the second exemplary embodiment.

In step S1401, the control unit establishes a communication path to communicate with the illumination control unit, which controls the illumination system 101, as well as a communication path to communicate with the imaging control unit, which controls the imaging system 102.

Next, in step S1402, the control unit performs calibration of the positional relationship information relating to the illumination system 101 and the imaging system 102. More specifically, the positional relationship information acquisition unit 208 transmits the positional relationship information relating to the illumination system 101 and the imaging system 102 to the illumination control unit via the control unit.

The positional relationship information transmitted in this case is usable in imaging luminance correction processing to be performed in step S1405.

Next, in step S1403, the illuminator unit 201 irradiates the measurement target 103 with two-dimensional pattern light. According to the spatial coding method, the illuminator unit 201 emits two-dimensional pattern light of a plurality of edge patterns 301. According to the phase shifting method, the illuminator unit 201 emits two-dimensional pattern light of the same phase sine wave patterns 302 (see FIGS. 3A and 3B).

Next, in step S1404, the image capturing unit 203 captures an image of two-dimensional pattern light diffused and reflected by the measurement target 103. The actually captured two-dimensional pattern light may include an edge deviation or a phase deviation of the pattern, which is dependent on the shape or the surface undulation of the measurement target 103.

Next, in step S1405, the imaging control unit performs imaging luminance correction processing. In the present exemplary embodiment, the imaging control unit performs luminance correction processing on the captured two-dimensional pattern light image based on the positional relationship information relating to the illumination system 101 and the imaging system 102.

The luminance correction processing to be performed in step S1405 is similar to the correction processing described in the first exemplary embodiment with reference to FIG. 7 through FIGS. 9A and 9B. However, as the imaging system 102 performs luminance correction in the present exemplary embodiment, the luminance distributions 803, 806, and 903 illustrated in FIGS. 8A to 8C through FIGS. 10A and 10B are resultant from the luminance correction on a two-dimensional pattern light image having a luminance change.

Next, in step S1406, the three-dimensional imaging processing unit 205 acquires distance information relating to the measurement target 103 in the depth direction, based on the two-dimensional pattern light whose luminance is corrected in step S1405, according to the pattern projection method.

Further, in step S1406, the three-dimensional imaging processing unit 205 acquires three-dimensional information relating to the measurement target 103 based on the acquired distance information in addition to two-dimensional pattern light image information in the width direction and the height direction.

Subsequent steps S1407 to S1409 are similar to steps S407 to S409 illustrated in FIG. 4. More specifically, in step S1407, the three-dimensional imaging processing unit 205 updates the three-dimensional information. In step S1408, the three-dimensional imaging processing unit 205 determines whether the acquisition of the three-dimensional information has been completed. If it is determined that the acquisition of the three-dimensional information has been completed (YES in step S1408), then in step S1409, the three-dimensional measurement processing unit 206 performs three-dimensional measurement processing. If it is determined that the acquisition of the three-dimensional information has not been completed (NO in step S1408), the processing returns to step S1404.

Figure 16:
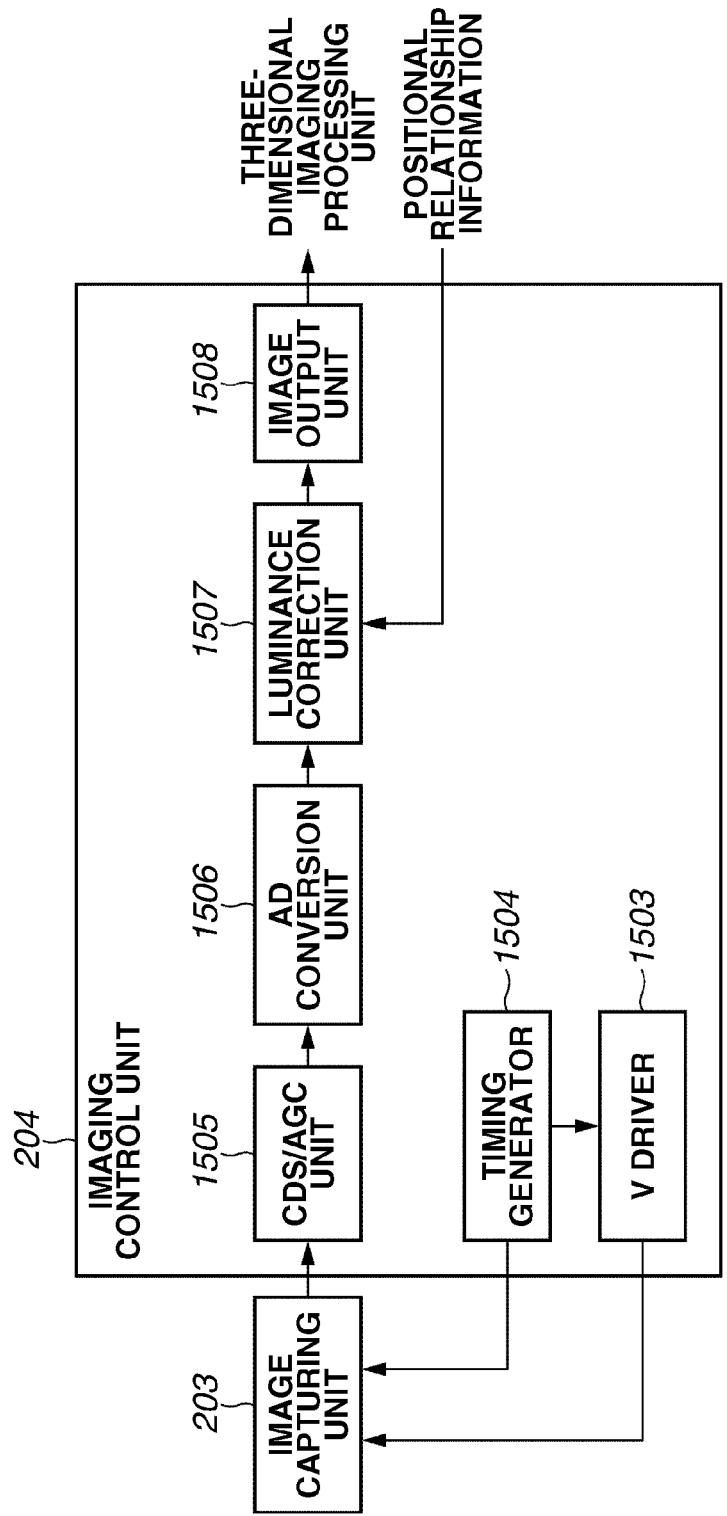
FIG. 16 is a functional block diagram illustrating an example configuration of an imaging control unit according to the second exemplary embodiment of the present invention.

FIG. 16 is a functional block diagram illustrating an example of the imaging control unit 204 included in the three-dimensional measurement system. The imaging control unit 204 includes a V driver 1503, a timing generator 1504, a CDS/AGC unit 1505, an analog/digital (AD) conversion unit 1506, a luminance correction unit 1507, and an image output unit 1508.

The V driver 1503 generates a vertical drive signal to be supplied to the imaging device 213 (i.e., an image sensor) provided in the image capturing unit 203. The timing generator 1504 generates a signal relating to the drive control for the image capturing unit 203. The V driver 1503 and the timing generator 1504 cooperatively drive the image capturing unit 203.

The CDS/AGC unit 1505 performs correlated double sampling (CDS) and automatic gain control (AGC) on an analog signal received from the image capturing unit 203. The AD conversion unit 1506 converts an analog signal output from the CDS/AGC unit 1505 into a digital signal.

The luminance correction unit 1507 performs luminance correction processing on an input two-dimensional pattern light image. The luminance correction unit 1507 receives positional relationship information relating to the illumination system 101 and the imaging system 102 (i.e., radius information and argument information) from the control unit.

The luminance correction unit 1507 performs luminance correction processing on the two-dimensional pattern light image based on the information received from the control unit. The luminance correction processing includes gain adjustment and gradation conversion performed on the two-dimensional pattern light image. The luminance correction unit 1507 outputs a luminance corrected two-dimensional pattern light image to the image output unit 1508.

The luminance correction is described below in more detail with reference to FIG. 17. The image output unit 1508 can change the format of a two-dimensional pattern light image according to each interface. When the improvement in measurement accuracy and measurement speed is taken into consideration, the image output unit 1508 is required to have a higher resolution and a higher frame rate. Therefore, it is desired that the image input unit 602 is an interface having a large-capacity transmission capability. A desired interface is, for example, a metal cable (e.g., USB or IEEE1394) or an optical fiber.

Figure 17:
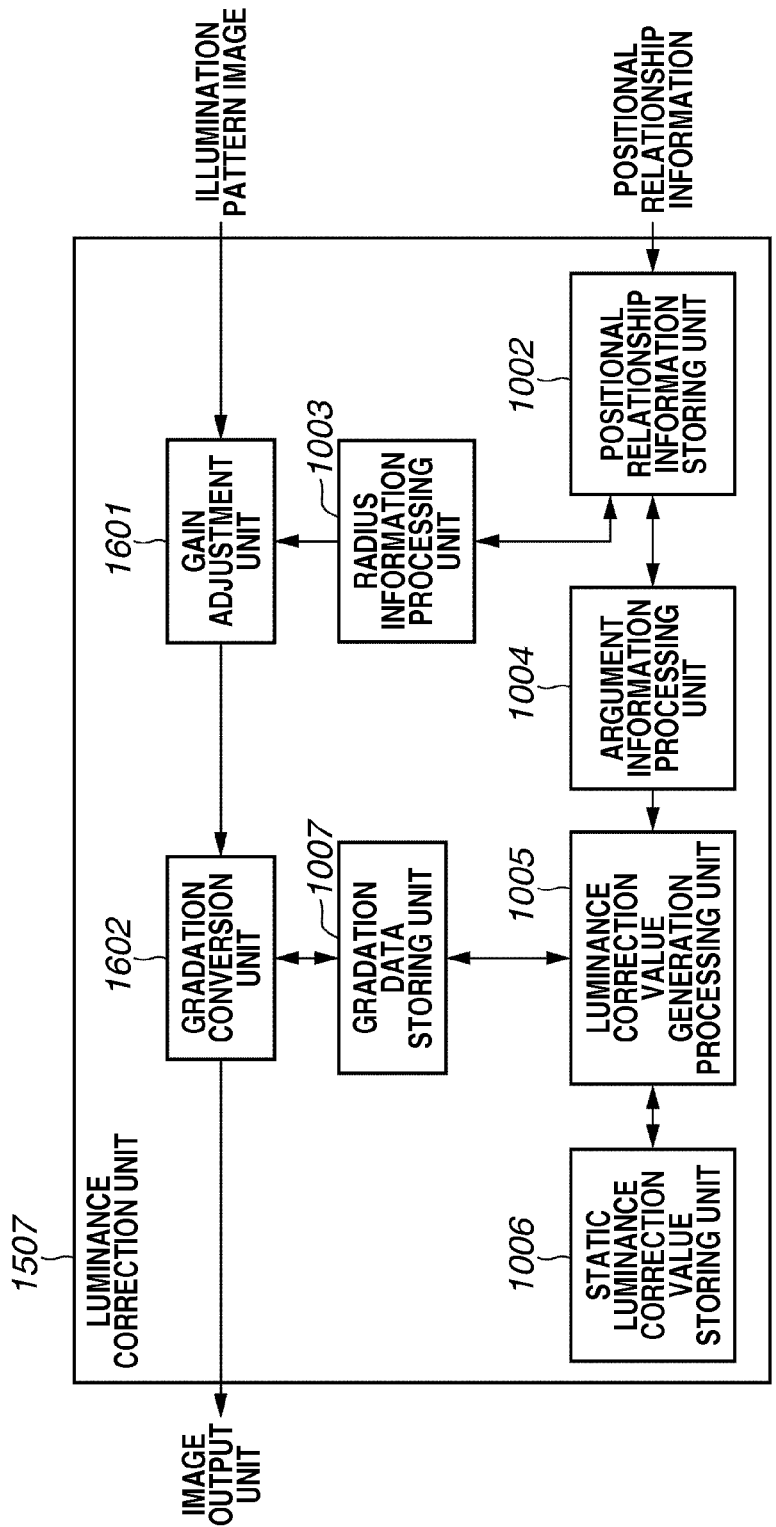
FIG. 17 is a functional block diagram illustrating an example configuration of a luminance correction unit according to the second exemplary embodiment of the present invention.

FIG. 17 is a functional block diagram illustrating an example of the luminance correction unit 1507. In the functional block diagram illustrated in FIG. 17, the positional relationship information storing unit 1002, the radius information processing unit 1003, the argument information processing unit 1004, the luminance correction value generation processing unit 1005, the static luminance correction value storing unit 1006, and the gradation data storing unit 1007 are similar to those described in the first exemplary embodiment.

A gain adjustment unit 1601 can adjust the gain of a two-dimensional pattern light image. The gain adjustment to be performed by the gain adjustment unit 1601 corresponds to the luminance intensity correction illustrated in FIGS. 10A and 10B. The gain adjustment unit 1601 adjusts the gain of the two-dimensional pattern light image based on the luminance intensity correction value received from the radius information processing unit 1003.

To multiply the entire image by a uniform gain, the gain adjustment processing is performed in such a way as to entirely brighten or darken the two-dimensional pattern light image. In this case, it is desired that the gain adjustment unit 1601 performs calculations using the bit number greater than the gradation of the two-dimensional pattern light image so as not to deteriorate the gradation accuracy.

The gain adjustment unit 1601 outputs a gain-adjusted two-dimensional pattern light image to a gradation conversion unit 1602. The gradation conversion unit 1602 can convert the gradation of the input two-dimensional pattern light image. The processing to be performed by the gradation conversion unit 1602 is substantially similar to that performed by the gradation conversion unit 1001 described in the first exemplary embodiment. In this case, it is desired that the gradation conversion unit 1602 according to the present exemplary embodiment performs calculations using the bit number greater than the gradation of the two-dimensional pattern light image so as not to deteriorate the gradation accuracy.

The gradation conversion unit 1602 outputs a gradation-converted two-dimensional pattern light image to the image output unit 1508. The gradation conversion unit 1602 can increase the gradation of the imaging system 102 to be higher than the gradation of the illumination system 101, and can suppress the influence of quantization errors. The above-described functional components can cooperatively realize the luminance correction to be performed by the imaging system 102.

A flowchart describing the processing to be performed by the luminance correction unit 1507 is substantially similar to, and partly different from, the flowchart illustrated in FIG. 12, as described below.

In step S1104, the luminance correction value generation processing unit 1005 and the gradation conversion unit 1602 perform gradation conversion processing on the two-dimensional pattern light image. More specifically, the luminance correction value generation processing unit 1005 generates a gradation table usable to perform gradation conversion processing based on the luminance distribution correction values (table) generated in step S1102.

Then, the gradation conversion unit 1602 reads the gradation table from the gradation data storing unit 1007 and performs gradation conversion processing referring to the read gradation table. In this case, it is desired that the gradation conversion unit 1602 performs calculations using the bit number greater than the gradation of the two-dimensional pattern light image so as not to deteriorate the gradation accuracy.

In step S1106, the gain adjustment unit 1601 performs gain adjustment for the two-dimensional pattern light image. More specifically, the gain adjustment for the two-dimensional pattern light image is performed in such a way as to stabilize the light source intensity when the imaging system 102 captures an image of light reflected by the measurement surface 701.

Through the above-described processing, the imaging system 102 can realize the luminance correction for the two-dimensional pattern light.

A flowchart describing processing for generating luminance distribution correction values based on argument information (azimuth/polar angles $\phi$, $\theta 1$, and $\theta 2$) is similar to the flowchart illustrated in FIG. 13A or FIG. 13B.

In the present exemplary embodiment, a gradation expression capable of suppressing quantization errors can be realized as described below. To clarify differences between the first exemplary embodiment and the second exemplary embodiment, first described are quantization errors that may be caused by the configuration described in the first exemplary embodiment. Then, advantageous points of the present exemplary embodiment are described subsequently.

Figure 18:
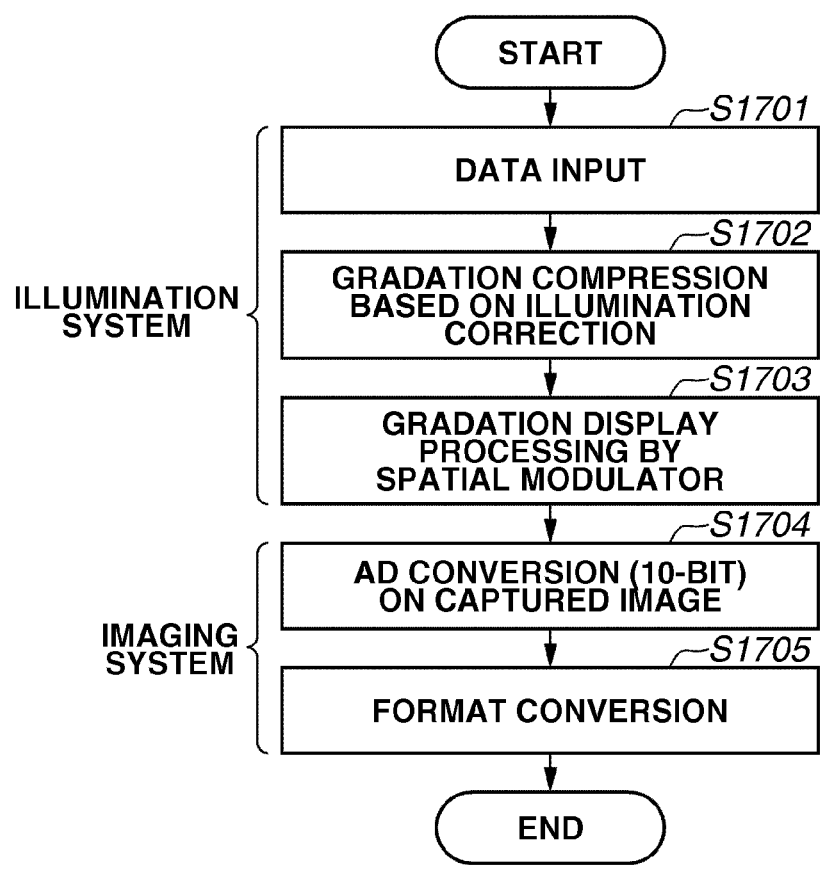
FIG. 18 is a flowchart illustrating an example of the luminance correction processing, including only portions relating to the gradation conversion, which can be performed by the illumination system according to the second exemplary embodiment of the present invention.

FIG. 18 is a flowchart illustrating an example of the luminance correction processing that can be performed by the illumination system 101. The flowchart illustrated in FIG. 18 includes only the portions relating to the gradation conversion.

In step S1701, the image input unit 602 inputs illumination pattern image data. The illumination pattern image data is, for example, 8-bit data securing 255 gradations. In this case, the gradation data is integer data.

Next, in step S1702, the luminance correction unit 603 performs luminance correction (illumination correction based gradation compression) in the illumination system 101. For example, when a compression rate of the gradation is 80%, the gradation of a maximum luminance value of the luminance corrected data becomes 204 (=255×0.8) (see FIG. 14A). In this case, the gradation data is decimal data.

Next, in step S1703, the spatial modulator 503 performs illumination with an illumination pattern image of luminance-corrected (gradation compressed) two-dimensional pattern light. In this case, the gradation of the illumination pattern image is expressed as integer data, which can be obtained by rounding a decimal portion generated when the gradation compression is performed.

Next, in step S1704, the imaging control unit 204 performs AD conversion processing for converting a captured image of two-dimensional pattern light reflected by the measurement target 103 into 10-bit data. The gradation of the AD converted data can be expressed as decimal data ranging from 0 to 1023.

Next, in step S1705, the imaging control unit 204 converts the format of the AD converted data so as to be usable as digital data. The gradation of the format converted data is, for example, 8-bit integer data.

Figures 19A, 19B:
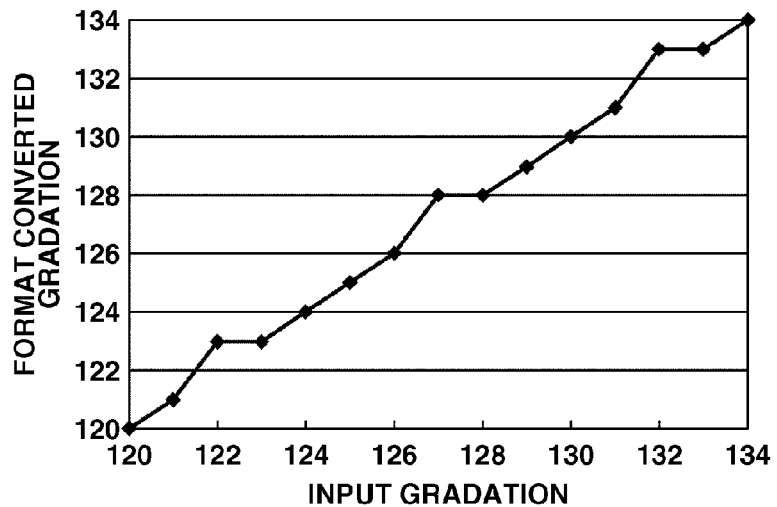
FIGS. 19A and 19B illustrate example data usable in the luminance correction processing performed by the illumination system according to the second exemplary embodiment of the present invention.

FIGS. 19A and 19B illustrate example data usable in the luminance correction processing performed by the illumination system 101. More specifically, FIG. 19A illustrates an example of the gradation data that can be obtained in respective steps in FIG. 18. The gradation data illustrated in FIG. 19A correspond to gradation levels ranging from 120 to 134, which are extracted from the data having been input in step S1701. In the table illustrated in FIG. 19A, significant figures are arbitrary and can be appropriately set considering circuit scale, processing accuracy, and processing speed.

In the graph illustrated in FIG. 19B, the abscissa axis represents the gradation of the data having been input in step S1701 and the ordinate axis represents the gradation of the data whose format has been converted in step S1705. As illustrated in FIG. 19B, it is understood that quantization errors have been generated when the gradation of the input data (step S1701) are "122", "127", and "132."

One of the causes of the above-described quantization errors is the accuracy of gradation suppressing processing performed in the illumination system 101 and AD conversion processing performed in the imaging system 102. For example, quantization errors may be generated if the accuracy of the AD conversion in the imaging system 102 is insufficient in a case where the illumination system 101 performs luminance correction processing.

On the contrary, in the case where the imaging system 102 performs luminance correction processing as described above in the present exemplary embodiment, the illumination system 101 does not cause any deterioration in gradation. Therefore, not only the accuracy of the AD conversion in the imaging system 102 can be saved but also the generation of quantization errors in the three-dimensional measurement system can be suppressed.

In particular, in the phase shifting method, the phase position is recognized based on the gradation. Therefore, the recognition accuracy of the phase position can be improved if the gradation can be accurately secured by suppressing quantization errors. As described above, performing luminance correction processing in the imaging system 102 is advantageous in suppressing quantization errors and in improving the phase recognition accuracy, in particular, in the phase shifting method.

Figure 20:
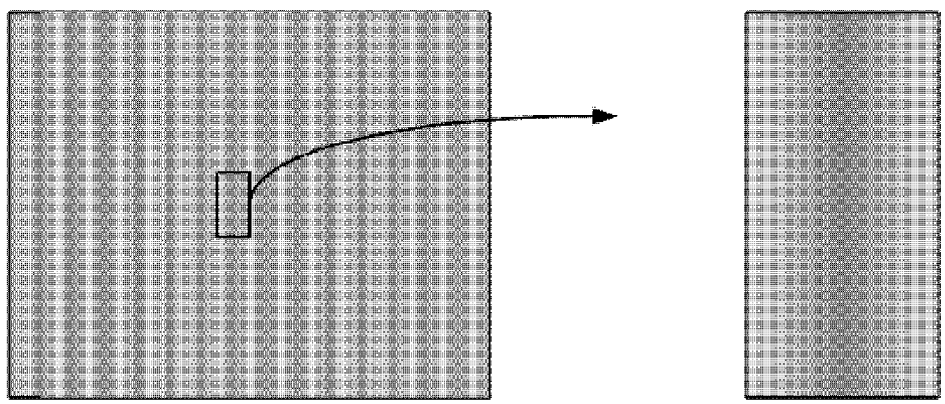
FIG. 20 schematically illustrates local luminance correction processing that can be performed by the imaging system according to the second exemplary embodiment of the present invention.

FIG. 20 schematically illustrates local luminance correction processing that can be performed by the imaging system 102. Performing the correction processing only in a limited measurement target area is feasible by incorporating the luminance correction unit 1507 illustrated in FIG. 17 in the three-dimensional imaging processing unit 205. In this case, the processing can be speedily completed.

For example, the processing time can be greatly reduced if a local area of a two-dimensional pattern light image captured according to the phase shifting method is extracted as illustrated in FIG. 20.

As described above, even when the imaging system 102 performs the luminance correction processing, obtainable effects are similar to those described in the above-described first exemplary embodiment except for the securing of the dynamic range. Further, the gradation recognition can be performed accurately because quantization errors can be reduced. Moreover, the processing can be speedily completed by performing the correction processing only at a limited measurement target area.

Next, a third exemplary embodiment of the present invention is described. The above-described first exemplary embodiment is characterized in that the illumination system 101 performs the luminance correction. The second exemplary embodiment is characterized in that the imaging system 102 performs the luminance correction.

On the contrary, the third exemplary embodiment is characteristic in functionally separating the content of the luminance correction in such a way that the illumination system 101 performs luminance intensity correction and the imaging system 102 performs luminance distribution correction.

In other words, the third exemplary embodiment is different from the above-described first and second exemplary embodiments in apart of the system configuration for correcting the luminance as well as in a part of the luminance correction processing to be performed.

Accordingly, in the following description of the present exemplary embodiment, constituent components and portions similar to those described in the first and second exemplary embodiments are denoted by the same reference numerals and their descriptions are not repeated. For example, in the third exemplary embodiment, a basic configuration of the three-dimensional measurement system is similar to that illustrated in FIG. 1. Two-dimensional pattern light used in the third exemplary embodiment is similar to that illustrated in FIG. 3A or FIG. 3B.

The functional components constituting the three-dimensional measurement system illustrated in FIG. 2, except for the illumination control unit 202, the imaging control unit 204, and the control unit 207, are employable in the third exemplary embodiment.

Hereinafter, an illumination control unit, an imaging control unit, and a control unit according to the third exemplary embodiment are described below in detail.

The illumination control unit according to the third exemplary embodiment controls the illumination pattern image and performs various control operations on the illuminator unit 201. Compared to the illumination control unit 202 described in the first exemplary embodiment that performs the luminance distribution correction in addition to the luminance intensity correction, the illumination control unit according to the present exemplary embodiment does not perform the luminance distribution correction and performs luminance intensity correction based on radius information and argument information.

The imaging control unit according to the third exemplary embodiment performs processing on a captured image in addition to control for the image capturing unit 203. More specifically, the imaging control unit performs luminance correction processing on a captured two-dimensional pattern light image in addition to operational control for the imaging device 213 and the operation timing control, such as shutter speed, frame rate, and ROI.

Compared to the imaging control unit described in the second exemplary embodiment that performs gain adjustment in addition to the luminance distribution correction (gradation conversion), the imaging control unit according to the present exemplary embodiment does not perform the gain adjustment and performs the luminance distribution correction.

The control unit according to the third exemplary embodiment performs integrated control for the illumination control unit and the imaging control unit. More specifically, the control unit is functionally operable to synchronously control illumination and imaging operations and is further functionally operable to transmit the positional relationship information relating to the illumination system 101 and the imaging system 102 as information usable for the luminance correction.

In the present exemplary embodiment, the illumination system 101 and the imaging system 102 cooperatively perform luminance correction processing. Therefore, the positional relationship information acquisition unit 208 transmits the positional relationship information relating to the illumination system 101 and the imaging system 102 to both the illumination control unit and the imaging control unit.

More specifically, the positional relationship information supplied to the illumination control unit is both radius information and argument information. The positional relationship information supplied to the imaging control unit is argument information.

The above-described functional units can realize three-dimensional measurement for the measurement target 103.

Figure 21:
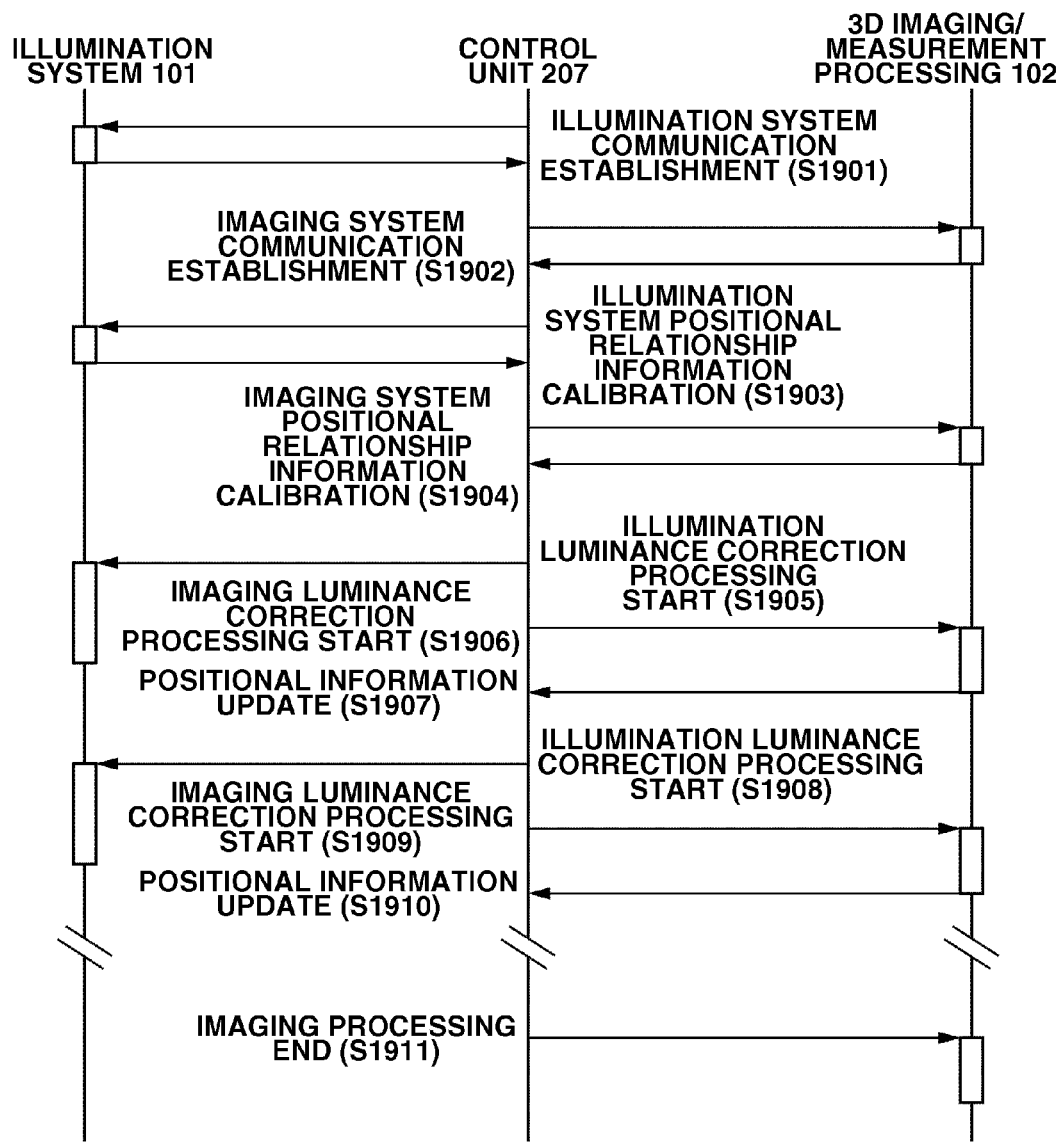
FIG. 21 illustrates a flow of example processing that can be performed by the three-dimensional measurement system according to a third exemplary embodiment of the present invention.

FIG. 21 illustrates a flow of example processing that can be performed by the three-dimensional measurement system.

In step S1901, the control unit establishes a communication path to communicate with the illumination system 101. More specifically, the control unit starts communicating with the illumination control unit.

Next, in step S1902, the control unit establishes a communication path to communicate with the imaging system 102. More specifically, the control unit starts communicating with the imaging control unit.

Next, in step S1903, the control unit performs calibration of the positional relationship information relating to the illumination system 101. The positional relationship information acquisition unit 208 transmits the positional relationship information to the illumination control unit via the control unit.

The positional relationship information transmitted in this case can be used in illumination luminance correction processing to be performed in step S1905 (i.e., luminance intensity correction to be performed by the illumination system 101). The accuracy of the positional relationship information has influence on the accuracy of the luminance correction processing to be performed by the illumination control unit.

Next, in step S1904, the control unit performs calibration of the positional relationship information relating to the imaging system 102. The positional relationship information acquisition unit 208 transmits the positional relationship information to the imaging control unit via the control unit. The positional relationship information transmitted in this case can be used in image capturing processing to be performed in step S1906 (i.e., luminance distribution correction to be performed by the imaging system 102). The above-described positional relationship information is similar to the positional relationship information used in step S1903.

Next, in step S1905, the illumination control unit performs luminance correction processing based on a start signal received from the control unit and causes the illuminator unit 201 to irradiate the measurement target 103 with luminance corrected two-dimensional pattern light.

The illumination luminance correction is luminance intensity correction based on positional relationship information. The positional relationship information used in this case includes radius vectors l1 and l2 (radius information) and azimuth/polar angles φ, θ1, and θ2 as argument information relating to the illumination system 101 and the imaging system 102. The luminance correction processing to be performed in step S1905 is described below in more detail with reference to FIGS. 22A and 22B.

Next, in step S1906, the imaging control unit captures an image of two-dimensional pattern light diffused and reflected by the measurement target 103 based on a start signal received from the control unit, and performs imaging luminance correction processing on the captured image.

Then, the three-dimensional imaging processing unit 205 performs three-dimensional imaging processing. The imaging luminance correction processing is luminance distribution correction processing performed by the imaging control unit 204 based on positional relationship information. The positional relationship information used in this case includes azimuth/polar angles φ, θ1, and θ2 as argument information relating to the illumination system 101 and the imaging system 102.

The three-dimensional imaging processing unit 205 acquires distance information relating to the measurement target 103 in the depth direction, based on the captured two-dimensional pattern light image, according to the pattern projection method.

Further, the three-dimensional imaging processing unit 205 can acquire three-dimensional information relating to the measurement target 103 based on the distance information of the measurement target 103 in the depth direction in addition to two-dimensional pattern light image information in the width direction and the height direction. The control unit transmits a start signal that defines processing timing in such a way as to synchronize illumination and imaging operations.

In step S1907, the three-dimensional imaging processing unit 205 updates the three-dimensional information (position information). The spatial coding method and the phase shifting method are not different in capturing a plurality of two-dimensional pattern light images to acquire three-dimensional information. The update processing in step S1907 is repetitively performed every time each two-dimensional pattern light image is obtained.

The accuracy of the three-dimensional measurement can be improved by repetitively performing the loop processing of steps S1905 to S1907 (by increasing the number of times of the loop processing). Processing to be performed in steps S1908 to S1910 is similar to the processing performed in steps S1905 to S1907.

Next, in step S1911, the control unit terminates the processing for acquiring the three-dimensional information. The three-dimensional measurement processing unit 206 performs model fitting processing based on the acquired three-dimensional information and acquires measurement information (e.g., three-dimensional shape, position, and orientation) relating to the measurement target 103.

FIGS. 22A and 22B are functional block diagrams illustrating an example of the illumination control unit 2201. More specifically, FIG. 22A is a functional block diagram illustrating an entire configuration of the illumination control unit. FIG. 22B is a functional block diagram illustrating a luminance correction unit provided in the illumination control unit. In FIGS. 22A and 22B, functional components similar to those described in the first exemplary embodiment with reference to FIG. 6 or FIG. 11 are denoted by the same reference numerals.

A luminance correction unit 2001 is operable to correct a luminance change of an illumination pattern image. The luminance correction unit 2001 receives positional relationship information (i.e., radius information and argument information) relating to the illumination system 101 and the imaging system 102 from the control unit. The luminance correction unit 2001 performs luminance intensity correction processing on the illumination pattern image based on the input positional relationship information.

The luminance intensity correction processing is intensity conversion processing for the light source 501. The luminance correction unit 2001 outputs a light source modulation signal for modulating the intensity of the light source 501 to the light source driving unit 605.

In the present exemplary embodiment, it is presumed that the method for correcting the luminance distribution includes defining the luminance value of a pixel where the luminance becomes darkest due to the luminance change as a maximum luminance value and then converting the gradation of other pixel with reference to the maximum luminance value (see FIG. 14A).

An intensity modulation information generation unit 2002 acquires a luminance difference between a gradation value at the pixel where the luminance becomes darkest due to the luminance change and a maximum gradation value, referring to the luminance distribution correction values acquired from the argument information processing unit 1004.

According to the example illustrated in FIG. 14A, the luminance difference acquired by the intensity modulation information generation unit 2002 corresponds to a luminance difference between a gradation level "240" at the pixel positioned at both ends of an arbitrary line and a maximum gradation level "255."

The intensity modulation information generation unit 2002 outputs an intensity modulation signal to the light source modulation signal generation unit 1008, which causes the light source 501 to generate an output capable of compensating the above-described luminance difference. The processing performed by the above-described functional unit can secure the dynamic range as illustrated in FIG. 14B. The above-described functional units can realize luminance intensity correction in the illumination system 101, while securing the dynamic range.

Figure 23A:
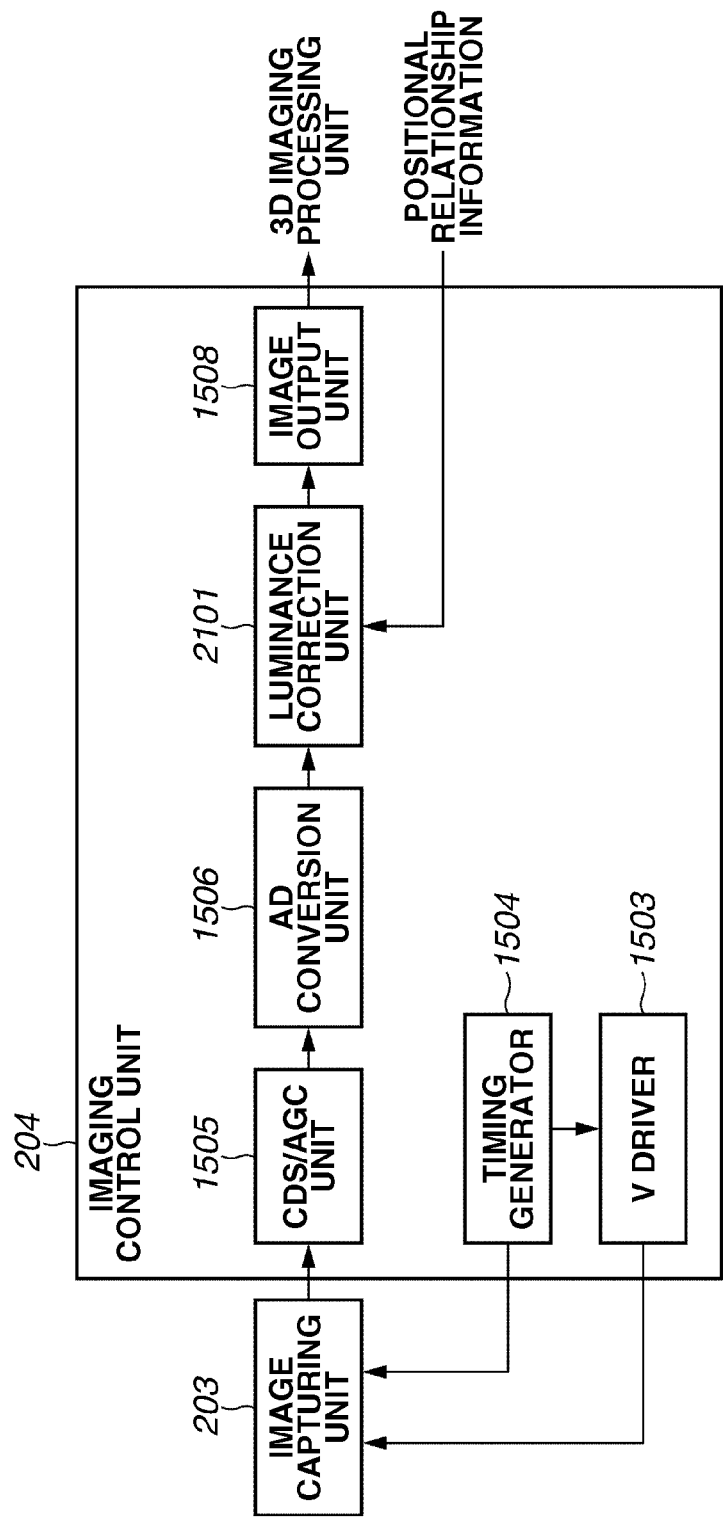
FIGS. 23A and 23B are functional block diagrams illustrating an example configuration of the imaging control unit according to the third exemplary embodiment of the present invention.
Figure 23B:
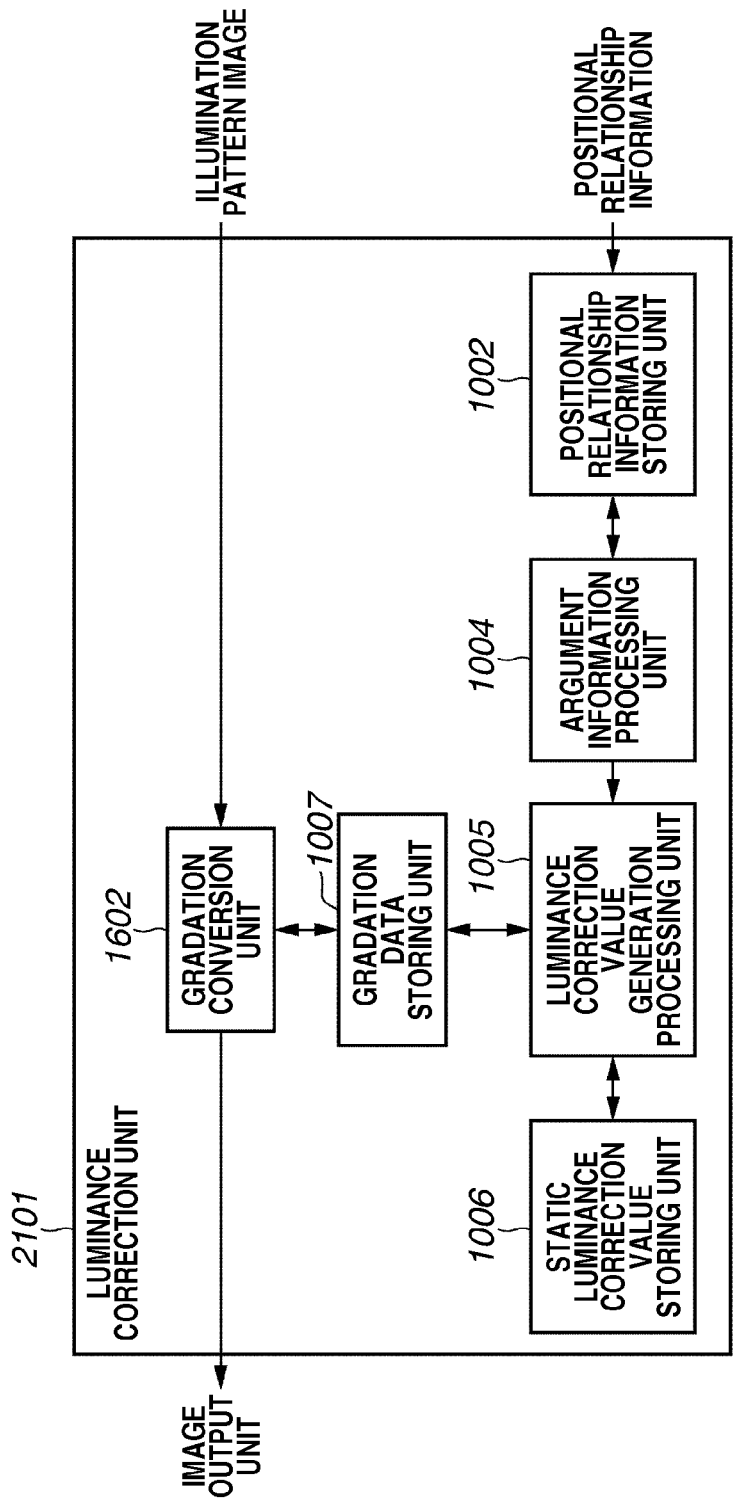

FIGS. 23A and 23B are functional block diagrams illustrating an example of the imaging control unit. More specifically, FIG. 23A is a functional block diagram illustrating an entire configuration of the imaging control unit. FIG. 23B is a functional block diagram illustrating a luminance correction unit provided in the imaging control unit. In FIGS. 23A and 23B, functional components similar to those described in the second exemplary embodiment with reference to FIGS. 16 and 17 are denoted by the same reference numerals.

A luminance correction unit 2101 is operable to correct a luminance change of a captured illumination pattern image. The luminance correction unit 2101 receives positional relationship information (argument information) relating to the illumination system 101 and the imaging system 102 from the control unit. The luminance correction unit 2101 performs luminance distribution correction processing on the illumination pattern image based on the input positional relationship information.

The luminance distribution correction processing is gradation conversion processing on the illumination pattern image. The luminance correction unit 2101 outputs a gradation converted illumination pattern image to the image output unit 1508. The above-described functional units can realize luminance distribution correction in the imaging system 102.

Figure 24A:
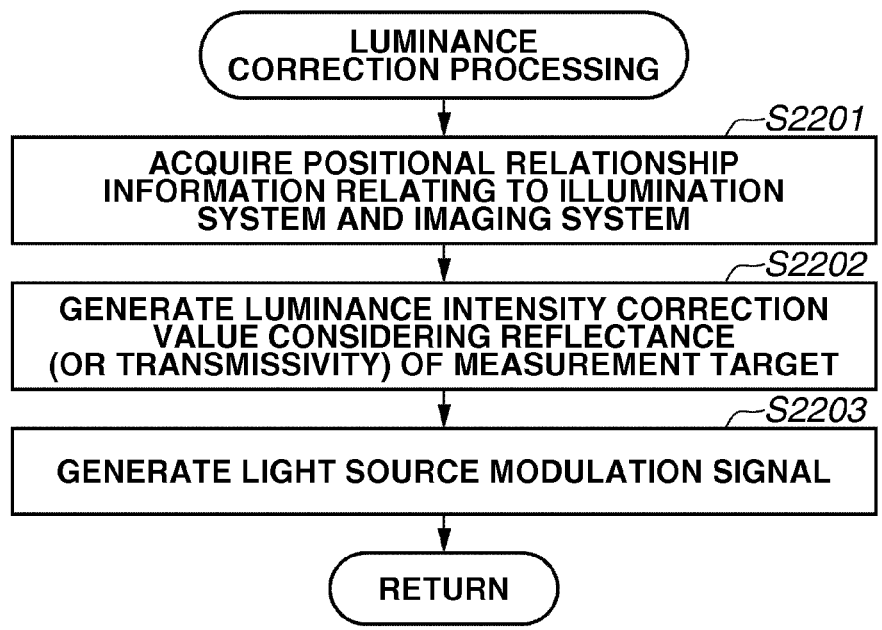
FIGS. 24A and 24B are flowcharts illustrating examples of the luminance correction processing according to the third exemplary embodiment of the present invention.
Figure 24B:
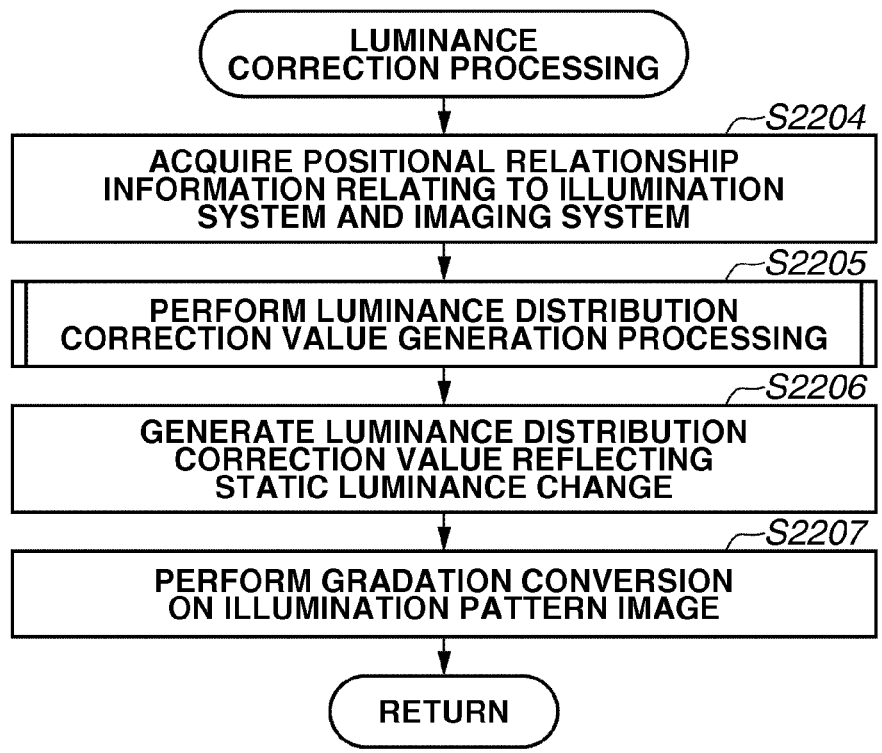

FIGS. 24A and 24B are flowcharts illustrating examples of the luminance correction processing. More specifically, FIG. 24A is a flowchart illustrating example processing for correcting the luminance intensity in the illumination system 101.

In step S2201, the positional relationship information storing unit 1002 stores the "positional relationship information relating to the measurement target 103 and the positional relationship information relating to the illumination system 101 and the imaging system 102", which are acquired and processed by the positional relationship information acquisition unit 208. The processing to be performed in step S2201 is similar to the processing performed in step S1101 illustrated in FIG. 12.

Next, in step S2202, the radius information processing unit 1003 generates a luminance intensity correction value that is dependent on the reflectance of the measurement target 103. The processing to be performed in step S2202 is similar to the processing performed in step S1105 illustrated in FIG. 12.

Next, in step S2203, the light source modulation signal generation unit 1008 generates a light source modulation signal. The processing to be performed in step S2203 is similar to the processing performed in step S1106 illustrated in FIG. 12. In the present exemplary embodiment, the light source modulation signal generation unit 1008 further performs dynamic range reduction compensating processing based on the intensity modulation signal generated by the intensity modulation information generation unit 2002.

The processing result in step S2203 can be attained as an intensity modulation of actual two-dimensional pattern light performed in the light source 501. Through the above-described processing, the illumination system 101 can realize the luminance intensity correction for the two-dimensional pattern light.

FIG. 24B is a flowchart illustrating example processing for correcting the luminance distribution in the imaging system 102

In step S2204, the positional relationship information storing unit 1002 stores the "positional relationship information relating to the measurement target 103 and the positional relationship information relating to the illumination system 101 and the imaging system 102", which are acquired and processed by the positional relationship information acquisition unit 208. In this case, the argument information (i.e., azimuth angle φ and polar angles θ1 and θ2) relating to the illumination system 101 and the imaging system 102 is stored in the positional relationship information storing unit 1002.

Next, in step S2205, the argument information processing unit 1004 generates luminance distribution correction values. The processing to be performed in step S2205 is similar to the processing performed in step S1102 illustrated in FIG. 12 (see FIGS. 13A and 13B).

Next, in step S2206, the luminance correction value generation processing unit 1005 adds the influence of a static luminance change that does not derive from the positional relationship information to the luminance distribution correction values calculated in step S2205.

More specifically, the luminance correction value generation processing unit 1005 multiplies the luminance distribution correction values (table) by the table of registered static luminance correction values stored in the static luminance correction value storing unit 1006. The processing to be performed in step S2206 is similar to the processing performed in step S1103 illustrated in FIG. 12.

Next, in step S2207, the luminance correction value generation processing unit 1005 and the gradation conversion unit 1602 perform gradation conversion processing on an illumination pattern image. More specifically, the luminance correction value generation processing unit 1005 generates a gradation table usable to perform gradation conversion processing based on the luminance distribution correction values (table) generated in step S2206 and stores the generated gradation table in the gradation data storing unit 1007.

In this case, it is desired that the luminance correction value generation processing unit 1005 performs calculations using the bit number greater than the gradation of the illumination pattern image so as not to deteriorate the gradation accuracy.

Then, the gradation conversion unit 1602 reads the gradation table from the gradation data storing unit 1007 and performs gradation conversion processing referring to the read gradation table.

Trough the above-described processing, the imaging system 102 can realize the luminance intensity correction for the two-dimensional pattern light.

As described above, the third exemplary embodiment can obtain effects similar to those described in the first and second exemplary embodiments by functionally separating the content of the luminance correction in such a way as to perform the luminance intensity correction in the illumination system 101 and perform the luminance distribution correction in the imaging system 102.

More specifically, the third exemplary embodiment can prevent quantization errors from generating in the system while securing the dynamic range. The securing of the dynamic range contributes to the improvement of the accuracy of the edge recognition according to the spatial coding method. The suppression of quantization errors contributes to the improvement of the accuracy of the gradation recognition according to the phase shifting method. In particular, the present exemplary embodiment is effectively employable for the three-dimensional measurement system that simultaneously performs processing according to the spatial coding method and the phase shifting method.

Next, a fourth exemplary embodiment of the present invention is described. The above-described first to third exemplary embodiments are characterized in employing only one illumination system 101. On the other hand, a three-dimensional measurement system according to the present exemplary embodiment includes a plurality of illumination systems 101.

As described above, the fourth exemplary embodiment is chiefly different from the above-described first to third exemplary embodiments in the total number of illumination systems 101 and processing related to the plurality of illumination systems 101.

Accordingly, in the following description of the present exemplary embodiment, constituent components and portions similar to those described in the first to third exemplary embodiments are denoted by the same reference numerals and their descriptions are not repeated.

Figure 25:
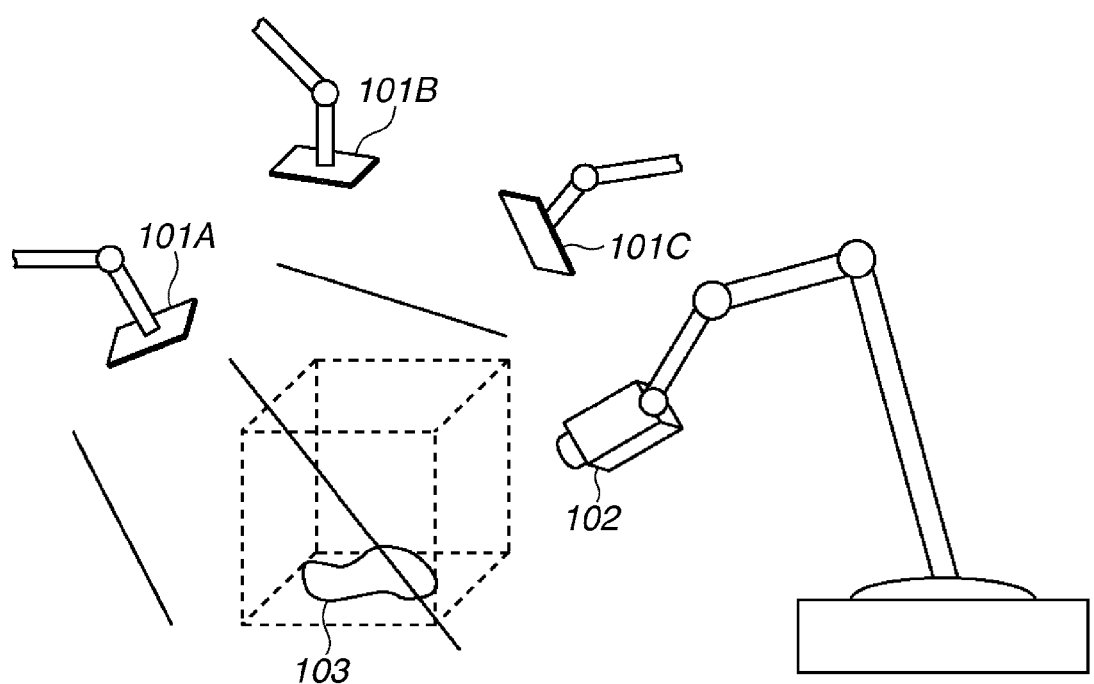
FIG. 25 illustrates a schematic configuration of a three-dimensional measurement system according to a fourth exemplary embodiment of the present invention.

FIG. 25 illustrates an example of the schematic configuration of the three-dimensional measurement system. As illustrated in FIG. 25, the three-dimensional measurement system according to the present exemplary embodiment includes three illumination systems 101A, 101B, and 101C and one imaging system 102.

The three-dimensional measurement system according to the present exemplary embodiment is a system configured to perform a three-dimensional measurement operation for each target component or part, for example, to be picked up or assembled by a robot hand that is located in the vicinity of a manufacturing line conveying components or parts in a factory.

The three-dimensional measurement system according to the present exemplary embodiment selects an optimum illumination system 101, which is considered as having highest measurement accuracy, based on the positional relationship relative to the imaging system 102. The selected imaging system 102 is operationally combined with the illumination system 101 to perform a three-dimensional measurement operation.

To this end, three illumination systems 101A to 101C are exclusively controlled so as not to simultaneously emit two-dimensional pattern light. The present exemplary embodiment is similar to the above-described first to third exemplary embodiments except that an optimum one of the plurality of illumination systems 101A to 101C is selected and respective illumination systems 101A to 101C are exclusively controlled. Therefore, system and processing configurations according to the present exemplary embodiment are basically similar to those described in the first exemplary embodiment.

Figure 26:
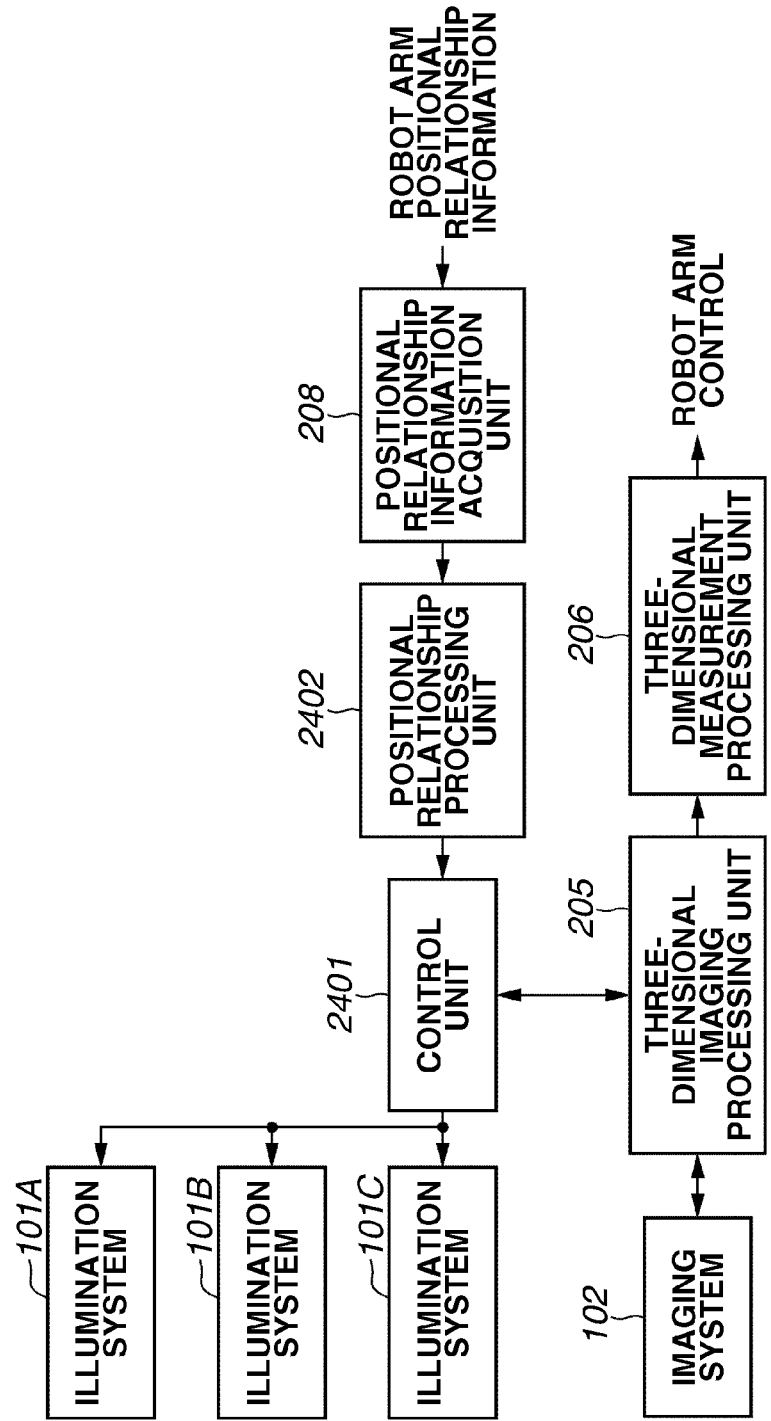
FIG. 26 is a functional block diagram illustrating an example configuration of the three-dimensional measurement system according to the fourth exemplary embodiment of the present invention.

FIG. 26 is a functional block diagram illustrating an example of the three-dimensional measurement system. The three-dimensional measurement system illustrated in FIG. 26 includes a control unit 2401 and a positional relationship processing unit 2402 in addition to three illumination systems 101A to 101C, the imaging system 102, the three-dimensional imaging processing unit 205, the three-dimensional measurement processing unit 206, and the positional relationship information acquisition unit 208.

The imaging system 102, the three-dimensional imaging processing unit 205, and the three-dimensional measurement processing unit 206 illustrated in FIG. 26 are functionally similar to those described in the first exemplary embodiment.

Each of the illumination systems 101A to 101C can emit two-dimensional pattern light toward the measurement target 103. More specifically, the illumination systems 101A to 101C can emit light toward the measurement target 103, based on the pattern projection method, to project an edge pattern usable according to the spatial coding method or a sine wave pattern usable according to the phase shifting method. Each of the illumination systems 101A to 101C has a configuration similar to that illustrated in FIG. 2 or FIG. 5.

The imaging system 102 can capture an image of two-dimensional pattern light reflected by the measurement target 103. The imaging system 102 has a configuration similar to that illustrated in FIG. 2. The control unit 2401 can perform integrated control for the illumination systems 101A to 101C and the imaging system 102.

The control unit 2401 is functionally operable to synchronously control illumination and imaging operations and is further functionally operable to transmit the positional relationship information relating to the illumination system 101 and the imaging system 102 as information usable for the luminance correction. Furthermore, the control unit 2401 is functionally operable to perform exclusive control for the illumination systems 101A to 101C.

In the present exemplary embodiment, similar to the first exemplary embodiment, it is presumed that the illumination system 101 performs luminance correction. Therefore, the positional relationship processing unit 2402 transmits the positional relationship information relating to the illumination system 101 and the imaging system 102 to one of the illumination systems 101A to 101C selected by the positional relationship processing unit 2402.

The positional relationship processing unit 2402 selects one illumination system 101 to be used in the three-dimensional measurement by performing calculation processing based on the positional relationship information relating to the measurement target 103 as well as the positional relationship information between the illumination systems 101A to 101C and the imaging system 102.

In the present exemplary embodiment, the positional relationship processing unit 2402 selects an optimum illumination system 101 that is robust against occlusion and is located at a position where sufficient measurement accuracy can be assured, with reference to the positional relationship between the measurement target 103 and the imaging system 102.

The position where sufficient measurement accuracy can be assured is, for example, is adjacent to the position conjugate with the imaging system 102 relative to the measurement target 103.

In FIG. 7, the position where sufficient measurement accuracy can be assured is a position where the conditions $\phi \approx 1$, $\theta 1 \approx \theta 2$, and $l1 \approx l2$ can be satisfied. In an ideal condition, i.e., when the illumination system 101, the imaging system 102, and the measurement target 103 satisfy the above-described positional relationship, the luminance change derived from the positional relationship is seldom generated.

The positional relationship information acquisition unit 208 acquires the positional relationship information relating to the measurement target 103 and the positional relationship information relating to the illumination system 101 and the imaging system 102 based on positional relationship information held by the robot arm.

A positional relationship information acquisition method is similar to that described in the first exemplary embodiment. The method according to the present exemplary embodiment includes acquiring positional relationship information relating to a plurality of illumination systems 101A to 101C. The positional relationship information between the illumination systems 101A to 101C and the imaging system 102 is usable in the luminance correction for the illumination system. The above-described functional units can realize three-dimensional measurement for the measurement target 103.

Figure 27:
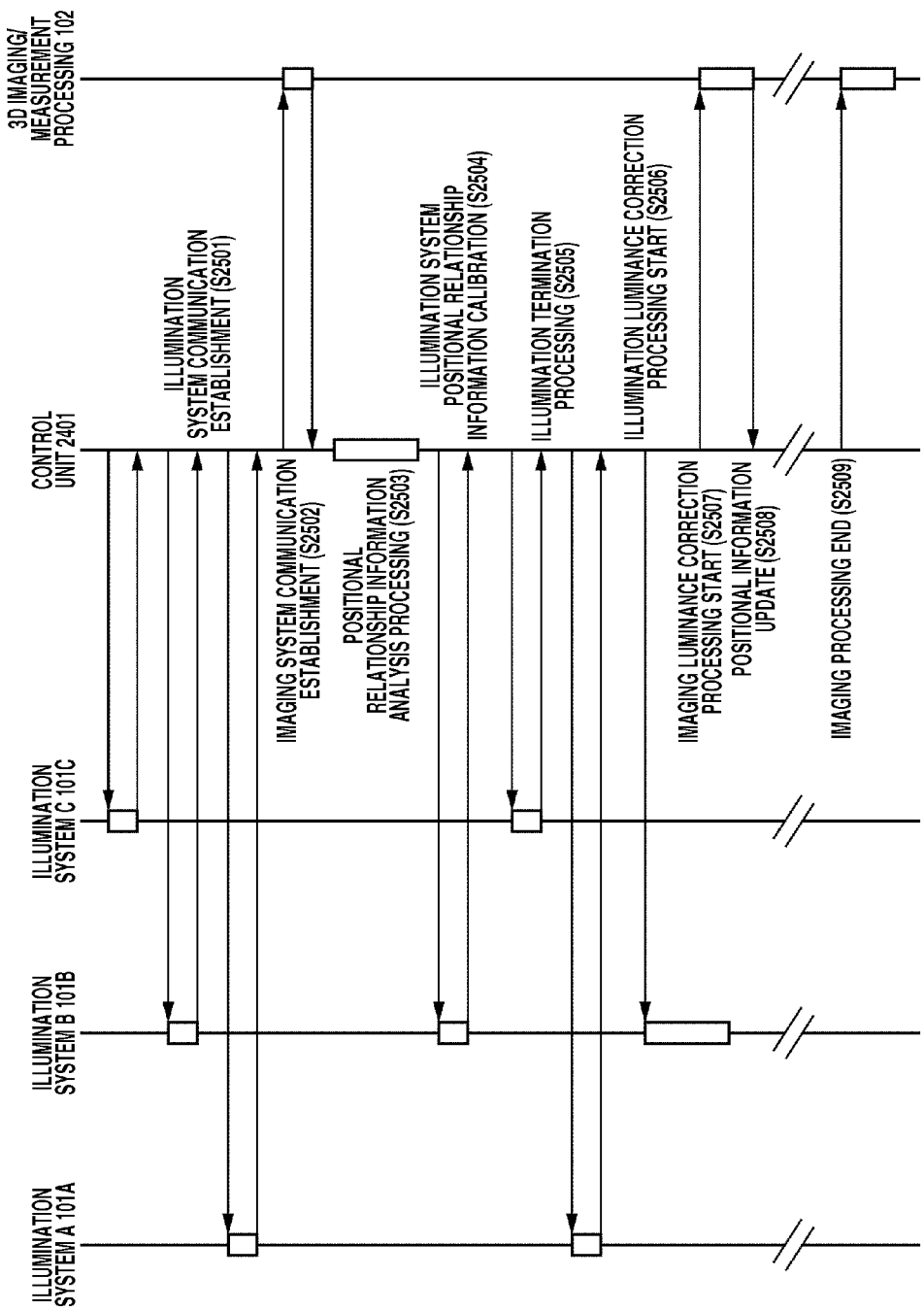
FIG. 27 illustrates a flow of example processing that can be performed by the three-dimensional measurement system according to the fourth exemplary embodiment of the present invention.

FIG. 27 illustrates an example of the processing that can be performed by the three-dimensional measurement system.

In step S2501, the control unit 2401 establishes a communication path to communicate with the illumination systems 101A to 101C. More specifically, the control unit 2401 starts communicating with the illumination systems 101A to 101C.

Next, in step S2502, the control unit 2401 establishes a communication path to communicate with the imaging system 102.

More specifically, the control unit 2401 starts communicating with the imaging system 102.

Next, in step S2503, the positional relationship processing unit 2402 performs analysis processing on the positional relationship information relating to the plurality of illumination systems 101A to 101C and the imaging system 102. The positional relationship processing unit 2402 acquires the positional relationship information from the positional relationship information acquisition unit 208 and selects an optimum illumination system 101 that is robust against occlusion and is located at a position where sufficient measurement accuracy can be assured.

In the present exemplary embodiment, it is presumed that the illumination system 101B is robust against occlusion and is located at a position where sufficient measurement accuracy can be assured with respect to the imaging system 102 and the measurement target 103.

Next, in step S2504, the control unit 2401 performs calibration of the positional relationship information relating to the illumination system 101B. The positional relationship information relating to the illumination system 101B selected by the positional relationship processing unit 2402 is transmitted to the illumination system 101B via the control unit 2401. The transmitted positional relationship information transmitted in this case is usable for the luminance correction processing to be performed by the illumination system 101B in step S2506.

Next, in step S2505, the control unit 2401 performs illumination termination processing for the illumination system 101. In the present exemplary embodiment, the control unit 2401 stops illumination performed by the illumination systems 101A and 101C.

Next, in step S2506, the illumination system 101B performs luminance correction processing in response to a start signal received from the control unit 2401 and emits luminance corrected two-dimensional pattern light toward the measurement target 103. The luminance correction of the illumination includes luminance intensity correction based on the positional relationship information and luminance distribution correction.

The positional relationship information used in this case is the coordinate information (e.g., radius vectors l1 and l2, azimuth angle $\phi$, and polar angles $\theta 1$ and $\theta 2$) relating to the illumination system 101B and the imaging system 102.

To simplify the description of the present exemplary embodiment, the processing in step S2505 and the processing in step S2506 are successively performed. However, from the viewpoint of reducing the processing time, it is advantageous that the control unit 2401 simultaneously transmits a control command to respective illumination systems 101A to 101C to perform parallel processing.

Next, in step S2507, the imaging system 102 captures an image of two-dimensional pattern light diffused and reflected by the measurement target 103 based on a start signal received from the control unit 2401. Then, the three-dimensional imaging processing unit 205 acquires distance information relating to the measurement target 103 in the depth direction based on the captured two-dimensional pattern light image according to the pattern projection method.

Further, the three-dimensional imaging processing unit 205 can acquire three-dimensional information relating to the measurement target 103 based on the distance information of the measurement target 103 in the depth direction in addition to two-dimensional pattern light image information in the width direction and the height direction. The control unit 2401 transmits a start signal that defines processing timing in such a way as to synchronize illumination and imaging operations.

In step S2508, the three-dimensional imaging processing unit 205 updates the three-dimensional information (position information). The spatial coding method or the phase shifting method can be employed to capture a plurality of two-dimensional pattern light images to acquire three-dimensional information. The update processing in step S2508 is repetitively performed every time each two-dimensional pattern light image is obtained.

The accuracy of the three-dimensional measurement can be improved by repetitively performing the loop processing of steps S2506 to S2508 (by increasing the number of times of the loop processing).

Next, in step S2509, the control unit terminates the processing for acquiring the three-dimensional information. The three-dimensional measurement processing unit 206 performs model fitting processing based on the acquired three-dimensional information and acquires measurement information (e.g., three-dimensional shape, position, and orientation) relating to the measurement target 103.

As described above, an optimum illumination system 101 that is robust against occlusion and is located at a position where sufficient measurement accuracy can be assured is selected based on the positional relationship between the imaging system 102, the measurement target 103, and the illumination systems 101A to 101C.

Then, the selected illumination system 101 and the imaging system 102 are used to perform the three-dimensional measurement. Accordingly, the luminance change can be effectively suppressed.

In the present exemplary embodiment, a plurality of the illumination systems 101 and only one imaging system 102 are freely movable. According to a modified embodiment, only one illumination system 101 and a plurality of imaging systems 102 may be freely movable. In other words, either the illumination system 101 or the imaging system 102 can be provided as a plurality of units.

The total number of a plurality of units provided as the illumination system or the imaging system is not limited to a specific number if an optimum combination of the illumination system 101 and the imaging system 102 is selectable from the positional relationship between the illumination system 101, the imaging system 102, and the measurement target 103.

Further, the luminance correction is not limited to the one performed in the illumination system as described in the present exemplary embodiment. As described in the second exemplary embodiment, the imaging system can perform luminance correction. Further, as described in the third exemplary embodiment, the illumination system can perform luminance intensity correction and the imaging system can perform luminance distribution correction.

Further, as another exemplary embodiment, the system can perform processing for correcting ununiformity of a luminance distribution of two-dimensional pattern light on a projection surface.

When two-dimensional pattern light is emitted from the illumination system 101 illustrated in FIG. 2, the luminance distribution of the two-dimensional pattern light projected on a projection surface may become ununiform. The ununiformity is unevenness in the luminance or positional deviation of a pixel due to a distortion aberration in an optical system. The ununiformity may be derived from the optical configuration of the illumination system 101.

To correct the ununiformity, it is useful that the illumination control unit 202 is functionally operable to correct the ununiformity. The illumination control unit 202 receives information indicating ununiformity of two-dimensional pattern light on a projection surface from the three-dimensional imaging processing unit 205 or a storage device (not illustrated), and controls the illumination system 101 based on the received information in such a way as to emit ununiformity-corrected pattern light.

The illumination control unit 202 performs predetermined image processing on a captured image to extract information relating to ununiformity of the two-dimensional pattern light on the projection surface. The above-described correction processing may be realized by the illumination control performed by the illumination control unit 202, or in cooperation with the image correction processing performed by the three-dimensional imaging processing unit 205 and the three-dimensional measurement processing unit 206.

Of the ununiformity, the luminance unevenness can be corrected by performing irradiation in accordance with the minimum luminance value in an area where the luminance unevenness occurs, because the minimum luminance value can be regarded as a luminance value capable of compensating the uniformity without causing any luminance unevenness.

However, if the luminance unevenness correction is performed, a reduction in peak luminance of the two-dimensional pattern light may occur. Therefore, after the luminance unevenness is corrected, the illumination control unit 202 increases the quantity of light emitted from the light source.

Figure 28A:
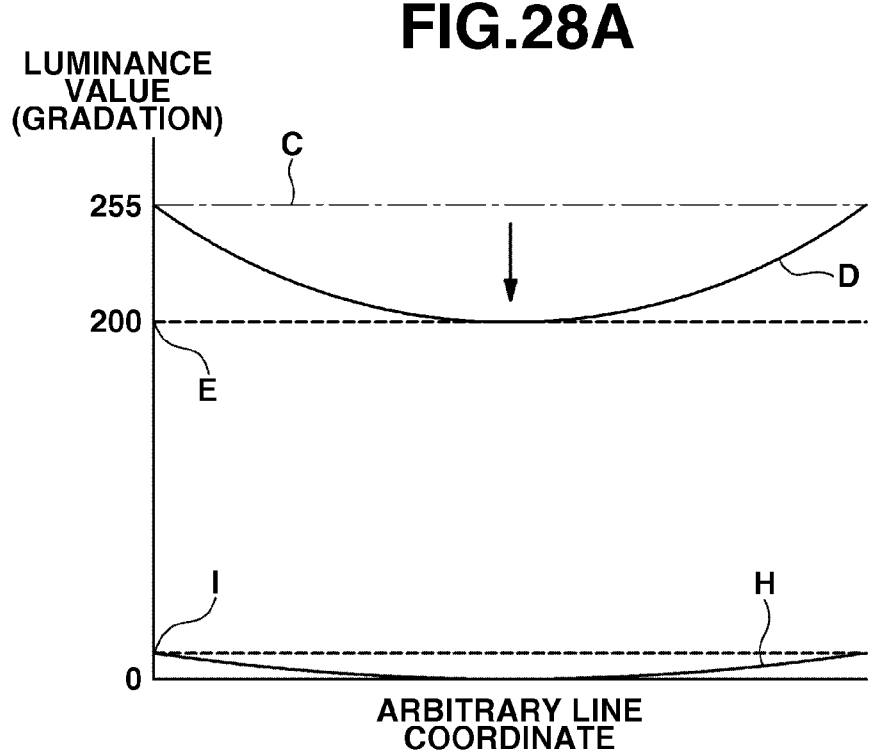
FIGS. 28A and 28B are graphs illustrating examples of light source adjustment control according to an exemplary embodiment of the present invention.
Figure 28B:
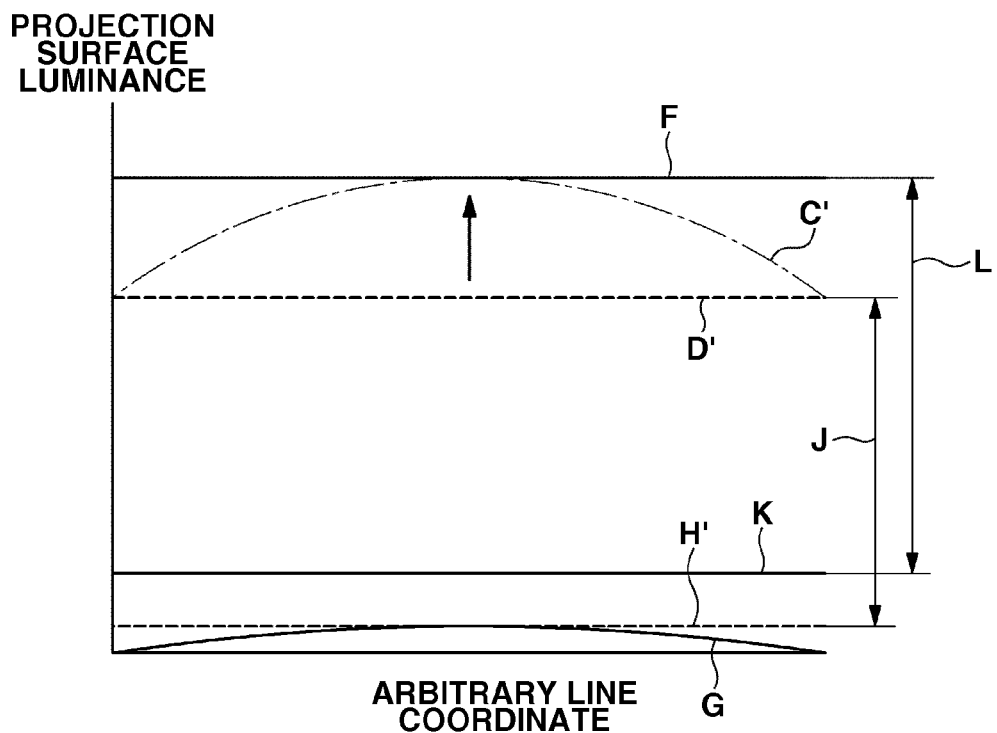

The luminance unevenness correction can be realized by the light quantity adjustment for the light source illustrated in FIGS. 28A and 28B. FIG. 28A illustrates the luminance value on the spatial modulator, as an example of the luminance correction using gradation control. FIG. 28B illustrates the luminance on a projection surface, as an example of combining operations of light-quantity increasing control by the light quantity adjustment for the light source.

In FIG. 28A, the abscissa axis represents the coordinate of an arbitrary line and the ordinate axis represents the luminance value (gradation value) on the spatial modulator corresponding to each pixel illustrated on the abscissa axis.

The abscissa axis in FIG. 28B represents the coordinate of an arbitrary line corresponding to the line illustrated in FIG. 28A. The ordinate axis in FIG. 28B represents the magnitude of luminance on a projection surface of an object to be measured.

The luminance correction includes confirming a luminance change along a line and, with respect to the value for which the same luminance is desired, designating a luminance value of a pixel whose luminance value is smallest on the projection surface as a maximum luminance value capable of compensating the uniformity.

The luminance correction further includes compensating the uniformity for pixels that become brighter than the maximum luminance value on the projection surface in such a way as to lower the luminance value to a level equivalent to the maximum level in the preceding step so that the luminance becomes uniform on the projection surface. A reduction in display luminance can be compensated by using a gradation expression function of the spatial modulator.

In the present exemplary embodiment, it is presumed that the spatial modulator has an 8-bit gradation. A higher luminance pattern as a binary pattern with a maximum value (i.e., 255) expressible using the 8-bit gradation, i.e., a luminance value indicated by C in FIG. 28A, is formed on the spatial modulator. As indicated by C' in FIG. 28B, the luminance is variable along a line on the projection surface due to various influences of the optical system.

The luminance correction includes setting a luminance value at a pixel position where the luminance reduction becomes maximum as a maximum luminance value that can be expressed by the spatial modulator, as indicated by D' in FIG. 28B. The luminance level D' on the projection surface can be realized when a luminance distribution D illustrated in FIG. 28A is formed on the spatial modulator. Projecting a uniform line on the projection surface is feasible by lowering the luminance value of a central portion from 255(C) to 200(E).

After the correction based on luminance conversion is completed, the maximum luminance value on the projection surface decreases from F to D'. Therefore, the dynamic range of the luminance decreases. To simplify the description, only the luminance correction along an arbitrary line has been described in the present exemplary embodiment. However, actual luminance correction includes processing for all pixels that constitute a pattern image.

The quantity adjustment for the light source light can be realized by increasing the light quantity of the light source in such a way as to raise the uniform but reduced luminance distribution (see D') on the projection surface. The above-described adjustment can be realized by raising the luminance level from D' to F in FIG. 28B.

Realizing a uniformly projection of luminance level F equivalent to the maximum luminance value C that can be expressed by the spatial modulator is feasible by increasing the light quantity of the light source so as to compensate the reduced dynamic range of the luminance.

In the above-described exemplary embodiments, the correction is performed in such a way that the maximum luminance becomes uniform. In the spatial coding method, the uniformity of black level is important. A luminance distribution of the black level is different in luminance value and may deviate depending on the coordinate of an arbitrary line.

To suppress such dispersion, compensation of the uniformity is feasible by raising lower luminance values with reference to the highest luminance on the line of the black level using the gradation expression.

Of the ununiformity, a positional deviation amount of a pixel can be calculated using a method that includes sampling positional deviation amounts of respective color pixels that constitute two-dimensional pattern light at each sample point and calculating positional deviations at intermediate points between two sample points based on the sampling data stored in a storage device. For example, Lagrangian interpolation processing is employable to perform the above-described correction processing.

Figure 29A:
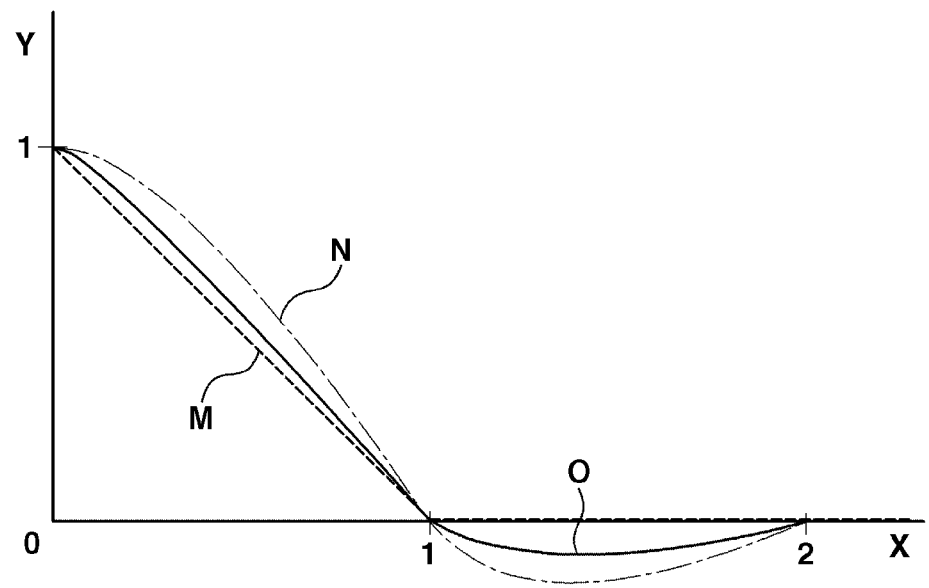
FIGS. 29A and 29B are graphs illustrating example Lagrangian interpolation curves.
Figure 29B:
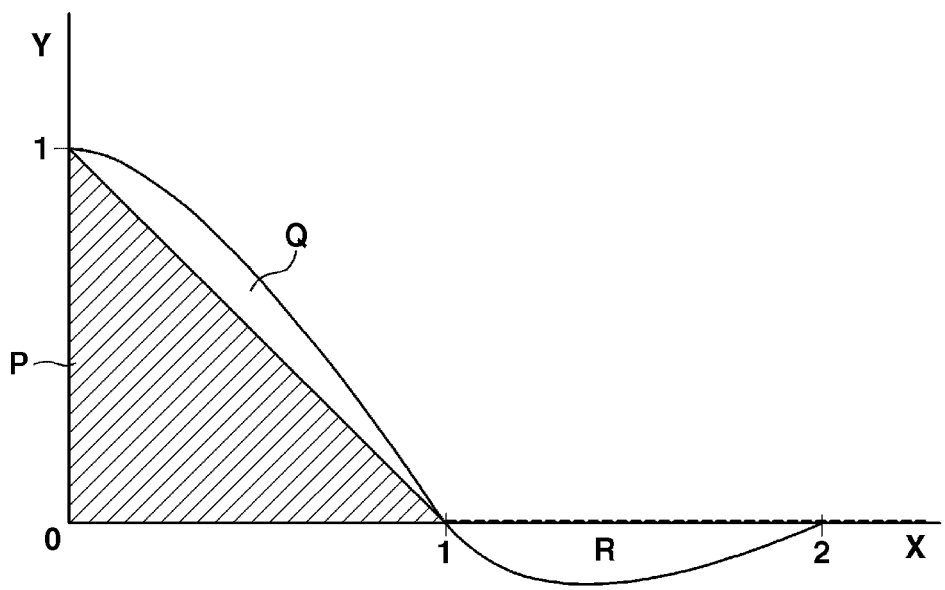

FIGS. 29A and 29B are graphs illustrating example Lagrangian interpolation curves. FIG. 29A illustrates an example cubic interpolation curve expressed using a Lagrangian polynomial expression together with a comparable interpolation curve and a comparable interpolation line.

An interpolation point x on the axis represents a value normalized by the pixel interval. A short dashes line M represents a linearly interpolated (i.e., first-order interpolation) straight line. An alternate long and short dash line N represents a bicubic interpolation curve, which is a cubic interpolation curve having higher sharpness. A solid line O represents an objective Lagrangian interpolation curve.

The relationship between peripheral reference points and an interpolation value y at the interpolation point x (i.e., a new point) can be expressed using the following formulae.

The concept of interpolation calculations is described below in more detail.

Linearly Interpolated Straight Line (Linear, Straight-Line Interpolation Based on Four Peripheral Points)

$$[0 \leq x \leq 1] y = 1-x \tag{1}$$

$$[1 \leq x \leq 2] y = 0 \tag{2}$$

Bicubic Interpolation Curve (Bicubic Interpolation Based on 16 Peripheral Points)

$$[0 \leq x \leq 1] y = 1-2x^2+x^3 \tag{3}$$

$$[1 \leq x \leq 2] y = 4-8x+5x^2-x^3 \tag{4}$$

Lagrangian Interpolation Curve (Bicubic Interpolation Based on 16 Peripheral Points)

$$[0 \leq x \leq 1] \tag{5}$$
$$y = (1/2)(x-1)(x+1)(x-1)$$
$$= 1 - (1/2)x - x^2 + (1/2)x^3$$

$$[1 \leq x \leq 2] \tag{6}$$
$$y = -(1/6)(x-3)(x-2)(x-1)$$
$$= 1 - (11/6)x + x^2 - (1/6)x^3$$

As illustrated in FIGS. 29A and 29B, compared to the bicubic interpolation curve N that is one of the bicubic interpolation curves, the Lagrangian interpolation curve O is similar to the linearly interpolated straight line. This indicates that the sharpness decreases if the above-described interpolation curve is employed to perform interpolation processing. In other words, an obtained image becomes blurry. The Lagrangian interpolation curve O has a locus similar to that of the sinc function that is famous as the bicubic interpolation curve N.

FIG. 29B illustrates the sharpness obtainable when the interpolation curve is applied to an image in relation to the area of a portion bordered by a target curve and a linearly interpolated straight line. FIG. 29B illustrates an example bicubic interpolation curve, according to which a hatched region P indicates a portion bordered by the linearly interpolated straight line, the X axis, and the Y axis. The hatched region P has an area of 0.5.

In FIG. 29B, the bicubic interpolation curve N has a locus positioned above the straight line when the interpolation point x is in a range from 0 to 1 inclusive and positioned below the straight line in a range from 1 to 2 inclusive.

In this case, Q represents an area of the region bordered by the curve and the straight line in the range $0 \leq x \leq 1$ and R represents an area of the region bordered by the curve and the straight line in the range $1 \leq x \leq 2$. In this case, respective areas Q and R can be obtained as a definite integral in each section.

The following formulae can be used to obtain calculation values of the above-described areas relating to the bicubic interpolation curve N and the Lagrangian interpolation curve O.

Bicubic Interpolation Curve (Bicubic Interpolation Based on 16 Peripheral Points)

$[0 \leq x \leq 1]$ (area Q)

$$S = \int_a^b (X^3 - 2X^2 + 1)dx - 0.5$$
$$= \left[\frac{1}{4}X^4 + \frac{2}{3}X^3 + X\right]_0^1 - 0.5$$
$$= 0.083333$$

$[1 \leq x \leq 2]$ (area R)

$$S = \int_a^b (-X^3 + 5X^2 - 8X + 4)dx$$
$$= \left[-\frac{1}{4}X^4 + \frac{5}{3}X^3 + 4X^2 + 4X\right]_1^2$$
$$= 0.083333$$

Lagrangian Interpolation Curve (Bicubic Interpolation Based on 16 Peripheral Points)

$[0 \leq x \leq 1]$ (area Q)

$$S = \int_a^b \left(\frac{1}{2}X^3 - X^2 - \frac{1}{2}X + 1\right)dx - 0.5$$
$$= \left[\frac{1}{8}X^4 - \frac{1}{3}X^3 - \frac{1}{4}X^2 + X\right]_0^1$$
$$= 0.041666$$

$[1 \leq x \leq 2]$ (area R)

$$S = \int_a^b \left(-\frac{1}{6}X^3 + X^2 - \frac{11}{6}X + 1\right)dx$$
$$= \left[-\frac{1}{24}X^4 + \frac{1}{3}X^3 - \frac{11}{12}X^2 + X\right]_1^2$$
$$= 0.041666$$

As understood from the above-described results, the area Q is equal to the area R in each of the bicubic interpolation and the Lagrangian interpolation.

When the areas Q and R have larger values, the effect of enhancing the sharpness of an image can be obtained in the interpolation processing. On the other hand, continuity is required in interpolation processing to be performed in conversion of the coordinates. In such processing, there is the tendency that conversion errors become larger when the numerical value becomes larger.

In each of the above-described curves and the straight line, an inflection point is located at the position x=1. The cubic curve is relatively smooth in the vicinity of the inflection point.

The linearly interpolated straight line may be considered as being ideal to suppress conversion errors. However, the discontinuity at the inflection point tends to locally generate larger conversion errors. Generally speaking, free curves including cubic curves are advantageous in that the conversion errors become smaller because these curves smoothly vary in the vicinity of the inflection point.

From the above-described two tendencies, it is understood that conversion errors become smaller when an interpolated curve has values similar to those of a linearly interpolated straight line and smoothly varies in the vicinity of an inflection point. In this respect, the Lagrangian interpolation curve is an ideal curve.

Other cubic interpolation curves can be classified in the following manner, depending on sharpness and value at x=0.
Bicubic, sinc: y=1 if sharpness is high and x=0
Lanczos, Hermit: y=1 if sharpness is middle and x=0
Michell, Bell, B-Spline: y≠1 if sharpness is low and x=0

As described above, among numerous interpolation curves, the Lagrangian interpolation curve can be regarded as an optimum curve indicating the tendency capable of minimizing the conversion accuracy when employed in the interpolation processing to be performed in an optical system.

As simulation results, the following table indicates coordinate conversion errors in various interpolation curves that are employable using optical design values of a lens, in which the interval of representative point is changed for comparison.

| Interpolation Curve | Representative | Conversion Error ($10^{-4}$ Pixel Interval) | |
|---|---|---|---|
| (Straight Line) | Point Interval | Average Value | Maximum Value |
| Linear | 32 × 32 | 389 | 1397 |
| | 64 × 64 | 1613 | 5204 |
| Bicubic | 32 × 32 | 1276 | 8174 |
| | 64 × 64 | 3126 | 17826 |
| Spline | 32 × 32 | 76 | 253 |
| | 64 × 64 | 292 | 929 |
| Lagrangian | 32 × 32 | 3 | 34 |
| | 64 × 64 | 36 | 168 |
| Polynomial expression ($12^{th}$ order) | — | 39 | 139 |

As understood from the above table, it is usual that the conversion accuracy greatly decreases if the interval of representative points (i.e., the sampling interval) increases. However, the Lagrangian interpolation curve is characteristic in that conversion errors can be maintained at lower levels.

For comparison, the above table includes a simulation result of an approximation using a polynomial expression having 12th-order coefficients. Conversion errors in the above-described Lagrangian interpolation curve are comparable to conversion errors resulting from the polynomial approximation, even when the interval of representative points is 64 pixels, which is four times the ordinarily used interval.

As described above, employing the Lagrangian interpolation curve for the interpolation processing to be performed in conversion of the coordinates is advantageous in that conversion errors can be reduced if the interval of representative points is the same.

Further, employing the Lagrangian interpolation curve is advantageous in that the interval of representative points can be increased if the conversion error is the same. As a result, not only the size of each correction table can be reduced (i.e., the memory capacity can be greatly reduced) but also the frequency of memory access can be reduced. Therefore, the degree of freedom in design can be increased. The circuit scale can be reduced. Electric power consumption can be lowered. Downsizing can be realized.

Next, the concept of an example cubic interpolation usable as interpolation processing for calculating new pixel values at an interpolation position is described below. In the present exemplary embodiment, a pixel value is used as an address coordinate to perform coordinate conversion for positional deviation correction. In the luminance conversion, the pixel value is a luminance value or a luminance ratio.

The cubic interpolation includes obtaining a positional deviation amount at the position of each pixel in a two-dimensional coordinate system based on distortion aberration information, color aberration information, and resolution information of a lens having the origin positioned at a display central coordinate point (x0, y0) in the two-dimensional coordinate system.

More specifically, coordinate conversion processing includes obtaining a coordinate conversion amount in the x-axis direction and a coordinate conversion amount in the y-axis direction for each pixel so as to realize the correction corresponding to the positional deviation amount.

The present exemplary embodiment obtains pixel data (i.e., RGB values) at the inherent position of each pixel in the two-dimensional coordinate system, based on the coordinate converted position of each pixel of each color as well as color information, by performing interpolation calculations.

The interpolation calculation processing includes designating a coordinate position (sx, sy) of an interpolation pixel S and obtaining normalized distances px and py of the reference point and the interpolation pixel. The interpolation calculation processing further includes obtaining weighting coefficients at each coordinate (x, y) based on the obtained distances px and py.

The cubic function to be used as interpolation curve in this case is selectable from the above-described cubic equations. The above-described formulae (3) and (4) can be used for the bicubic interpolation. The above-described formulae (5) and (6) can be used for the Lagrangian interpolation.

The present exemplary embodiment calculates a weighting coefficient for each reference point by inputting px and py values into the above-described cubic equation for respective x and y coordinates. As the px and py are normalized values, if the interval of representative points (reference points) is in increments of 16 pixels, normalization is performed at the distance corresponding to 16 pixels.

If a portion surrounded by a peripheral dot line of the interpolation pixel S is a normalized area of 1, the distances px and py between the interpolation pixel S and four reference points positioned on the y axis, (y+1) axis, x axis, and (x+1) axis become smaller than 1.

Conversely, twelve pixels surrounding the four reference points take a value between 1 and 2. The cubic equation to be used in calculating weighting coefficients for four nearest neighbor pixels is the above-described formula (3) in the case of the bicubic interpolation and the formula (5) in the case of the Lagrangian interpolation.

The cubic equation to be used in calculating weighting coefficients for the twelve pixels positioned externally is the above-described formula (4) in the case of the bicubic interpolation and the formula (6) in the case of the Lagrangian interpolation.

After the above-described weighting coefficients are obtained in the x and y directions, pixel values of respective reference points are multiplied by the obtained x and y weighting coefficients and added at 16 peripheral pixels to obtain a new pixel value at the interpolation pixel S.

In the above-described exemplary embodiment, it is presumed that the interpolation calculation processing is performed on coordinate values of respective colors obtained supposing the color aberration correction. However, similar processing can be performed in a case where only the distortion aberration (i.e., correction of distortion) is performed. In this case, the interpolation calculation processing is performed on each pixel without separating it into respective colors.

Figure 30:
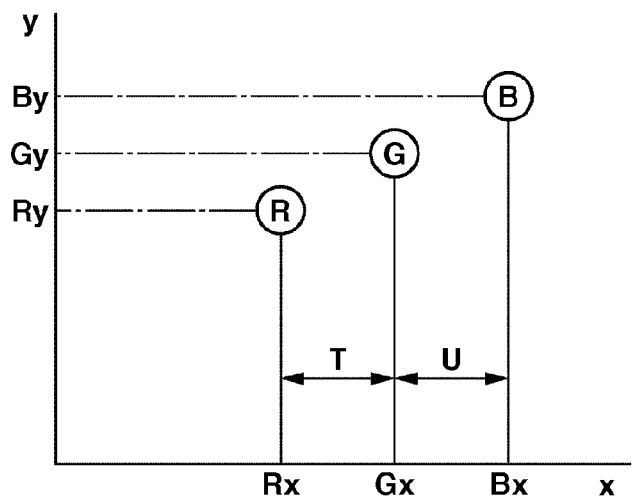
FIG. 30 illustrates an example table that can be used for aberration correction.

FIG. 30 illustrates an example aberration correction table usable in the present exemplary embodiment. The aberration correction table stores address information of the reference position (pre-conversion coordinates) in combination with difference values of the converted coordinate address.

By designating XY coordinates of a desired pixel with reference to an address to be referred to, it is feasible to obtain converted coordinates for the reference color, i.e., G (green) in the present exemplary embodiment, or a difference value (table storing value) relative to the reference color for the remaining colors, i.e., R (red) and B (blue), other than the reference color.

The coordinates of R can be obtained based on the stored difference value T relative to G, i.e., Gx−Rx, and the converted coordinate Gx of G. The coordinates of B can be obtained based on the stored difference value U relative to G, i.e., Bx−Gx, and the coordinate Gx of G.

The present exemplary embodiment uses the table that stores pre-conversion coordinate values. However, if the pre-conversion coordinate values can be associated with an address to be referred to in memory access, the memory size can be further reduced because no memory area is required for the pre-conversion coordinate values.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A measurement system comprising:
an illumination unit configured to irradiate a measurement target with illumination light;
an illumination control unit configured to control an operation of the illumination unit;
a first robot hand configured to calibrate a position of the illumination unit;
an imaging unit configured to capture an image of the irradiated measurement target;
a second robot hand configured to calibrate the position of the imaging unit;
an imaging control unit configured to control an operation of the imaging unit;
an acquisition unit configured to acquire positional relationship information representing a positional relationship between the illumination unit and the measurement target and a positional relationship between the imaging unit and the measurement target after calibration of the first robot hand and the second robot hand; and
a correction unit configured to correct a luminance intensity of the irradiated measurement target image captured by the imaging unit by changing a luminance of the illumination light emitted by the illumination unit based on the positional relationship information and reflectance of the irradiated measurement target and correct a luminance distribution of the image captured by the imaging unit based on the positional relationship information; and a measurement unit configured to measure a position and an orientation of the measurement object, based on the image of the irradiated measurement target.

2. The measurement system according to claim 1, wherein the correction unit comprises:
a luminance intensity correction unit configured to correct a luminance intensity of at least one of the luminance of the illumination light emitted by the illumination unit and the image captured by the imaging unit; and
a luminance distribution correction unit configured to correct a luminance distribution of at least one of the luminance of the illumination light emitted by the illumination unit and the image captured by the imaging unit.

3. The measurement system according to claim 2, wherein the luminance intensity correction unit is configured to generate a luminance intensity correction value derived from the positional relationship information based on the positional relationship information and reflectance or transmissivity of the measurement target, and to correct the luminance intensity of at least one of the illumination light emitted by the illumination unit and the image captured by the imaging unit based on the generated correction value.

4. The measurement system according to claim 2, wherein the luminance distribution correction unit is configured to correct the luminance distribution of at least one of the illumination light emitted by the illumination unit and the image captured by the imaging unit based on a dynamic luminance distribution correction value derived from the positional relationship information and a static luminance distribution correction value not derived from the positional relationship information.

5. The measurement system according to claim 2, wherein the illumination control unit or the imaging control unit includes the luminance intensity correction unit and the luminance distribution correction unit.

6. The measurement system according to claim 2, wherein the illumination control unit includes the luminance intensity correction unit and the imaging control unit includes the luminance distribution correction unit.

7. The measurement system according to claim 2, wherein the luminance intensity correction unit is configured to correct the luminance intensity in such a way as to compensate a dynamic range of the luminance lowered by the correction of the luminance distribution performed by the luminance distribution correction unit.

8. The measurement system according to claim 1, wherein at least one of the illumination unit and the imaging unit includes a plurality of units,
wherein the measurement system further comprises a selection unit configured to select one of the plurality of units constituting the illumination unit or the imaging unit based on the positional relationship information, and
wherein, if the illumination unit is selected by the selection unit, the selected illumination unit is used and, if the imaging unit is selected by the selection unit, the selected imaging unit is used.

9. The measurement system according to claim 1, wherein the illumination control unit is configured to correct non-uniformity of the light reflected by or transmitted through the measurement target in such a way as to compensate a peak luminance lowered by the correction.

10. An image correction method comprising:
causing an illumination unit to irradiate a measurement target with illumination light;
controlling an operation of the illumination unit;
calibrating a position of the illumination unit by a first robot hand;
causing an imaging unit to capture an image of the irradiated measurement target;
controlling an operation of the imaging unit;
calibrating the position of the imaging unit by a second robot hand;
acquiring positional relationship information representing a positional relationship between the illumination unit and the measurement target and a positional relationship between the imaging unit and the measurement target after calibration of the first robot hand and the second robot hand; and
correcting a luminance intensity of the irradiated measurement target image captured by the imaging unit by changing a luminance of the illumination light emitted by the illumination unit based on the positional relationship information and reflectance of the irradiated measurement target and correct a luminance distribution the image captured by the imaging unit based on the positional relationship information; and
measuring a position and an orientation of the measurement object, based on the image of the irradiated measurement target.

11. A non-transitory computer-readable storage medium storing a computer program that causes a computer to perform image correction processing, the program comprising:
computer-executable instructions for controlling an operation of an illumination unit that irradiates a measurement target with illumination light;
computer-executable instructions for calibrating a position of the illumination unit by a first robot hand;
computer-executable instructions for controlling an operation of an imaging unit that captures an image of the irradiated measurement target;
computer-executable instructions for calibrating a position of the imaging unit by a second robot hand;
computer-executable instructions for acquiring positional relationship information representing a positional relationship between the illumination unit and the measurement target and a positional relationship between the imaging unit and the measurement target; and
computer-executable instructions for correcting a luminance intensity of the irradiated measurement target image captured by the imaging unit by changing a luminance of the illumination light emitted by the illumination unit based on the positional relationship of the image captured by the imaging unit based on the positional relationship information after calibration of the first robot hand and the second robot hand; and
computer-executable instructions for measuring a position and an orientation of the measurement object, based on the image of the irradiated measurement target.

* * * * *